(12) United States Patent
Trefler et al.

(10) Patent No.: US 10,467,200 B1
(45) Date of Patent: *Nov. 5, 2019

(54) TECHNIQUES FOR DYNAMIC DATA PROCESSING

(71) Applicant: Pegasystems Inc., Cambridge, MA (US)

(72) Inventors: Alan Trefler, Brookline, MA (US); Mark Replogle, Groton, MA (US); John Clinton, Tyngsboro, MA (US)

(73) Assignee: Pegasystems, Inc., Cambridge, MA (US)

( * ) Notice: Subject to any disclaimer, the term of this patent is extended or adjusted under 35 U.S.C. 154(b) by 629 days.

This patent is subject to a terminal disclaimer.

(21) Appl. No.: 14/469,208

(22) Filed: Aug. 26, 2014

Related U.S. Application Data

(63) Continuation of application No. 12/381,523, filed on Mar. 12, 2009, now Pat. No. 8,843,435.

(51) Int. Cl.
*G06F 16/21* (2019.01)
*H04L 29/06* (2006.01)

(52) U.S. Cl.
CPC .............. *G06F 16/21* (2019.01); *H04L 67/42* (2013.01)

(58) Field of Classification Search
USPC ........................................................ 707/600
See application file for complete search history.

(56) References Cited

U.S. PATENT DOCUMENTS

| | | |
|---|---|---|
| 4,047,059 A | 9/1977 | Rosenthal |
| 4,344,142 A | 8/1982 | Diehr, II et al. |
| 4,602,168 A | 7/1986 | Single |
| 4,607,232 A | 8/1986 | Gill, Jr. |
| 4,659,944 A | 4/1987 | Miller, Sr. et al. |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

U.S. Appl. No. 08/666,165, filed Jun. 19, 1996, Rules Bases and Methods of Access Thereof.

(Continued)

*Primary Examiner* — Sherief Badawi
*Assistant Examiner* — Raheem Hoffler
(74) *Attorney, Agent, or Firm* — Nutter McClennen & Fish LLP

(57) ABSTRACT

Described are techniques for processing an instance of a data structure. A request to process an instance of a data structure at a first point in time is received. At least one of the data elements in the data structure is a dynamic data element that uses an association specifying how to access data for the dynamic data element in accordance with criteria evaluated using a current context determined at a point in time. In response to receiving the request, first processing is performed including determining whether the dynamic data element is referenced at the first point in time, and, if so, evaluating the criteria using a current context determined at the first point in time, and retrieving data for the dynamic data element in accordance with a current context determined at the first point in time.

44 Claims, 22 Drawing Sheets

(56) References Cited

U.S. PATENT DOCUMENTS

| | | |
|---|---|---|
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,586,311 A | 12/1996 | Davies et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,675,753 A | 10/1997 | Hansen et al. |
| 5,678,039 A | 10/1997 | Hinks et al. |
| 5,689,663 A | 11/1997 | Williams |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,243 A | 10/1998 | Rich et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,831,607 A | 11/1998 | Brooks |
| 5,832,483 A | 11/1998 | Barker |
| 5,841,435 A | 11/1998 | Dauerer et al. |
| 5,841,673 A | 11/1998 | Kobayashi et al. |
| 5,864,865 A | 1/1999 | Lakis |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,892,512 A | 4/1999 | Donnelly et al. |
| 5,907,490 A | 5/1999 | Oliver |
| 5,907,837 A | 5/1999 | Ferrel et al. |
| 5,909,213 A | 6/1999 | Martin |
| 5,910,748 A | 6/1999 | Reffay et al. |
| 5,911,138 A | 6/1999 | Li et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,983,369 A | 11/1999 | Bakoglu et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,008,808 A | 12/1999 | Almeida et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |
| 6,105,035 A | 8/2000 | Monge et al. |
| 6,108,004 A | 8/2000 | Medl |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |

(56) References Cited

U.S. PATENT DOCUMENTS

| | | | |
|---|---|---|---|
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,332 B1 | 5/2001 | Anderson et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,281,896 B1 | 8/2001 | Alimpich et al. |
| 6,282,547 B1 | 8/2001 | Hirsch |
| 6,300,947 B1 | 10/2001 | Kanevsky |
| 6,304,259 B1 | 10/2001 | DeStefano |
| 6,308,163 B1 | 10/2001 | Du et al. |
| 6,310,951 B1 | 10/2001 | Wineberg et al. |
| 6,311,324 B1 | 10/2001 | Smith et al. |
| 6,313,834 B1 | 11/2001 | Lau et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,344,862 B1 | 2/2002 | Williams et al. |
| 6,349,238 B1 | 2/2002 | Gabbita et al. |
| 6,351,734 B1 | 2/2002 | Lautzenheiser et al. |
| 6,356,286 B1 | 3/2002 | Lawrence |
| 6,356,897 B1 | 3/2002 | Gusack |
| 6,359,633 B1 | 3/2002 | Balasubramaniam et al. |
| 6,366,299 B1 | 4/2002 | Lanning et al. |
| 6,369,819 B1 | 4/2002 | Pitkow et al. |
| 6,370,537 B1 | 4/2002 | Gilbert et al. |
| 6,380,910 B1 | 4/2002 | Moustakas et al. |
| 6,380,947 B1 | 4/2002 | Stead |
| 6,381,738 B1 | 4/2002 | Choi et al. |
| 6,389,460 B1 | 5/2002 | Stewart et al. |
| 6,389,510 B1 | 5/2002 | Chen et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,421,571 B1 | 7/2002 | Spriggs et al. |
| 6,426,723 B1 | 7/2002 | Smith et al. |
| 6,429,870 B1 | 8/2002 | Chen et al. |
| 6,430,571 B1 | 8/2002 | Doan et al. |
| 6,430,574 B1 | 8/2002 | Stead |
| 6,437,799 B1 | 8/2002 | Shinomi et al. |
| 6,446,065 B1 | 9/2002 | Nishioka et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,453,038 B1 | 9/2002 | McFarlane et al. |
| 6,463,346 B1 | 10/2002 | Flockhart et al. |
| 6,463,440 B1 | 10/2002 | Hind et al. |
| 6,469,715 B1 | 10/2002 | Carter et al. |
| 6,469,716 B1 | 10/2002 | Carter et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,731 B1 | 12/2002 | Jones et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,217 B1 | 3/2003 | Maguire, III et al. |
| 6,529,899 B1 | 3/2003 | Kraft et al. |
| 6,529,900 B1 | 3/2003 | Patterson et al. |
| 6,530,079 B1 | 3/2003 | Choi et al. |
| 6,532,474 B2 | 3/2003 | Iwamoto et al. |
| 6,539,374 B2 | 3/2003 | Jung |
| 6,542,912 B2 | 4/2003 | Meltzer et al. |
| 6,546,381 B1 | 4/2003 | Subramanian et al. |
| 6,546,406 B1 | 4/2003 | DeRose et al. |
| 6,549,904 B1 | 4/2003 | Ortega et al. |
| 6,556,226 B2 | 4/2003 | Gould et al. |
| 6,556,983 B1 | 4/2003 | Altschuler et al. |
| 6,556,985 B1 | 4/2003 | Karch |
| 6,559,864 B1 | 5/2003 | Olin |
| 6,560,592 B1 | 5/2003 | Reid et al. |
| 6,560,649 B1 | 5/2003 | Mullen et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,381 B1 | 7/2003 | Eskridge et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,889 B1 | 12/2003 | Flockhart et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,690,788 B1 | 2/2004 | Bauer et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshaysky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,807,632 B1 | 10/2004 | Carpentier et al. |
| 6,810,429 B1 | 10/2004 | Walsh et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,836,275 B1 | 12/2004 | Arquie et al. |
| 6,839,682 B1 | 1/2005 | Blume et al. |
| 6,847,982 B2 | 1/2005 | Parker et al. |

(56) References Cited

U.S. PATENT DOCUMENTS

| | | |
|---|---|---|
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,925,609 B1 | 8/2005 | Lucke |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B1 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,966,033 B1 | 11/2005 | Gasser et al. |
| 6,976,144 B1 | 12/2005 | Trefler et al. |
| 6,978,719 B2 | 12/2005 | Sebata et al. |
| 6,985,912 B2 | 1/2006 | Mullins et al. |
| 6,991,153 B2 | 1/2006 | Silverbrook et al. |
| 7,020,869 B2 | 3/2006 | Abrari et al. |
| 7,020,882 B1 | 3/2006 | Lewallen |
| 7,028,225 B2 | 4/2006 | Maso et al. |
| 7,031,901 B2 | 4/2006 | Abu El Ata |
| 7,035,808 B1 | 4/2006 | Ford |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,178,109 B2 | 2/2007 | Hewson et al. |
| 7,194,380 B2 | 3/2007 | Barrow et al. |
| 7,194,690 B2 | 3/2007 | Guillermo et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,343,295 B2 | 3/2008 | Pomerance |
| 7,353,229 B2 | 4/2008 | Vilcauskas, Jr. et al. |
| 7,398,391 B2 | 7/2008 | Carpentier et al. |
| 7,406,475 B2 | 7/2008 | Dorne et al. |
| 7,412,388 B2 | 8/2008 | Dalal et al. |
| 7,415,731 B2 | 8/2008 | Carpentier et al. |
| 7,505,827 B1 | 3/2009 | Boddy et al. |
| 7,526,481 B1 | 4/2009 | Cusson et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,640,222 B2 | 12/2009 | Trefler |
| 7,647,417 B1 | 1/2010 | Taneja |
| 7,665,063 B1 | 2/2010 | Hofmann et al. |
| 7,685,013 B2 | 3/2010 | Gendler |
| 7,689,447 B1 | 3/2010 | Aboujaoude et al. |
| 7,711,919 B2 | 5/2010 | Trefler et al. |
| 7,779,395 B1 | 8/2010 | Chotin et al. |
| 7,783,596 B2 * | 8/2010 | Smolen ............ G06F 17/30348 |
| | | 707/609 |
| 7,787,609 B1 | 8/2010 | Flockhart et al. |
| 7,791,559 B2 | 9/2010 | Piasecki |
| 7,818,506 B1 | 10/2010 | Shepstone et al. |
| 7,844,594 B1 | 11/2010 | Holt et al. |
| 7,870,244 B2 | 1/2011 | Chong et al. |
| 7,889,896 B2 | 2/2011 | Roehrig et al. |
| 7,937,690 B2 | 5/2011 | Casey |
| 7,971,180 B2 | 6/2011 | Kreamer et al. |
| 7,974,714 B2 * | 7/2011 | Hoffberg ............ G06K 9/00369 |
| | | 360/75 |
| 7,983,895 B2 | 7/2011 | McEntee et al. |
| 8,001,519 B2 | 8/2011 | Conallen et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,386,960 B1 | 2/2013 | Eismann et al. |
| 8,468,492 B1 | 6/2013 | Frenkel |
| 8,479,157 B2 | 7/2013 | Trefler et al. |
| 8,516,193 B1 | 8/2013 | Clinton et al. |
| 8,739,044 B1 | 5/2014 | Varadarajan |
| 8,843,435 B1 * | 9/2014 | Trefler ................. G06F 17/3048 |
| | | 707/600 |
| 8,880,487 B1 | 11/2014 | Clinton et al. |
| 8,924,335 B1 | 12/2014 | Trefler et al. |
| 8,959,480 B2 | 2/2015 | Trefler et al. |
| 9,026,733 B1 | 5/2015 | Clinton et al. |
| 9,189,361 B2 | 11/2015 | Khatutsky |
| 9,195,936 B1 | 11/2015 | Chase |
| 9,270,743 B2 | 2/2016 | Frenkel |
| 9,678,719 B1 | 6/2017 | Frenkel |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2001/0054064 A1 | 12/2001 | Kannan |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0070972 A1 | 6/2002 | Windl et al. |
| 2002/0073337 A1 | 6/2002 | Ioele et al. |
| 2002/0083063 A1 | 6/2002 | Egolf |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0093537 A1 | 7/2002 | Bocioned et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120627 A1 | 8/2002 | Mankoff |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0181692 A1 | 12/2002 | Flockhart et al. |
| 2002/0184610 A1 | 12/2002 | Chong et al. |
| 2002/0186826 A1 | 12/2002 | Hsu et al. |
| 2002/0198935 A1 | 12/2002 | Crandall et al. |
| 2003/0001894 A1 | 1/2003 | Boykin et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Scheutze et al. |

(56) References Cited

U.S. PATENT DOCUMENTS

| | | |
|---|---|---|
| 2003/0084401 A1 | 5/2003 | Abel et al. |
| 2003/0093279 A1 | 5/2003 | Malah et al. |
| 2003/0098991 A1 | 5/2003 | Laverty et al. |
| 2003/0109951 A1 | 6/2003 | Hsiung et al. |
| 2003/0115281 A1 | 6/2003 | McHenry et al. |
| 2003/0135358 A1 | 7/2003 | Lissauer et al. |
| 2003/0152212 A1 | 8/2003 | Burok et al. |
| 2003/0154380 A1 | 8/2003 | Richmond et al. |
| 2003/0191626 A1 | 10/2003 | Al-Onaizan et al. |
| 2003/0198337 A1 | 10/2003 | Lenard |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0003043 A1 | 1/2004 | Rajamony et al. |
| 2004/0021686 A1 | 2/2004 | Barberis |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0049580 A1 | 3/2004 | Boyd et al. |
| 2004/0054610 A1 | 3/2004 | Amstutz et al. |
| 2004/0064552 A1 | 4/2004 | Chong et al. |
| 2004/0068517 A1 | 4/2004 | Scott |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0139021 A1 | 7/2004 | Reed et al. |
| 2004/0145607 A1 | 7/2004 | Alderson |
| 2004/0147138 A1 | 7/2004 | Vaartstra |
| 2004/0148152 A1 | 7/2004 | Horikawa |
| 2004/0148586 A1 | 7/2004 | Gilboa |
| 2004/0162812 A1 | 8/2004 | Lane et al. |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0243587 A1 | 12/2004 | Nuyens et al. |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0027871 A1 | 2/2005 | Bradley et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0071211 A1 | 3/2005 | Flockhart et al. |
| 2005/0096959 A1 | 5/2005 | Kumar et al. |
| 2005/0104628 A1 | 5/2005 | Tanzawa et al. |
| 2005/0125683 A1 | 6/2005 | Matsuyama et al. |
| 2005/0132048 A1 | 6/2005 | Kogan et al. |
| 2005/0138162 A1 | 6/2005 | Byrnes |
| 2005/0144023 A1 | 6/2005 | Aboujaoude et al. |
| 2005/0165823 A1 | 7/2005 | Ondrusek et al. |
| 2005/0198021 A1 | 9/2005 | Wilcox et al. |
| 2005/0216235 A1 | 9/2005 | Butt et al. |
| 2005/0222889 A1 | 10/2005 | Lai et al. |
| 2005/0228875 A1 | 10/2005 | Monitzer et al. |
| 2005/0234882 A1 | 10/2005 | Bennett et al. |
| 2005/0267770 A1 | 12/2005 | Banavar et al. |
| 2005/0288920 A1 | 12/2005 | Green et al. |
| 2006/0004845 A1 | 1/2006 | Kristiansen et al. |
| 2006/0015388 A1 | 1/2006 | Flockhart et al. |
| 2006/0020783 A1 | 1/2006 | Fisher |
| 2006/0041861 A1 | 2/2006 | Trefler et al. |
| 2006/0053125 A1 | 3/2006 | Scott |
| 2006/0063138 A1 | 3/2006 | Loff et al. |
| 2006/0064486 A1 | 3/2006 | Baron et al. |
| 2006/0064667 A1 | 3/2006 | Freitas |
| 2006/0075360 A1 | 4/2006 | Bixler |
| 2006/0080082 A1 | 4/2006 | Ravindra et al. |
| 2006/0080401 A1 | 4/2006 | Gill et al. |
| 2006/0092467 A1 | 5/2006 | Dumitrescu et al. |
| 2006/0100847 A1 | 5/2006 | McEntee et al. |
| 2006/0101386 A1 | 5/2006 | Gerken et al. |
| 2006/0101393 A1 | 5/2006 | Gerken et al. |
| 2006/0106846 A1 | 5/2006 | Schulz et al. |
| 2006/0139312 A1 | 6/2006 | Sinclair et al. |
| 2006/0149751 A1 | 7/2006 | Jade et al. |
| 2006/0167655 A1 | 7/2006 | Barrow et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0209085 A1 | 9/2006 | Wong et al. |
| 2006/0218166 A1 | 9/2006 | Myers et al. |
| 2006/0271559 A1 | 11/2006 | Stavrakos et al. |
| 2006/0271920 A1 | 11/2006 | Abouelsaadat |
| 2006/0288348 A1 | 12/2006 | Kawamoto et al. |
| 2007/0005623 A1 | 1/2007 | Self et al. |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0100782 A1 | 5/2007 | Reed et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143163 A1 | 6/2007 | Weiss et al. |
| 2007/0143851 A1 | 6/2007 | Nicodemus et al. |
| 2007/0203756 A1 | 8/2007 | Sears et al. |
| 2007/0208553 A1 | 9/2007 | Hastings et al. |
| 2007/0226031 A1 | 9/2007 | Manson et al. |
| 2007/0233902 A1 | 10/2007 | Trefler et al. |
| 2007/0239646 A1 | 10/2007 | Trefler |
| 2007/0245300 A1 | 10/2007 | Chan et al. |
| 2007/0260584 A1 | 11/2007 | Marti et al. |
| 2007/0294644 A1 | 12/2007 | Yost |
| 2008/0002823 A1 | 1/2008 | Fama et al. |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0109467 A1 | 5/2008 | Brookins et al. |
| 2008/0120593 A1 | 5/2008 | Keren et al. |
| 2008/0163253 A1 | 7/2008 | Massmann et al. |
| 2008/0184230 A1 | 7/2008 | Leech et al. |
| 2008/0189679 A1 | 8/2008 | Rodriguez et al. |
| 2008/0195377 A1 | 8/2008 | Kato et al. |
| 2008/0196003 A1 | 8/2008 | Gerken et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2008/0263510 A1 | 10/2008 | Nerome et al. |
| 2009/0007084 A1 | 1/2009 | Conallen et al. |
| 2009/0018998 A1 | 1/2009 | Patten, Jr. et al. |
| 2009/0075634 A1 | 3/2009 | Sinclair et al. |
| 2009/0083697 A1 | 3/2009 | Zhang et al. |
| 2009/0132232 A1 | 5/2009 | Trefler |
| 2009/0132996 A1 | 5/2009 | Eldridge et al. |
| 2009/0138844 A1 | 5/2009 | Halberstadt et al. |
| 2009/0150541 A1 | 6/2009 | Georgis |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0199123 A1 | 8/2009 | Albertson et al. |
| 2009/0228786 A1 | 9/2009 | Danton et al. |
| 2009/0276206 A1 | 11/2009 | Fitzpatrick et al. |
| 2009/0282384 A1 | 11/2009 | Keppler |
| 2009/0319948 A1 | 12/2009 | Stannard et al. |
| 2010/0011338 A1 | 1/2010 | Lewis |
| 2010/0088266 A1 | 4/2010 | Trefler |
| 2010/0107137 A1 | 4/2010 | Trefler et al. |
| 2010/0217737 A1 | 8/2010 | Shama |
| 2011/0066486 A1 | 3/2011 | Bassin et al. |

(56) References Cited

U.S. PATENT DOCUMENTS

| | | |
|---|---|---|
| 2011/0239113 A1 | 9/2011 | Hung et al. |
| 2011/0252305 A1 | 10/2011 | Tschani et al. |
| 2011/0264251 A1 | 10/2011 | Copello et al. |
| 2012/0041921 A1 | 2/2012 | Canaday et al. |
| 2012/0102420 A1* | 4/2012 | Fukahori .......... H04L 51/32 715/771 |
| 2012/0293558 A1 | 11/2012 | Dilts |
| 2013/0007267 A1 | 1/2013 | Khatutsky |
| 2013/0031455 A1* | 1/2013 | Griffiths .......... G06F 17/2247 715/230 |
| 2013/0047165 A1 | 2/2013 | Goetz et al. |
| 2013/0159904 A1 | 6/2013 | Kelappan et al. |
| 2013/0167245 A1 | 6/2013 | Birtwhistle et al. |
| 2013/0231970 A1 | 9/2013 | Trefler et al. |
| 2013/0254833 A1 | 9/2013 | Nicodemus et al. |
| 2013/0290249 A1 | 10/2013 | Merriman et al. |
| 2014/0019400 A1 | 1/2014 | Trefler et al. |
| 2014/0089819 A1 | 3/2014 | Andler et al. |
| 2014/0125577 A1 | 5/2014 | Hoang et al. |
| 2014/0137019 A1 | 5/2014 | Paulsen et al. |
| 2014/0277164 A1 | 9/2014 | Ramsay et al. |
| 2015/0058772 A1 | 2/2015 | Bator et al. |
| 2015/0089406 A1 | 3/2015 | Trefler et al. |
| 2015/0127736 A1 | 5/2015 | Clinton et al. |
| 2016/0041961 A1 | 2/2016 | Romney |
| 2016/0070560 A1 | 3/2016 | Chase |
| 2016/0085809 A1 | 3/2016 | de Castro Alves et al. |
| 2016/0098298 A1 | 4/2016 | Trefler et al. |
| 2016/0105370 A1 | 4/2016 | Mellor et al. |
| 2016/0337441 A1* | 11/2016 | Bloomquist .......... G06F 9/5061 |
| 2017/0013073 A1 | 1/2017 | Mendez et al. |
| 2017/0255341 A1 | 9/2017 | Trefler et al. |
| 2017/0351425 A1 | 12/2017 | D'angelo et al. |
| 2017/0357703 A1 | 12/2017 | Theimer et al. |
| 2018/0011678 A1 | 1/2018 | Shipper et al. |
| 2018/0024901 A1 | 1/2018 | Tankersley et al. |

FOREIGN PATENT DOCUMENTS

| | | |
|---|---|---|
| EP | 0 669 717 A1 | 8/1995 |
| EP | 0 996 916 A1 | 5/2000 |
| EP | 1 015 997 A2 | 7/2000 |
| EP | 1 019 807 A2 | 7/2000 |
| EP | 1 073 955 A1 | 2/2001 |
| EP | 1 073 992 A1 | 2/2001 |
| EP | 1 135 723 A1 | 9/2001 |
| EP | 1 163 604 A2 | 12/2001 |
| EP | 1 183 636 A1 | 3/2002 |
| EP | 1 196 882 A1 | 4/2002 |
| EP | 1 203 310 A1 | 5/2002 |
| EP | 1 208 482 A1 | 5/2002 |
| EP | 1 212 668 A2 | 6/2002 |
| EP | 1 240 592 A1 | 9/2002 |
| EP | 1 277 102 A2 | 1/2003 |
| EP | 1 277 119 A1 | 1/2003 |
| EP | 1 277 120 A1 | 1/2003 |
| EP | 1 277 153 A1 | 1/2003 |
| EP | 1 277 155 A1 | 1/2003 |
| EP | 1 277 329 A1 | 1/2003 |
| EP | 1 374 083 A1 | 1/2004 |
| EP | 1 382 030 A2 | 1/2004 |
| EP | 1 386 241 A1 | 2/2004 |
| EP | 1 393 172 A2 | 3/2004 |
| EP | 1 393 188 A1 | 3/2004 |
| EP | 1 402 336 A2 | 3/2004 |
| EP | 1 407 384 A1 | 4/2004 |
| EP | 1 430 396 A1 | 6/2004 |
| EP | 1 438 649 A1 | 7/2004 |
| EP | 1 438 654 A1 | 7/2004 |
| EP | 1 438 672 A1 | 7/2004 |
| EP | 1 483 685 A1 | 12/2004 |
| EP | 1 490 747 A1 | 12/2004 |
| EP | 1 490 809 A1 | 12/2004 |
| EP | 1 492 232 A1 | 12/2004 |
| EP | 1 782 183 A2 | 5/2007 |
| EP | 1 830 312 A1 | 9/2007 |
| EP | 1 840 803 A1 | 10/2007 |
| EP | 2 115 581 A1 | 11/2009 |
| WO | 98/38564 A2 | 9/1998 |
| WO | 98/40807 A2 | 9/1998 |
| WO | 99/05632 A1 | 2/1999 |
| WO | 99/45465 A1 | 9/1999 |
| WO | 99/50784 A1 | 10/1999 |
| WO | 00/33187 A1 | 6/2000 |
| WO | 00/33217 A1 | 6/2000 |
| WO | 00/33226 A1 | 6/2000 |
| WO | 00/33235 A1 | 6/2000 |
| WO | 00/33238 A2 | 6/2000 |
| WO | 00/52553 A2 | 9/2000 |
| WO | 00/52603 A1 | 9/2000 |
| WO | 00/67194 A2 | 11/2000 |
| WO | 01/40958 A1 | 6/2001 |
| WO | 01/75610 A1 | 10/2001 |
| WO | 01/75614 A1 | 10/2001 |
| WO | 01/75747 A1 | 10/2001 |
| WO | 01/75748 A1 | 10/2001 |
| WO | 01/76206 A1 | 10/2001 |
| WO | 01/77787 A2 | 10/2001 |
| WO | 01/79994 A2 | 10/2001 |
| WO | 02/21254 A2 | 3/2002 |
| WO | 0244947 | 6/2002 |
| WO | 02/056249 A2 | 7/2002 |
| WO | 02/080006 A1 | 10/2002 |
| WO | 02/080015 A1 | 10/2002 |
| WO | 02/082300 A1 | 10/2002 |
| WO | 02/084925 A2 | 10/2002 |
| WO | 02/088869 A2 | 11/2002 |
| WO | 02/091346 A1 | 11/2002 |
| WO | 02/101517 A1 | 12/2002 |
| WO | 02/103576 A1 | 12/2002 |
| WO | 03/021393 A2 | 3/2003 |
| WO | 03/029923 A2 | 4/2003 |
| WO | 03/029955 A1 | 4/2003 |
| WO | 03/030005 A1 | 4/2003 |
| WO | 03/030013 A1 | 4/2003 |
| WO | 03/030014 A1 | 4/2003 |
| WO | 03/058504 A1 | 7/2003 |
| WO | 03/069500 A1 | 8/2003 |
| WO | 03/071380 A2 | 8/2003 |
| WO | 03/071388 A2 | 8/2003 |
| WO | 03/073319 A2 | 9/2003 |
| WO | 03/077139 A1 | 9/2003 |
| WO | 03/085503 A1 | 10/2003 |
| WO | 03/085580 A1 | 10/2003 |
| WO | 2004/001613 A1 | 12/2003 |
| WO | 2004/003684 A2 | 1/2004 |
| WO | 2004/003766 A1 | 1/2004 |
| WO | 2004/003885 A1 | 1/2004 |
| WO | 2004/046882 A2 | 6/2004 |
| WO | 2004/061815 A1 | 7/2004 |
| WO | 2004/086197 A2 | 10/2004 |
| WO | 2004/086198 A2 | 10/2004 |
| WO | 2004/095207 A2 | 11/2004 |
| WO | 2004/095208 A2 | 11/2004 |
| WO | 2004/114147 A1 | 12/2004 |
| WO | 2005/001627 A2 | 1/2005 |
| WO | 2005/003888 A2 | 1/2005 |
| WO | 2005/010645 A2 | 2/2005 |
| WO | 2005/117549 A2 | 12/2005 |
| WO | 2006/081536 A2 | 8/2006 |
| WO | 2007/033922 A2 | 3/2007 |
| WO | 2008/109441 A1 | 9/2008 |
| WO | 2009/097384 A1 | 8/2009 |

OTHER PUBLICATIONS

U.S. Appl. No. 10/430,693, filed May 6, 2003, Methods and Apparatus for Digital Data Processing With Mutable Inheritance.

U.S. Appl. No. 10/547,014, filed Aug. 25, 2005, Classification Using Probability Estimate Re-Sampling.

U.S. Appl. No. 10/639,735, filed Aug. 12, 2003, Process/Viewer Interface.

(56) References Cited

OTHER PUBLICATIONS

U.S. Appl. No. 10/854,017, filed May 26, 2004, Integration of Declarative Rule-Based Processing With Procedural Programming.
U.S. Appl. No. 11/046,211, filed Jan. 28, 2005, Methods and Apparatus for Work Management and Routing.
U.S. Appl. No. 11/203,513, filed Aug. 12, 2005, Methods and Apparatus for Digital Data Processing With Mutable Inheritance.
U.S. Appl. No. 11/368,360, filed Mar. 3, 2006, Rules Base Systems and Methods With Circumstance Translation.
U.S. Appl. No. 11/396,415, filed Mar. 30, 2006, User Interface Methods and Apparatus for Rules Processing.
U.S. Appl. No. 11/681,269, filed Mar. 2, 2007, Proactive Performance Management for Multi-User Enterprise Software Systems.
U.S. Appl. No. 12/035,682, filed Feb. 22, 2008, User Interface Methods and Apparatus for Rules Processing.
U.S. Appl. No. 12/174,624, filed Jul. 16, 2008, Methods and Apparatus for Implementing Multilingual Software Applications.
U.S. Appl. No. 12/381,523, filed Mar. 12, 2009, Techniques for Dynamic Data Processing.
U.S. Appl. No. 12/386,959, filed Apr. 24, 2009, Method and Apparatus for Integrated Work Management.
U.S. Appl. No. 12/590,454, filed Nov. 6, 2009, Techniques for Content-Based Caching in a Computer System.
U.S. Appl. No. 12/619,215, filed Nov. 16, 2009, Rules Base Systems and Methods With Circumstance Translation.
U.S. Appl. No. 12/649,095, filed Dec. 29, 2009, Methods and Apparatus for Integration of Declarative Rule-Based Processing With Procedural Programming in a Digital Data-Processing Evironment.
U.S. Appl. No. 12/798,161, filed Mar. 30, 2010, System and Method for Creation and Modification of Software Applications.
U.S. Appl. No. 13/031,097, filed Feb. 18, 2011, Systems and Methods for Distributed Rules Processing.
U.S. Appl. No. 13/031,109, filed Feb. 18, 2011, Rule-Based User Interface Conformance Methods.
U.S. Appl. No. 13/341,411, filed Dec. 30, 2011, System and Method for Updating or Modifying an Application Without Manual Coding.
U.S. Appl. No. 13/536,079, filed Jun. 28, 2012, Proactive Performance Management for Multi-User Enterprise Software Systems.
U.S. Appl. No. 13/718,255, filed Dec. 18, 2012, Methods and Apparatus for Work Management and Routing.
U.S. Appl. No. 13/892,956, filed May 13, 2013, Content-Based Caching Using a Content Identifier at a Point in Time.
U.S. Appl. No. 13/897,763, filed May 20, 2013, System and Software for Creation and Modification of Software.
U.S. Appl. No. 13/907,287, filed May 31, 2013, Methods and Apparatus for Integration of Declarative Rule-Based Processing With Procedural Programming in a Digital Data-Processing Environment.
U.S. Appl. No. 14/527,348, filed Oct. 29, 2014, Systems and Methods for Distributed Rules Processing.
U.S. Appl. No. 14/588,084, filed Dec. 2, 2014, Methods and Apparatus for User Interface Optimization.
U.S. Appl. No. 14/597,207, filed Jan. 14, 2015, Methods and Apparatus for Integrated Work Management.
Extended European Search Report for Application No. 15189385.6, dated Dec. 17, 2015 (8 pages).
Eisenstein, et al., Adaptation in Automated User-Interface Design. IUI, 2000, pp. 74-81.
Simpson, Alan, et al., Access 97 for Windows 95/NT; 1997 SYBEX; 16 pages; USPTO STIC-EIC 2100/2400.
[No Author Listed] About the Integrated Work Manager (IWM). Pegasystems, Inc., Apr. 30, 2009, 3 pages, <http://pdn-dev/DevNet/PRPCv5/KB/TMP9ad01zurnf.asp>.
[No Author Listed] FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.
[No Author Listed] How SmartForms for Fair Blaze Advisor works, Fair Issac White Paper, http://www.FAIRISAAC.COM/, Oct. 31, 2005, 8 pages (website no longer active).
[No Author Listed] How to Configure and Customize the Universal Worklist. SAP Netweaver '04 and SAP Enterprise Portal 6.0. SAP AG. Version 1, May 2004, 65 pages. <http://www.erpgenie.com/sap/netweaver/ep/Configuring%20the %20UWL.pdf>.
[No Author Listed] How to configure the IWM/IAC gateway. Pegasystems, Inc., Apr. 30, 2009, 4 pages, <http://pdn-dev/DevNet/PRPCv5/KB/TMP9cf8fzurq4.asp>.
[No Author Listed] How to install the Integrated Work Manager (IWM). Pegasystems, Inc., Apr. 30, 2009, 6 pages, <http://pdn-dev/DevNet/PRPCv5/KB/TMP9br1ezurp8.asp>.
[No Author Listed] HP Integrated Lights-Out 2, User Guide, Part No. 394326-004, HP, Aug. 2006, 189 pages.
[No Author Listed] IP Prior Art Database, Options when returning work items in workflow management systems. IBM, IPCOM000027980D, 2004, 3 pages.
[No Author Listed] IP Prior Art Database, Staff Queries and Assignments in Workflow Systems. IBM, IPCOM000142382D, 2006, 4 pages.
[No Author Listed] IP Prior Art Database, Using work items to manage user interactions with adaptive business services. IBM TDB, IPCOM000015953D, 2003, 4 pages.
[No Author Listed] Integrating with External Systems, PegaRULES Process Commander 5.2. Process Commander 5.2 reference. Pegasystems Inc, Cambridge, MA, 2006, 103 pages <http://pdn.pega.com/ProductSupport/Products/PegaRULESProcessCommander/documents/PRPC/V5/502/iwes/PRPC52_Integrating_with_External_Systems.pdf>.
[No Author Listed] Localizing an Application, PegaRULES Process Commander. Process Commander 4.2 reference. Pegasystems Inc., Cambdrige, MA, 2006, 92 pages <http://pdn.pega.com/DevNet/PRPCv4/TechnologyPapers/documents/Localization0402.pdf>.
[No Author Listed] Oracle Universal Work Queue: Implementation Guide. Release 11i for Windows NT. Oracle Corporation. Jul. 2001, 136 pages. <http://docs.oracle.com/cd/A85964_01/acrobat/ieu115ug.pdf>.
[No Author Listed] Solaris 9 resource manager software. A technical white paper. Sun Microsystems, Inc., Palo Alto CA, 2002, 37 pages XP-002291080. Retrieved Aug. 3, 2004 from <http://wwws.sun.com/software/whitepapers/solaris9/srm.pdf>.
Bertino, E., and P. Foscoli, Index Organizations for Object-Oriented Database Systems, IEEE Trans. on Knowledge and Data Engineering, 7(2):193-209 (Apr. 1995).
Bierbaum, A., et al., VR juggler: A virtual platform for virtual reality application development. Proceedings of the Virtual Reality 2001 Conference, IEEE, 2001, 8 pages, <http://ieeexplore.ieee.org/stamp/stamp.jsp?tp=&arnumber-913774>.
Breiman, L., Bagging predictors, Machine Learning, vol. 24, No. 2, Aug. 31, 1996, pp. 123-140, Kluwer Academic Publishers, Netherlands.
Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.
Burleson, D., Adding behaviors to relational databases, DBMS, 8(10): 68(5) (Sep. 1995).
Busse, Ralph et al., Declarative and Procedural Object Oriented Views, IEEE, 1998, pp. 570-578, retrieved Mar. 22, 2007.
Buyya et al., Economic Models for Resource Management and Scheduling in Grid Computing, Concurrency and Computation: Practice and Experience, 2002, vol. 14, pp. 1507-1542.
Chan, T.W., and W. Hwang, Towards Integrating Logic, Object, Frame, and Production, Proc. Fourth Int'l. Conf. on Software Engineering and Knowledge Engineering, IEEE, pp. 463-469, Jun. 1992.
Cheng, Cheng-Chung; Smith, Stephen F.; A Constraint Satisfaction Approach to Makespan Scheduling, AIPS 1996 Proceedings, pp. 45-52 (1996).
Cheng, C.C. and Smith, Applying Constraint Satisfaction Techniques to Job Shop Scheduling, Annals of Operations Research, 70: 327-357 (1997).

(56) References Cited

OTHER PUBLICATIONS

Cochrane, Roberta et al., Integrating Triggers and Declarative Constraints in SQL Database Systems, pp. 567-578, Proceedings of the 22nd VLDB Conference Mumbai (Bombay), India, 1996, retrieved Mar. 22, 2007.
Damerau, F.J., Problems and some solutions in customization of natural language database front ends. ACM Transactions on Information Systems, vol. 3, No. 2, Apr. 1, 1985, pp. 165-184.
Danforth, S., Integrating Object and Relational Technologies, Proc. Sixteenth Annual Int'l. Computer Software and Applications Conf., IEEE Comput. Soc. Press, pp. 225-226, Sep. 1992 (Abstract).
Deelman, E., et al., Pegasus: A framework for mapping complex scientific workflows onto distributed systems, submitted to Scientific Programming, Jan. 2005. Pre-journal publication copy of article, 22 pages.
Deelman, E., et al., Pegasus: A framework for mapping complex scientific workflows onto distributed systems. Scientific Programming, 13, pp. 219-237, 2005.
DeMichiel, L.G., et al., Polyglot: Extensions to Relational Databases for Sharable Types and Functions in a Multi-Language Environment, Proc. Ninth Int'l Conf. on Data Engineering, IEEE, pp. 651-660, Apr. 1993.
Devarakonda et al., Predictability of process resource usage: A measurement-based study on UNIX. IEEE Transactions on Software Engineering. 1989;15(12):1579-1586.
Communication for European Patent Application No. 05755530.2, dated Sep. 6, 2007 (2 pages).
European Search Report for Application No. 05755530.2, dated Mar. 26, 2012 (3 Pages).
European Office Action dated Aug. 31, 2012 for Application No. 05755530.2 (4 Pages).
Communication for European Patent Application No. 07250844.3 enclosing European Search Report, dated Jul. 11, 2007 (6 pages).
Communication for European Patent Application No. 07250844.3, dated Mar. 28, 200 (1 page).
European Office Action dated Jul. 9, 2012 for Application No. 07250844.3 (8 Pages).
Communication for European Patent Application No. 07250848.4, dated Aug. 13, 2007 (EESR enclosed) (6 pages).
Communication for European Patent Application No. 07250848.4, dated May 29, 2008 (1 page).
Communication for European Patent Application No. 08731127.0, dated Oct. 13, 2009 (2 pages).
Extended European Search Report dated Oct. 29, 2012 for Application No. 08731127.0 (8 Pages).
Fayad, M.E., et al., Object-oriented application frameworks. Communications of the ACM, Oct. 1997, vol. 40, issue 10, pp. 32-38, <http://dl.acm.org/citation.cfm?id=262798>.
Francisco, S., et al. Rule-Based Web Page Generation, Proceedings of the 2nd Workshop on Adaptive Hypertext and Hypermedia, Hypertext'98, Jun. 20-24, 1998, 9 pages.
Gajos et al. SUPPLE: Automatically Generating User Interfaces. IUI 2004, 8 pages.
Hague, Darren, Universal Worklist with SAP Netweaver Portal. Galileo Press, 2008, pp. 11-31. <http://www.sap-hefte.de/download/dateien/1461/146_leseprobe.pdf>.
International Search Report and Written Opinion for Application No. PCT/GB2004/000677, dated Aug. 2, 2004 (15 pages).
International Search Report for Application No. PCT/US2004/020783, dated Nov. 8, 2005 (2 pages).
International Preliminary Report on Patentability for Application No. PCT/US2004/020783, dated Feb. 13, 2006 (6 pages).
International Search Report for PCT/US05/018599, dated May 15, 2007 (2 pages).
International Preliminary Report on Patentability for PCT/US2005/018599, dated Jun. 5, 2007 (10 pages).
U.S. Appl. No. 15/206,956, filed Jul 11, 2016, Selective Sharing for Collaborative Application Usage.

Ceri, S., et al., WIDE—A distributed architecture for workflow management. Proceedings. Seventh International Workshop on Research Issues in Data Engineering, IEEE, 1997, pp. 76-79, 1997.
Deelman, E., et al., Workflows and e-science: An overview of workflow system features and capabilities. Future Generation Computer Systems, May 2009, vol. 25, issue 5, pp. 528-540.
Kappel, G., et al., TriGSflow active object-oriented workflow management. Proceedings of the 28th Annual Hawaii International Conference on System Sciences. 1995, pp. 727-736.
Manolescu, D.A., et al., Dynamic object model and adaptive workflow. Proceedings of Metadata and Active Object-Model Pattern Mining Workshop co-located with OOPSLA, 1999, vol. 99, 19 pages.
Schulze, W., Fitting the workflow management facility into the object management architecture. Business Object Design and Implementation II. Springer London, 1998, pp. 109-117.
Surjanto, B., XML content management based on object-relational database technology. Proceedings of the First International Conference on Web Information Systems Engineering, IEEE, 2000, Jun. 19-21, 2000, vol. 1, pp. 70-79.
U.S. Appl. No. 15/602,880, filed May 23, 2017, Methods and Apparatus for User Interface Optimization.
U.S. Appl. No. 15/613,439, filed Jun. 5, 2017, Connecting Graphical Shapes Using Gestures.
Summons to Attend Oral Proceedings pursuant to rule 115(1) EPC, issued May 2, 2018 for Application No. 08731127.0 (8 pages).
International Search Report & Written Opinion for PCT/US06/03160, dated Jul. 21, 2008 (16 pages).
International Preliminary Report on Patentability for PCT/US06/03160, dated Apr. 9, 2009 (14 pages).
International Search Report for PCT/US08/55503, dated Jul. 28, 2008 (1 page).
International Preliminary Report on Patentability for PCT/US2008/055503, dated Sep. 17, 2009 (4 pages).
International Search Report & Written Opinion for PCT/US09/32341, dated Mar. 11, 2009 (14 pages).
International Preliminary Report on Patentability for PCT/US2009/032341, dated Aug. 12, 2010 (8 pages).
Johnson et al., Sharing and resuing rules-a feature comparison of five expert system shells. IEEE Expert, IEEE Services Center, New York, NY, vol. 9, No. 3, Jun. 1, 1994, pp. 3-17.
Jones et al., A user-centered approach to functions in excel. International Conference on Functional Programming, Uppsala, Jun. 30, 2003, pp. 1-12.
Kim, W., Object-Oriented Databases: Definition and Research Directions, IEEE Trans. on Knowledge and Data Engineering, vol. 2(3) pp. 327-341, Sep. 1990.
Kuhn, H.W., The Hungarian Method for the Assignment Problem, Naval Research Logistics Quarterly, 2 (1955), pp. 83-97.
Kuno, H.A., and E.A. Rundensteiner, Augmented Inherited Multi-Index Structure for Maintenance of Materialized Path Query Views, Proc. Sixth Int'l. Workshop on Research Issues in Data Engineering, pp. 128-137, Feb. 1996.
LaRue, J., Leveraging Integration and Workflow. Integrated Solutions, Accounting Today, SourceMedia, Aug. 2006, pp. 18-19.
Lippert, Eric, Fabulous Adventures in Coding: Metaprogramming, Toast and the Future of Development Tools, Microsoft.com Blog, MSDN Home, published Mar. 4, 2004, 6 pgs.
Mandal, et al., Integrating existing scientific workflow systems: The kepler/pegasus example. USC Information Sciences Institute, 2007, 8 pages.
Manghi, Paolo, et. al., Hybrid Applications Over XML: Integrating the Procedural and Declarative Approaches, 2002 ACM, pp. 1-6. Retrieved Mar. 22, 2007.
Markiewicz, M.E., et al., Object oriented framework development. ACM, 2001, 13 pages, <http://dl.acm.org/citation.cfm?id=372771>.
Markowitz, V.M., and A. Shoshani, Object Queries over Relational Databases: Language, Implementation, and Applications, IEEE Xplore, pp. 71-80, Apr. 1993.
Marmel, Elaine, Microsoft Office Project 2007 Bible, ISBN 0470009926, Wiley Publishing, Inc., 2007, 961 pages.

(56) References Cited

OTHER PUBLICATIONS

Maryanski, F., et al., The Data Model Compiler: A Tool for Generating Object-Oriented Database Systems, 1986 Int'l. Workshop on Object-Oriented Database Systems, IEEE, 73-84 (1986).
McConnell, Steven C., Brooks' Law Repealed, IEEE Software, pp. 6-9, Nov./Dec. 1999.
Mecca, G., et al., Cut and Paste, ACM, pp. 1-25 and Appendix I-IV (Jun. 1999). Retrieved Mar. 22, 2007.
Mitchell, T.M., Machine Learning, Chapter 3, 1997, McGraw-Hill, pp. 52-80.
Mitchell, T.M., Machine Learning, Chapter 6, 1997, McGraw-Hill, pp. 154-200.
Morizet-Mahoudeaux, P., A Hierarchy of Network-Based Knowledge Systems, IEEE Trans. on Systems, Man, and Cybernetics, vol. 21(5), pp. 1184-1191, Sep./Oct. 1991.
Pientka, B., et al., Programming with proofs and explicit contexts. International Symposium on Principles and Practice of Declarative Programming, ACM, 2008, pp. 163-173, <http://delivery.acm.org/10.1145/1390000/1389469/p163-pientka.pdf?>.
Reinersten, Don, Is It Always a Bad Idea to Add Resources to a Late Project?, Oct. 30, 2000. Electronic Design. vol. 48, Issue 22, p. 70.
Riccuiti, M., Oracle 8.0 on the way with objects: upgrade will also build in multidimensional engine. InfoWorld. Sep. 25, 1995; 17(39):16.
Richner, T., et al., Recovering high-level views of object-oriented applications from static and dynamic information. IEEE, 1999, 10 pages, <http://ieeexplore.ieee.org/stamp/stamp.jsp?tp=&arnumber=792487>.
Salvini, S., and M.H. Williams, Knowledge Management for Expert Systems, IEEE Colloquium on 'Knowledge Engineering', 3 pages, May 1990.
Schiefelbein, Mark, A Backbase Ajax Front-end for J2EE Applications, Internet Article, dev2dev <http://dev2dev.bea.com/1pt/a/433>, Aug. 29, 2005, 16 pages.

Sellis, T., et al., Coupling Production Systems and Database Systems: A Homogeneous Approach, IEEE Trans. on Knowledge and Data Engineering, vol. 5(2), pp. 240-256, Apr. 1993.
Shyy Y.M., and S.Y.W. Su, Refinement Preservation for Rule Selection in Active Object-Oriented Database Systems, Proc. Fourth Int'l. Workshop on Research Issues in Data Engineering, pp. 115-123, Feb. 1994.
Singh, G., et al., Workflow task clustering for best effort systems with Pegasus, Pegasus, 2008, 8 pages.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
Srinivasan, V., et al., Object persistence in object-oriented applications. IBM Systems Journal, 1997, vol. 36, issue 1, pp. 66-87, <http://ieeexplore.ieee.org/stamp/stamp.jsp?tp=&arnumber=5387186>.
Stonebraker, M., The Integration of Rule Systems and Database Systems, IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Thuraisingham, "From Rules to Frames and Frames to Rules," AI Expert, pp. 31-39, Oct. 1989.
Vranes, S., et al., Integrating Multiple Paradigms within the Blackboard Framework, IEEE Transactions on Software Engineering, vol. 21, No. 3, Mar. 1995, pp. 244-262.
Yang, Bibo; Geunes, Joseph; O'Brien, William J.; Resource-Constrained Project Scheduling: Past Work and New Directions, Apr. 2001, 28 pages, Research Report 2001-6, Department of Industrial and Systems Engineering, University of Florida.
U.S. Appl. No. 14/879,679, filed Oct. 9, 2015, Event Processing With Enhanced Throughput.
U.S. Appl. No. 14/928,085, filed Oct. 30, 2015, System and Method for Updating or Modifying an Application Without Manual Coding.

* cited by examiner

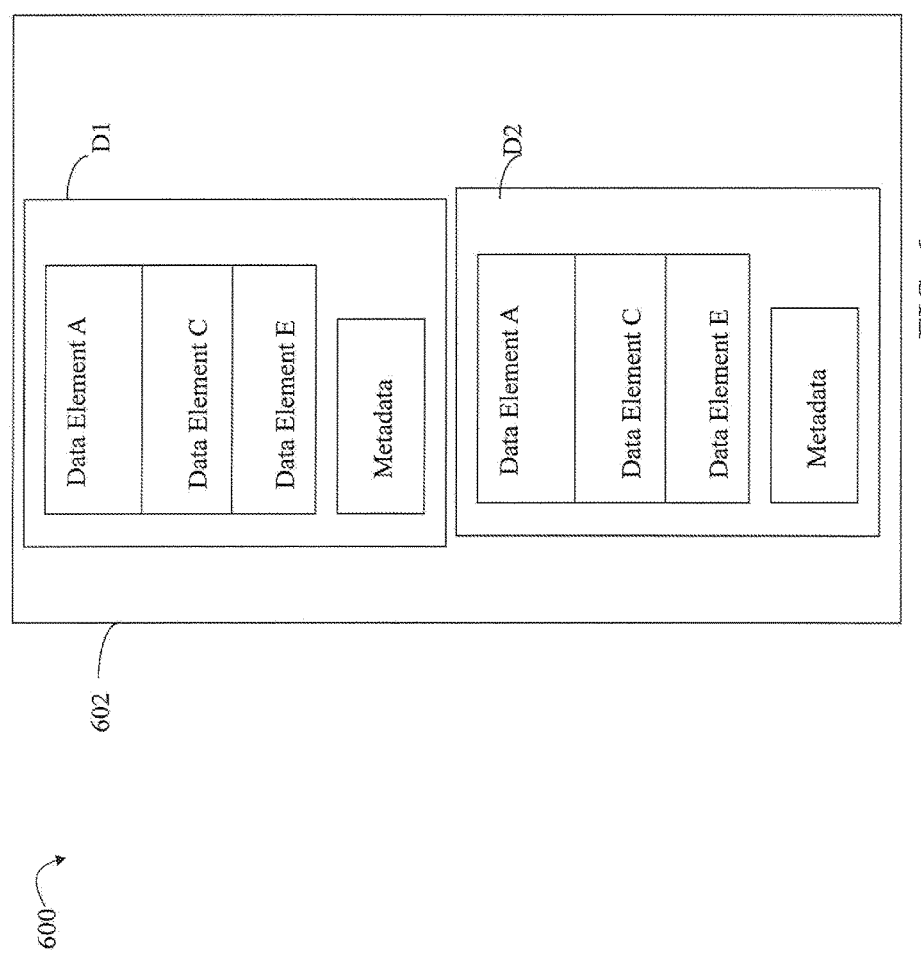

TECHNIQUES FOR DYNAMIC DATA PROCESSING

CROSS REFERENCE TO RELATED APPLICATIONS

This application is a continuation of U.S. patent application Ser. No. 12/381,523 (pending), filed on Mar. 12, 2009, entitled TECHNIQUES DYNAMIC DATA PROCESSING, which is incorporated by reference herein.

BACKGROUND

Technical Field

This application relates generally to techniques for use in a computer system in connection with data structures.

Description of Related Art

A data structure may be characterized as a representation of data having a particular organization. The data structure may be a collection of data items stored in a particular way where the data items may be of varying types. An example of a data structure is a linked list of list elements. Each list element may include one or more data items. Each list element is connected or mapped to another list element using pointers or addresses, array indices, and the like, depending on the way in which the linked list is implemented: Another example of a data structure is a record made of an aggregated collection of data items or fields.

Computer programs may be written in a variety of different programming languages which provide different ways of defining a data structure. A programming language may specify a syntax used to express the layout or definition of the data structure. For example, a programming language may be used to define a record layout by specifying the particular data items included in a record instance. When creating an instance of the data structure, storage for the structure may be allocated to include all data items specified in the layout as coded. When an instance of the data structure is referenced, all data items of the instance may be loaded into memory.

When specifying the data items included in the data structure, there may be a set of common or general items used for each instance of the data structure. Each instance of the data structure may also include additional information that may vary with each instance. For example, a data structure may be defined for an insurance claim. There may be a set of common data items relevant to all types of possible insurance claims such as, for example, based on a home, automobile, and the like. Additionally, there may be data items which vary with the type of insurance claim. Depending on the particular implementation, different techniques may be used to define the data structure. The data structure may be defined to include all possible data items that may be needed for all possible claim types. For example, if 3 data items are needed for an automobile claim and 5 data items (different from the previous 3 data items) are needed for a homeowner's claim, the data structure definition may include data items for each of the foregoing 8 data items as well as any common items. The foregoing has drawbacks including the additional memory allocated for each instance of the data structure even though not all data items are used.

A programming language may include a language construct to store different data items in shared memory. For example, using the C programming language, a structure may be defined to include a union of data items where only one item in the union can be used at any time. A union of possible alternative data items may be defined. All data items of the union are associated with a same shared memory location which may have a size associated with the largest of the data items.

As yet another alternative, an inheritance model may be defined using classes. A first class may be defined as a superclass or parent class for the common data items. Subclasses or child classes of the parent class may also be defined. With respect to the exemplary insurance claims, a parent class may be defined to include the data items common to all types of insurance claims. For the superclass or parent class, subclasses or child classes may be defined to include the additional data items of information that may vary with each type of claim. For example, subclasses for home and auto may be defined within the superclass insurance claim. Such inheritance models may require a complex class hierarchy and class definitions to account for the possible variations in structures. Furthermore, when instantiating an instance of an object of one of the subclasses, storage may be allocated for the common data items (of the superclass) and also the additional data items of the subclass. When an instance of an object of the subclass is created, storage may be allocated for all common data items of the parent class and the additional data items for that subclass.

SUMMARY OF THE INVENTION

In accordance with one aspect of the invention is a computer-implemented method for processing an instance of a data structure. At a first point in time, a request to create an instance of a data structure is received. The data structure comprises one or more data elements, wherein at least one of the data elements is a dynamic data element that uses an association specifying how to access data for the dynamic data element in accordance with criteria and the criteria is evaluated using a current context determined at a point in time. In response to receiving the request, first processing is performed including allocating storage for any data elements in the data structure which are not dynamic data elements. The first processing does not include processing to access data for the dynamic data element using the association unless it is determined that the dynamic data element is referenced at the first point in time in connection with an operation using the dynamic data element. The dynamic data element is referenced at a second point in time in connection with an operation performed at the second point in time. In response to the referencing, second processing is performed where the second processing includes evaluating the criteria at the second point in time using a current context determined at the second point in time, and retrieving data for said dynamic data element in accordance with the current context at the second point in time. The criteria may use one or more parameters which are evaluated in accordance with a current context at each point in time when said dynamic data element is referenced. At least one of the parameters may be a value of another data element in the instance of the data structure. At least one of the parameters may be based on a date associated with a time at which the dynamic data element is referenced. Data for the dynamic data element may be stored in a persistent data store. The data may be retrieved from the persistent data store to create the instance of the data structure in a session cache for at least one client. A different session cache may be used for each client. A copy of the instance may be stored in a global cache used by a plurality of client sessions. Each of the plurality of client sessions may correspond to a different client connected to a server and the global cache may be used as a server cache by said plurality of client sessions. The data structure may be an object in an object-oriented environment. The object may be an instance of a class, and each data element associated with said object may represent any of an attribute and property of the class. A definition for the data structure may be included in a definition of a class, said class being included in a class structure. The dynamic data element may be included in a second class definition that is defined at a same level in the class structure as said class. The step of evaluating the criteria at said second point in time may result in identifying an existing instance of a data entity which is retrieved from a data store by said retrieving. The association may be an explicit association specifying a single data access description identifying how to retrieve said data for said dynamic data element in accordance with said current context at said second point in time. The association may be a conditional association including a plurality of conditions and corresponding data access descriptions, wherein if one of said conditions evaluates to true, a selected one of the corresponding data access descriptions is used to retrieve data for the dynamic data element. The association may be a derived association including a single data access description identifying how to retrieve data for said dynamic data element in accordance with the current context at the second point in time. The derived association may include one or more values which are further processed at the second point in time in order to retrieve data for the dynamic data element. The derived association may include a plurality of data values which are further processed in accordance with an operation identified in the derived association. The operation may include performing any of a mathematical operation and a string operation on at least a portion of said plurality of data values. The operation may use any of forward chaining and backward chaining inference methods. The association may include a data access description that identifies how to retrieve the data for the dynamic data element, wherein the data access description includes an item that depends upon at least one of the criteria. The item may be a key included in a database query and the key may have a value determined in accordance with a parameter included in the criteria. The parameter may have a value determined in accordance with a current context at a point in time when the dynamic data element is referenced. The data access description may identify at least one of a database to be accessed in connection with said retrieving, a location of a database, and a protocol. The association may be included in metadata for the dynamic data element. As a result of performing the second processing, a portion of the metadata may be updated. The data structure may represent a work item in a business process. The business process may be managed by any of a public and private entity. The business process may be a process in one of a plurality of areas where the plurality of areas includes telecommunications, government, insurance, insurance claims processing, insurance application renewal, insurance underwriting, finance, loan processing, healthcare, automotive, retail product sales, clothing, marketing, computer services, food and restaurant industry, consumer sales and services, purchasing a product or service, returning a previously purchased item, submitting a complaint or problem report requiring resolution, ensuring compliance with government rules and regulations, and inventory update and purchasing. The second processing may include allocating storage for the dynamic data element. In connection with the second processing, the data for the dynamic data element may correspond to a first-data instance, and, if the first data instance is already loaded into memory, the first data instance already loaded into memory is used in connection with the retrieving, and otherwise additional processing is performed to load the first data instance into memory. The dynamic data element may be referenced at the first point in time and the criteria may be evaluated in accordance with a current context at the first point in time to access data for the dynamic data element. The first processing may include determining that data for said dynamic data element corresponds to a first data instance of a first class or type. The second processing may determine that data for the dynamic data element corresponds to a second data instance of the first class or type. Referencing the dynamic data element may be performed in connection with one of a plurality of trigger events, where the plurality of trigger events include any of displaying a user interface with the dynamic data element contained therein, performing rule processing, determining that data for said dynamic data element is not already loaded into virtual memory, determining that data for said dynamic data element is not already loaded into a session cache or a server cache, and determining that a cached copy of data for said dynamic data element is no longer valid in accordance with an expiration time. The association may be included in a declarative page, and the declarative page may be used in connection with said referencing to retrieve the data for the dynamic data element. The declarative page may be referenced during processing of the dynamic data element in connection with a workflow process. The declarative page may be updated to change how data for the dynamic data element is accessed, wherein the change includes using at least one of: a different criterion, a different condition, a different parameter, and a different data access description. The declarative page may be defined in a declarative page definition, and the workflow process may be defined in a workflow process definition that is separate from the declarative page definition. A server may receive the request from a client to create an instance of the data structure, and the server may perform said first processing and said second processing. At least one of the data structure and the dynamic data element may be a database table. One of the data structure and the dynamic data element may be an object and another of the data structure and the dynamic data element may be a database table. The database table may be in a normalized form.

In accordance with another aspect of the invention is a computer-implemented method for processing an instance of a data structure. At a first point in time, a request to process an instance of a data structure is received where the data structure comprises one or more data elements and wherein at least one of the data elements is a dynamic data element that uses an association specifying how to access data for the dynamic data element in accordance with criteria. The criteria is evaluated using a current context determined at a point in time. In response to receiving the request, first processing is performed where the first processing includes determining whether the dynamic data element is referenced at the first point in time. If the dynamic data element is referenced at the first point in time, the criteria is evaluated at the first point in time using a current context determined at the first point in time, and data for the dynamic data element is retrieved in accordance with a current context determined at the first point in time. If the dynamic data element is not referenced at the first point in time, said evaluating and said retrieving are not performed. The criteria may be evaluated to determine a location from which data for the dynamic data element is retrieved. The criteria may include a first condition which, when having a first value as a result of said evaluating, specifies that the data for the dynamic data element is retrieved from a first location, and which, when having a second value as a result of said evaluating, specifies that the data for the dynamic data element is retrieved from a second location different from the first location. The request may be made in connection with performing a business process. The business process may be performed in connection with at least one of insurance, finance, healthcare, automotive, food and restaurant industry, sales and services for consumer goods and services, purchasing a product, purchasing a service, returning a previously purchased item, submitting a complaint requiring resolution, inventory update, insurance claim processing, insurance application renewal, insurance underwriting, and loan processing.

In accordance with another aspect of the invention is a computer readable medium comprising executable code stored thereon for processing an instance of a data structure. The computer readable medium comprises executable code for: receiving, at a first point in time, a request to create an instance of a data structure, the data structure comprising one or more data elements, wherein at least one of the data elements is a dynamic data element that uses an association specifying how to access data for the dynamic data element in accordance with criteria, the criteria being evaluated using a current context determined at a point in time; in response to receiving the request, performing first processing including allocating storage for any data elements in the data structure which are not dynamic data elements, wherein the first processing does not include processing to access data for the dynamic data element using the association unless it is determined that the dynamic data element is referenced at the first point in time in connection with an operation using the dynamic data element; referencing the dynamic data element at a second point in time in connection with an operation performed at the second point in time; and in response to said referencing, performing second processing, the second processing including evaluating the criteria at the second point in time using a current context determined at the second point in time, and retrieving data for the dynamic data element in accordance with the current context at the second point in time.

In accordance with another aspect of the invention is a computer readable medium for processing an instance of a data structure, the computer readable medium comprising executable code for: receiving, at a first point in time, a request to process an instance of a data structure, the data structure comprising one or more data elements, wherein at least one of the data elements is a dynamic data element that uses an association specifying how to access data for the dynamic data element in accordance with criteria, the criteria being evaluated using a current context determined at a point in time; and in response to receiving the request, performing first processing, the first processing including determining whether the dynamic data element is referenced at the first point in time, and, if the dynamic data element is referenced at the first point in time, evaluating the criteria at the first point in time using a current context determined at the first point in time, and retrieving data for the dynamic data element in accordance with a current context determined at the first point in time, wherein if the dynamic data element is not referenced at the first point in time, said evaluating and said retrieving are not performed.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6, 7, 8, 9, and 10 illustrate a first set of examples of dynamic data elements and associations in accordance with techniques described herein;

DETAILED DESCRIPTION OF
EMBODIMENT(S)

Figure 1:
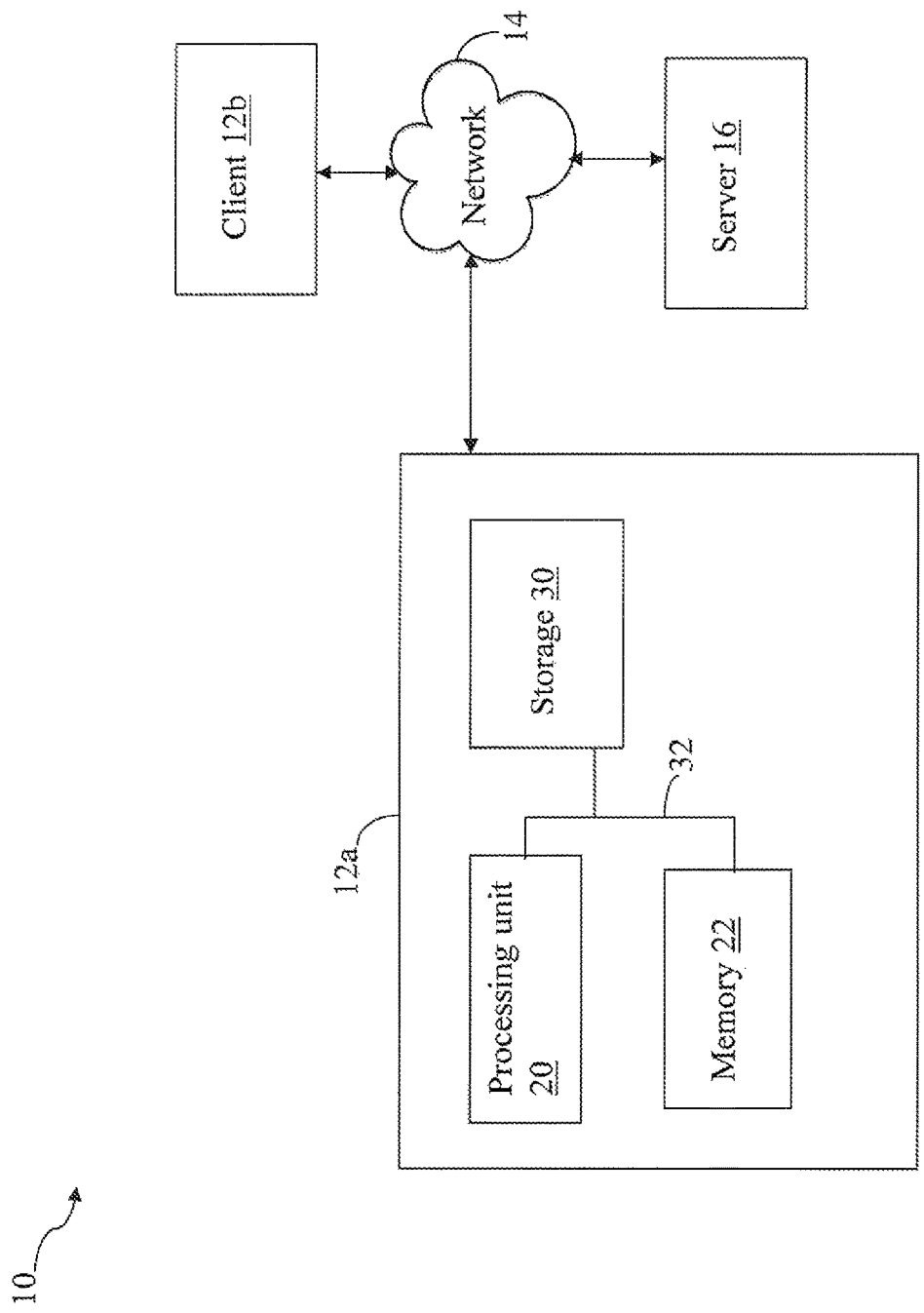
FIG. 1 is an example of an embodiment of a system that may utilize the techniques described herein.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. As described below in more detail, one embodiment of the techniques herein may be implemented using object-oriented programming and/or runtime environments.

Included in FIG. 1 are client computers 12a, 12b, a network 14, and a server 16. The computers 12a, 12b and server 16 may include a standard, commercially-available computer or a special-purpose computer that may be used to execute one or more program modules. Described in more detail in following paragraphs and figures is processing that may be performed by program modules executed by the computers 12a, 12b and server 16 in connection with using the techniques described herein. It will be appreciated by those skilled in the art that although the computers 12a, 12b and 14 are shown in the example as communicating in a networked environment, the foregoing components may communicate with other components utilizing different communication mediums. For example, the computer 12a may communicate with one or more components utilizing a network connection, and/or other type of link known in the art including, but not limited to, the Internet, an intranet, or other wireless and/or hardwired connection(s).

As illustrated in FIG. 1, the computer 12a may include one or more processing units 20, memory 22, storage 30, and a system bus 32 used to facilitate communications between the components of the computer 12a, as well, as other components not illustrated in FIG. 1. The computer 12b and server 16 may also include components similar to those as illustrated and included in the computer 12a.

Depending on the configuration and type of computer 12a, memory 22 may be volatile (such as RAM), non-volatile (such as ROM, flash memory, etc.) or some combination of the two. Additionally, the computer 12a may also have additional storage (removable and/or non-removable) including, but not limited to, USB devices, magnetic or optical disks, or tape. Such additional storage is illustrated in FIG. 1 by storage 30. The storage 30 may include one or more removable and non-removable storage devices having associated computer-readable media that may be utilized by the computer 12a. The storage 30 in one embodiment may include a hard disk and/or CD-ROM drive. By way of example, and not limitation, memory 22 and storage 30 are examples of computer readable media. Computer readable media includes volatile and nonvolatile, removable and non-removable media implemented in any method or technology for storage of information such as computer readable instructions, data structures, program modules or other data. Computer readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer 12a. The foregoing media typically embodies computer readable instructions, data structures, program modules or other data.

The computer 12a may operate in a networked environment as illustrated in FIG. 1 using logical connections to remote computers, such as the server 16, through a network. One or more software modules and/or data files may be included in storage 30 of the computer 12a. During operation of the computer 12a, one or more of these modules included in the storage 30 may also reside in a portion of memory 22, such as, for example, RAM for controlling the operation of the computer 12a.

The server 16 may represent a server computer system connected to the network 14. The server computer system may include software modules to service requests and one or more processors, memory, storage, and the like, similar to that as described herein with respect to the computer 12a. As will be described in more detail in following paragraphs, the techniques herein may be used in an embodiment in which the computers 12a and 12b are client computers which communicate with the server 16 over the network 14. The computers 12a, 12b may include a web browser or other software for use in connection with rendering a user interface (UI) such as may be used in connection with viewing and performing other operations on data requested, and received from, the server 16. Each of the clients 12a, 12b may operate independently of each other in connection with performing different operations on data obtained from the server 16. The server 16 may utilize the techniques described herein in connection with performing processing and operations on instances of data structures, such as objects, as may be created and/or retrieved from a database on the server 16 in response to a request from one of the clients 12a, 12b.

Described in more detail herein is an embodiment utilizing a rule based system in an object-oriented environment. Although reference may be made herein to object-oriented systems, the techniques herein may be utilized in connection with other environments as will be appreciated by those skilled in the art. Furthermore, reference may be made herein to a particular field of use as related to defining applications for business process management although the techniques herein are not limited to use with data structures for these particular types of applications. In an object-oriented environment, developers may perform application development by designing a class structure defining work and data characteristics for an application. Rules may also be created and used at appropriate places in the class hierarchy to define business policies, work flow practices and operations for each type of work, and the like. A rule based system may be used as an alternative to having a developer write source code for a new application. A rule resolution process may utilize different types of information (e.g., class hierarchy, inheritance, versioning, temporal data, specific circumstance, security etc.) to find the correct rules to apply for a particular object in a specific context (e.g. particular user settings, system settings, business criteria etc.). Rules may be generally characterized by category (e.g. declarative rules, decision rules, process rules, integration rules, data or system rules etc.) and form the business logic that define a behavioral aspect of the application. For example, one or more process rules in an application may define a business work flow or operation that references other types of rules such as declarative rules, user interface rules (defining the content and the configuration of the user interface for the application), and the like. Declarative rules state a relation between a set of variables. When there is a change to one of the variables in a declarative rule, updates to other variables referenced in that rule, as well as any other variables participating in other rules that may be in the same dependency network may be performed in order to maintain the relations specified in the rules. Declarative rules and associated processing are described, for example, in U.S. patent application Ser. No. 10/854,017 filed on May 26, 2004, entitled "Methods and Apparatus for Integration of Declarative Rule-based Processing with Procedural Processing in a Digital Data-Processing Environment", Trefler et al., (also referred to as the "PRODEX patent application"), which is incorporated by reference herein. A rule set may refer to a collection of rules and one or more rule sets may define an application. New applications may be built by creating any needed class definitions and new rules. The new rules, alone or in combination with existing rules, may be grouped into rule sets used by the application.

Figure 2:
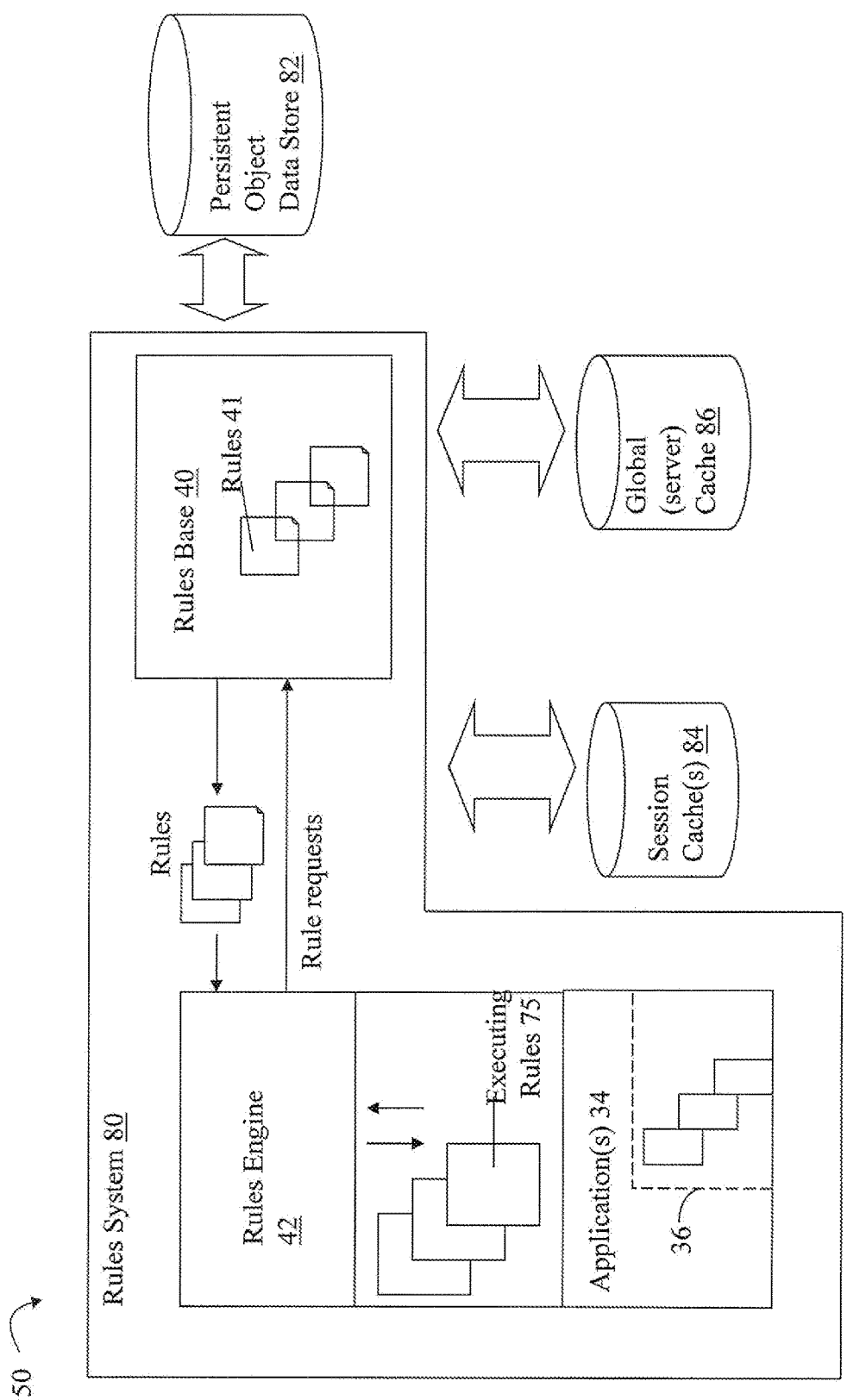
FIG. 2 is an example of an embodiment of components that may be included in a server in the system of FIG. 1.

Referring to FIG. 2, shown is an example of components that may be included in an embodiment of the server 16. The example 50 includes rules base 40 constructed and accessed in the conventional manner known in the art of rules bases. The digitally encoded rules 41 that it contains are likewise formatted and stored in the conventional manner known in the art. An example of the structure, operation and use of the rules base 40 and rules 41 is provided in commonly assigned U.S. Pat. No. 5,826,250, entitled "Rules Bases and Methods of Access Thereof" and U.S. patent application Ser. No. 11/368,360, filed Mar. 3, 2006, entitled "Rules Base Systems and Methods with Circumstance Translation," the teachings of both of which are incorporated herein by reference.

The server 50 also includes rules engine 42 of the type conventionally known in the art for use in processing rules, e.g., retrieved from a rules base 40, in order to respond to (or otherwise handle) events signaled to and/or detected by the engine 42. Moreover, the illustrated server 50 is shown as including both a rules engine and rules base. However, in other embodiments, multiple servers may be provided which may (or may not) include such co-housed rules engines and rules bases.

Illustrated applications 34, also executing on the rules engine 42, comprise a set of rules 36 defining the user interface(s) and other aspects of one or more software applications written, tested and revised by developers and executed by users. By way of non-limiting example, such software applications 34 can be multi-user enterprise software systems (e.g., business process management applications), and the like. Moreover, the applications 34 can comprise one or more components, modules, systems, and so forth (collectively, "components"), as is common in the art. Though, in the illustrated embodiment, applications 34 are defined by rules 36 that are executed on engine 42, in other embodiments the applications 34 may be defined and/or executed otherwise. It will be appreciated that in the case of rule based applications, a single rule (e.g. a user interface rule) can be unique to a specific application or it can be a generalized rule that is shared by multiple applications. For example, applications 34 may include a student loan processing application as well as a credit card dispute application where the rules are modeled or built in hierarchical classes following an object-oriented paradigm (similar to those used with language such as Java). Although the rules defining those applications may differ, they may utilize a common rule or set of rules for various operations such as, for example, to define various UI screens (e.g., showing biographical information, such as Name, Contact Information, Income, Gender etc.) and/or processing sequences (e.g., payment or pay-off calculations) that can be inherited or otherwise specified for use by multiple applications.

In operation, during execution of applications 34, rules engine 42 responds to signaling (e.g., received from the client devices such as in the form of HTTP requests), or otherwise, processes rules 36 defining the applications 34. As mentioned above, the rules that define an application may include user interface rules for generating user interfaces (or component thereof) for transmittal to client devices for display (e.g., as static web pages) and/or execution (e.g., as Java scripts, Active X objects, or otherwise) by their respective browsers. It will be appreciated that although, in the illustrated embodiment, user interface rules (and other rules 36) are executed on the server for transmittal to the client devices, in other embodiments, those rules may be executed, instead or in addition, on the client devices directly. An example of a system and method that, among other things, can be used to process rules to generate a user interface is disclosed in the commonly assigned U.S. patent application Ser. No. 11/396,415, filed Mar. 30, 2006, entitled "User Interface Methods and Apparatus for Rules Processing," and U.S. patent application Ser. No. 12/035,682, filed Feb. 22, 2008, entitled "User Interface Methods and Apparatus for Rules Processing", both of which are incorporated herein by reference.

In the illustrated embodiment, rules engine 42 may be implemented in Java and may use an XML data structure. Therefore, the rules stored in the rules base 40 as metadata may be translated into Java in order for the processor of the server to execute the functionality defined by such rules. The first time that a particular rule is implicated (for a specific context as defined above), its metadata is extracted from the rules base 40 as XML, source code for a unique Java implementation class is generated from the XML, compiled, loaded into a Java cache and then executed. All subsequent references to the same rule (for the same context) will simply reuse the Java implementation class that has already been generated by simply executing the class file previously loaded into Java cache. Furthermore, in order to improve performance, the rules engine 42 generates a single Java implementation class for a rule which references other rules and, therefore, contains generated Java code for such referenced rules. This is illustrated, by way of example, in FIG. 3 described below. It will be appreciated that although in the illustrated embodiment, the rules engine 42 is implemented in Java and utilizes an XML data structure, other embodiments of the rules engine may be implemented in any other programming language and utilize other data formats.

With reference to FIG. 2 and to the discussion above, when the rules engine 42 is processing the one or more implicated rules 36 (as described above), it extracts the metadata for such rules (e.g., as an XML file) and converts them into source files, e.g., JSP, Servlet etc. These source files are compiled and executed to perform the particular operation. The client request may cause the server, for example, to generate the markup language stream for the requested web page. The client request may be, for example, to view information causing retrieval of the information from a database on the server and then return of the retrieved information, or portions thereof, to the client. Communications between the client(s) and server may be in accordance with appropriate protocols. For example, client-server communication may be in the form of HTTP requests and responses. Information returned to the client may be in any suitable format, such as XML, which can be understood and processed by the client.

Also included in FIG. 2 are a persistent data store 82, one or more session caches 84 and a global (server) cache 86. In one embodiment, objects, or more generally data structures used in connection with techniques described herein, may be stored in a persistent object data store 82, such as a database. The server may manage a session cache 84 for each client session. The server may also maintain a global or server-wide cache 86 of data for all client sessions of the server. A client (e.g., 12a from FIG. 3) may perform an operation resulting in a request being sent to the server. The server may perform processing in accordance with the request which may include retrieving one or more objects from the data store 82. The retrieved objects may be stored in the session cache for the client and/or in the global cache 86 depending on the particular object and associated rule(s). The session cache for a client may include a copy of data objects retrieved from the data store 82 during the client session. Operations performed during the client session may be performed with respect to the copy of data objects included in the client session cache. At a later point in time, a command may be issued to commit the copy of data objects from the client session cache to the persistent object data store 82 in order to update the data store 82. Techniques described in following paragraphs herein may be used in connection with maintaining and management of data objects in the session cache(s) 84 and/or the global cache 86 of a server. In one embodiment, objects in the data store 82 may be stored in database tables from which XML representations may be constructed. The session caches 84 and global cache 86 may include the XML representations for the data objects. Conversion is performed between the database or other format of data store 82 and XML or other format of the caches 84 and 86. The PRODEX patent application describes in more detail the XML and persistent data store representations that may be used in an embodiment. It should be noted that loading and/or saving of objects to persistent storage may be performed implicitly (e.g., where the system loads and/or updates objects in accordance with rules such as to update one variable dependent on another which has changed) or explicitly (e.g., programmer is responsible for indicating when to load and save objects).

In one embodiment in which the rule based system of the server is used for business process management applications, the objects included in data store 82 and caches 84, 86 may include work objects representing a unit recording processed work. For example, the system of FIG. 2 may be used for insurance application development where the work objects may represent different types of requests for insurance coverage, various insurance claims, and the like. As generally described in more detail below, the work object may be represented by a class and properties of the class may be used to capture the attributes, methods and other data elements associated with the work object.

Figure 3:
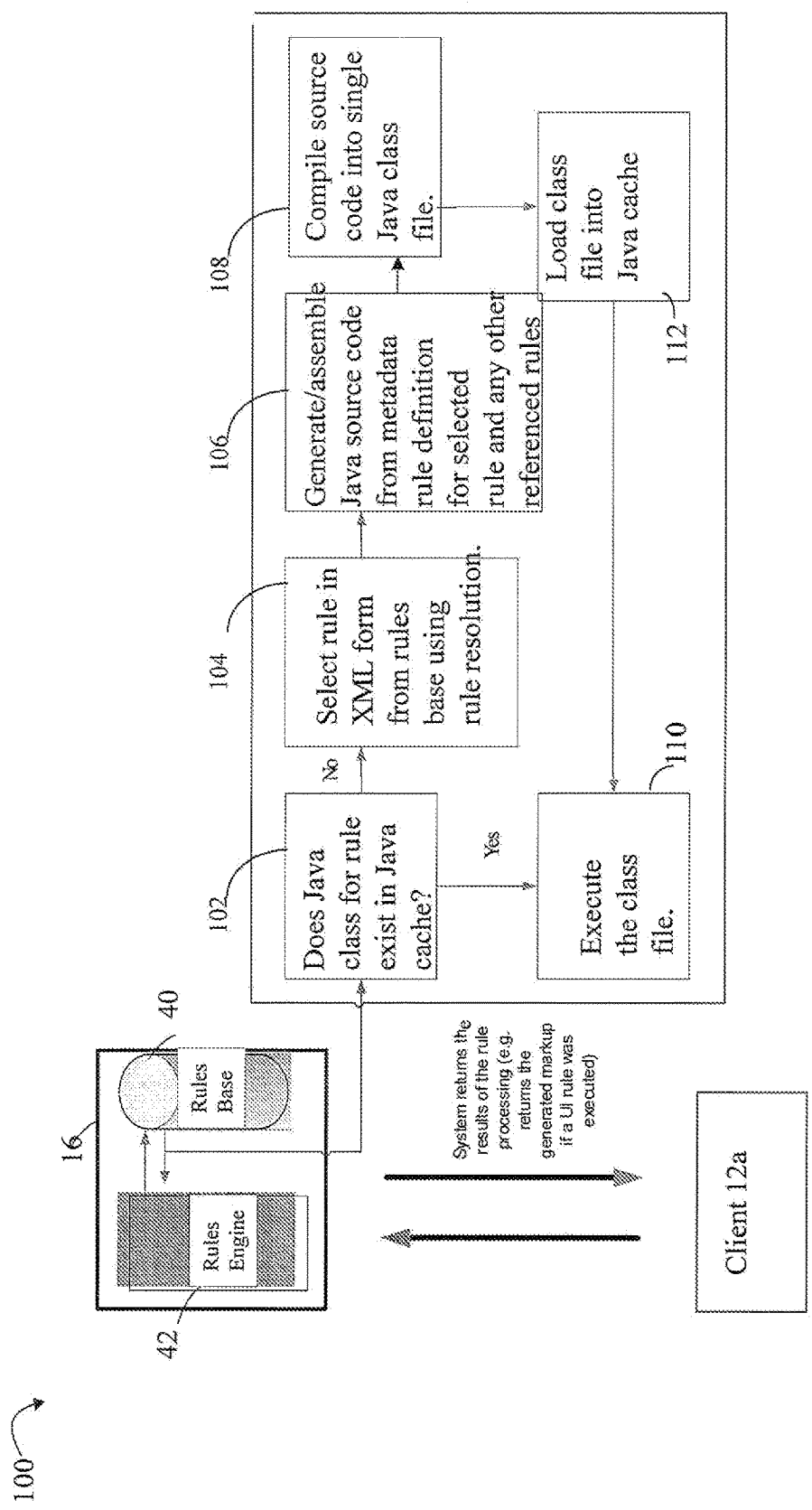
FIG. 3 is an example illustrating conversion of metadata into executable Java code in one embodiment.

Referring to FIG. 3, shown are processing steps that may be performed in an embodiment of the server for processing rules. In the example 100 in furtherance of the exemplary embodiment described above, the rules are translated into Java for execution. A rule processing request, such as an HTTP or other request, for one or more rules may be received from a client 12*a*. In response, processing is performed by the server to determine the correct rule(s) and accordingly process the selected rules to generate code for execution by the server. For the specified one or more rules, at step 102, a determination is made as to whether the corresponding Java class files for the specified one or more rules is already in the Java cache. As mentioned above, a single Java class file may exist for a rule that references other rules, and thus, contains generated code for such rules. If step 102 evaluates to yes, control proceeds to step 110 where the existing class file is used. Otherwise, if step 102 evaluates to no, control proceeds to step 104 where processing (e.g. a rule resolution process as described above) is performed to select the correct rule(s) for the specific context from the rules base 40 where the rules may be in a form such as XML. U.S. Pat. No. 5,826,250, which is incorporated by reference herein, describes how a rule may be selected in an embodiment, for example, in accordance with an objective, circumstance, business purpose, product, organization rule set, rule version, data time, security required for each rule, and the like. At step 106, Java source code for the selected rule(s) is generated. At step 108, the Java source code is compiled into a single Java class file which is loaded into the Java cache in step 112. From step 112, control proceeds to 110 where the loaded Java class file is executed.

Prior to describing techniques herein for use with data structure management and operations on the server in connection with objects, definitions are first specified for reference in connection with an embodiment of the techniques herein in an object-oriented system.

A class is a type specification for a structured data collection called an object. The type specification is represented as a set of elements. A class has a unique name that distinguishes it from other classes and objects. An element has a name as well as information associated with that name. There are two types of elements: data elements, and methods. A data element (also known as a property) contains a data type specification, and a data value. For elements that are part of a class specification, this value is the default value (the initial value for the element when an object of the class is instantiated). A method element contains a reference to a function, as well as type specification information for the parameters of the function, and indicates any values returned by the function.

An object is a structured data collection containing a set of elements, and some other information. An object is created (or instantiated) according to a specification from a particular class. A possible implementation of such an instantiation would be to simply copy the elements of the class to the object. An object maintains a reference to its associated class. An object is also given a unique name. That is, its name is different from that of any other object, regardless of class. An object is given the name when it is instantiated. An object may also be deleted, at which time, its resources (memory used, and unique id) are recycled to pools from which they may be re-used. It should be noted that as used herein, an object may also be referred to more generally as a data structure.

A property (data element) of an object may, itself, be an object. An object contained in a property of another object is called a sub-object of the containing object. A property of an object may also contain a set of sub-objects. A property of an object may contain a reference to another, related object. This is distinct from the notion of a sub-object in that the property contains a reference to the related object rather than the complete information for the object, as is the case with a sub-object. For example, suppose an object, A1, contains a sub-object, B1, and a reference to a related object C1. The related object C1 can exist independently of A1, but B1 cannot. Thus, if A1 is deleted, B1 will be also deleted because its memory is allocated as part of A1. However, C1 will not be deleted.

In connection with an object-oriented system, a class hierarchy and definitions for each class in the hierarchy may be specified. A class may define its own elements. A class may also, optionally, have a parent class, from which it inherits elements. Thus, when an object of the class is instantiated, it will have elements defined by its associated class, as well as elements inherited from the class' parent class, if such a parent class exists. If an element or method defined for a class has the same name as an element or method inherited by the class, the element or method defined for the class is used, and the inherited element or method is ignored.

An embodiment using an object oriented system may specify different ways in which data may be accessed and modified or set.

A class can be retrieved by using its name as a key.

An object can be retrieved by using its name as a key.

A data element of an object or class can be retrieved by using the object or class name, followed by the data element name. The two names are separated by the delimiter ".".

Examples: person.height or FredSmith105.height

When a data element contains a set of sub-objects, or references to a set of related objects, elements of the set can be accessed using an index specified in parentheses after the data element name.

Example: order.items(3)

This accesses the third element in the set order.items

Example: person.children("Fred")

This accesses the element in the set person.children indexed by "Fred". Note that the index need not be an integer.

Additional details regarding data element (property) designation are known in the art and also as described, for example, in the PRODEX patent application. Furthermore, it should be noted that a data element of an object or class can be set using the "=" operator. The left side should be a property designation using class or object name followed by element name, as described above. The right side should contain a data value that is consistent with the type specification for the data element.

Example:
vacation.fuel_cost=vacation.travel_miles*vacation.car.cost_per_mile

A method is invoked using the object or class name, followed by the method element name. Parameters are provided within parentheses.

Example: Person.max(Fred.height, Joe.height)

Values returned by functions can be used to set data element values using the above-described syntax Example:
MyCompany.AnnualSales=MyCompany.SumOverMonths (2002, "Sales")

An object can be created (instantiated) using a global create method that takes, as parameters, the class and the name for the object. Optionally, data element name—value pairs can be included as parameters to this method for the purpose of initializing the named data elements to the values, as long as these values are consistent with the class-specified data types for the data elements. Also, optionally, constructor methods that take zero or more arguments can be specified at the Class level. The constructor methods are invoked after memory for the object is allocated, and its data elements are initialized to their default values (if any). An object can be deleted using a global delete method that takes, as parameter, the name of the object. When an object is deleted, its resources (allocated memory, and unique id) are recycled to pools from which they may be re-used. It is the responsibility of the developer to delete any outstanding references to this object (from other objects, for example).

In a typical object-oriented system such as described herein, object instances exist in the virtual memory space of a computer's operating system. Objects in virtual memory, such as included in the representation of caches 84 and 86 of FIG. 2, can easily be accessed and modified by application algorithms. The virtual memory representation may be used for all computations, that modify data elements of objects. Virtual memory is, however, volatile. For example, when the computer's operating system shuts down, virtual memory is reset, and any objects in it are lost. To prevent this, objects may be made persistent such as by storing the objects in a persistent data store 82 of FIG. 2. In other words, the transient objects residing in virtual memory, such as in a cache 84, may be saved to persistent memory such as by storing the objects to the data store 82 using suitable API that supports load and save operations on objects. The particular form in which the data is stored in the persistent data store and elsewhere may be any suitable form and may vary with embodiment.

Figure 4:
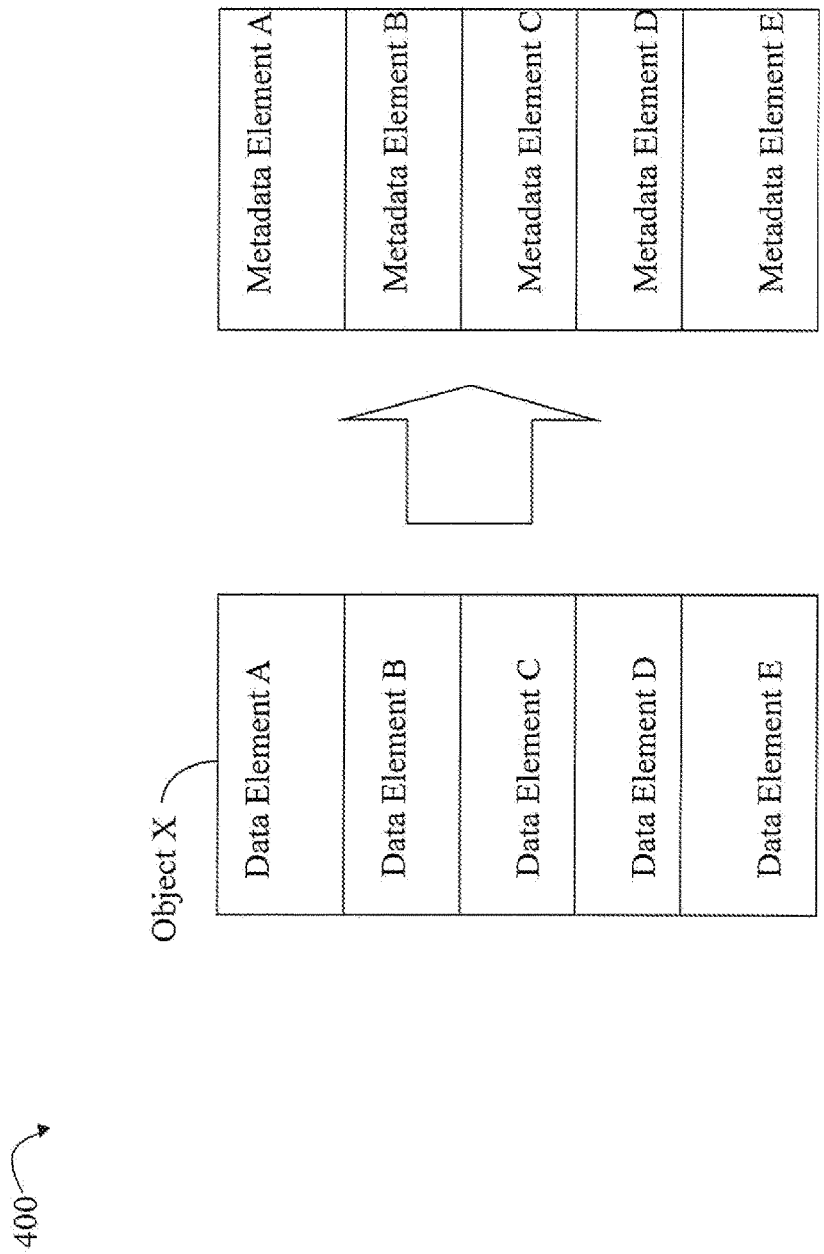
FIG. 4 is an example representation of an instance of an object or other data structure.

Referring to FIG. 4, shown is an example illustrating a representation of an object, or more generally a data structure, as may be used in accordance with techniques herein. The object may be partitioned into a plurality of data elements. In the example 400, the object X may have 5 data elements denoted A-E. Each data element may also have corresponding metadata. The metadata may include information describing the data element such as properties or attributes of the data element. Although not illustrated in FIG. 4, it should be noted that there may also be metadata on a per structure or object basis as well as on a per data element basis. Each data element may represent one or more corresponding atomic data units. As will be described in following paragraphs, techniques herein in the form of data associations may be used to load and/or retrieve such atomic data units on demand when needed so that data associated with one data element may be loaded and/or retrieved at a first point in time independently of the other data elements. In other words, data for each data element may be selectively loaded/retrieved at different points in time as needed on demand. For example, during execution of programming instructions in a procedural or declarative system, if the execution of the programming step requires data for successful execution, an embodiment may retrieve the data when processing is performed in connection with executing that step. Furthermore, techniques herein may be used to dynamically evaluate criteria in accordance with a current context at the point in time where the criteria may affect what data is retrieved, from what location, with different access parameters, and the like. Data loaded and/or retrieved for a data element may vary in accordance with the results of the evaluation performed at each point in time.

Figure 5A:
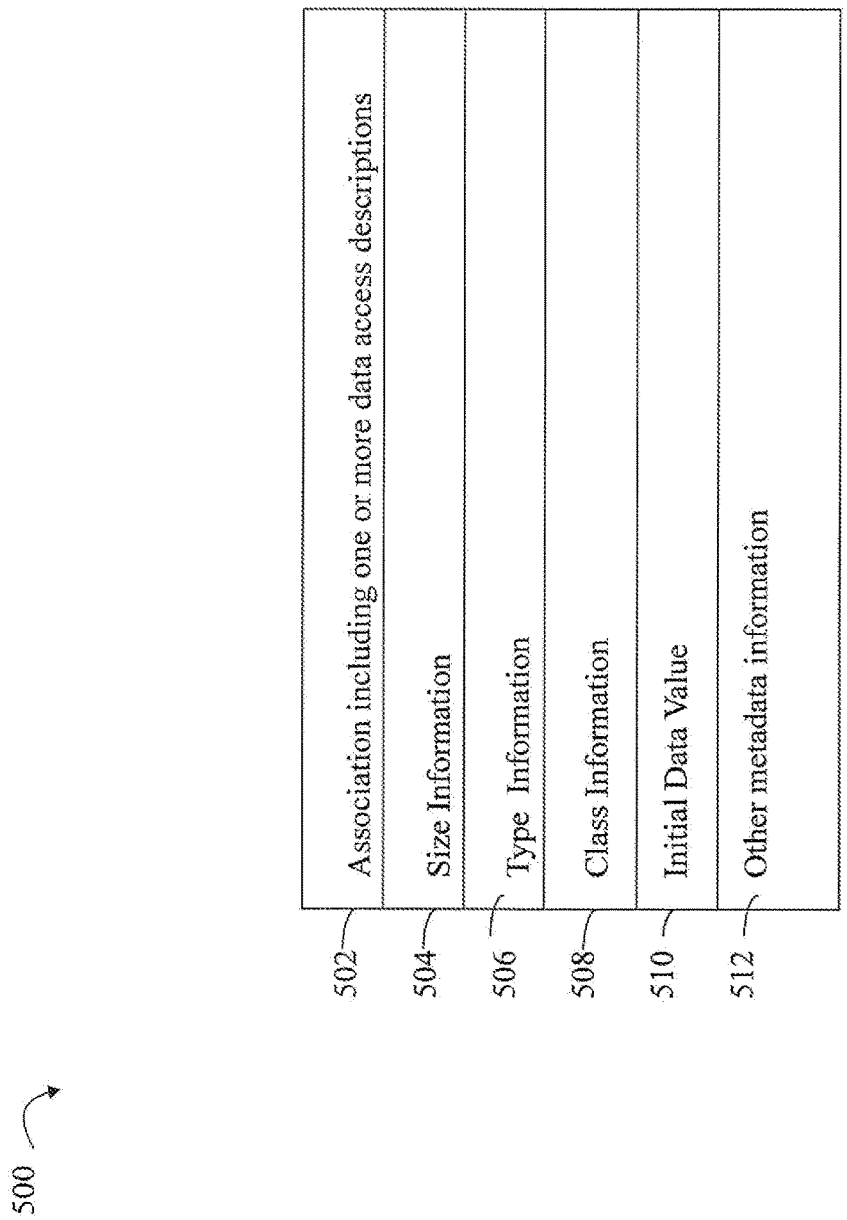
FIG. 5A is an example of metadata that may be specified for a data element.

Referring to FIG. 5A, shown is an example illustrating types of metadata that may be included in metadata for a data element. Metadata may include an association 502, size information 504, type information 506, class information 508, an initial data value 510, and other metadata information 512. The association 502 generally specifies, using one or more data access descriptions, how to access the data element. As described herein in more detail, one embodiment may include three types of associations and a data element association metadata 502 may identify and describe the particular type of association used for the corresponding data element. The three types of associations described herein may be characterized as "loose" associations. A loose association specifies, using one or more access descriptions, how to access data for a data element (e.g., data instance or object) which is loosely related to another data element. The loose association may be characterized as varying with a current context. The current context may be determined at the time a data element is needed or otherwise requested on demand. The three types of associations included in one embodiment as set forth in following paragraphs are explicit, conditional, and derived. Size information 504 may identify the size of the data element in bytes or some other unit. The type information 506 may identify a data type of the data element such as, for example, integer, string, and the like. The class information 508 may identify the particular class of the data element. The initial data value 510 may identify the value to which the data element is initialized. The other metadata information 512 may include, for example, information affecting caching instances of the data element such as whether and when a fresh copy of the data element is retrieved from the database.

As described below, associations may be generally used to dynamically associate any two data entities. Associations as described herein may generally be used in connection with a first data entity which references or otherwise (directly or indirectly) depends on an existing instance of another data entity. For example, an association may be used to dynamically associate a data element with a data object or other data structure where that data object or other data structure may include the data element. The association provides for specifying a link to the data element via a data access description which may be dynamically and contextually evaluated at a point in time when the data element is needed. Those data elements which have an association specified in corresponding metadata may be characterized as dynamic. In contrast, a data element which does not have an association in its corresponding metadata may be characterized as non-dynamic. Specifying associations allows a data element to be selectively retrieved on demand as needed. Each data element may be retrieved as needed rather than retrieving and storing in memory all data elements of the structure when a reference (or usage) is made with respect to any single data element in the structure. Storage allocated for use with a data structure at a given point in time may vary in accordance with which data elements are currently stored in memory at that point in time.

An association between a first data entity, such as object X in FIG. 4 (more generally any data item or entity as an object or other data structure), and a second data entity, such as data element B (hereinafter "B") in FIG. 4 (more generally any other data item or entity such as a data element within the object (e.g., sub-object or variable) or data structure), may be characterized as specifying one or more different data access descriptions for B. Each data access description may indicate how, and from what location, to retrieve B at a point in time. The association specifies how to retrieve or access B in a dynamic fashion (e.g., when needed on demand) based on a current context determined at the point in time when B is referenced. For example, during program execution, if data is needed to execute a step and that data is currently not available (such as in a session or global cache as described elsewhere herein), then an embodiment can retrieve the data and make it available to complete the step. Associations provide a dynamic aspect for data retrieval in that, for example, with a data structure which includes data element B, an association may be defined which specifies one or more different ways in which B may be retrieved. However, B is not actually retrieved until needed or referenced at a point in time. Additionally, a contextual evaluation is performed at the point in time based on criteria including one or more parameters with values for those parameters describing a current context. The results of the contextual evaluation of the criteria (e.g., evaluating the criteria in accordance with a current context) may be used in retrieving B for a specified data access description. The results of the contextual evaluation may also be used in selecting a particular data access description for retrieving B at a point in time. As illustrated in more detail below, a data access description may, for example, specify a particular protocol used, a database accessed to retrieve a data element, a particular query to be used with the database, one or more conditions which evaluate to true to use the associated data access description, one or more operations performed on data elements or values used in connection with data access and retrieval, and the like.

Figure 5B:
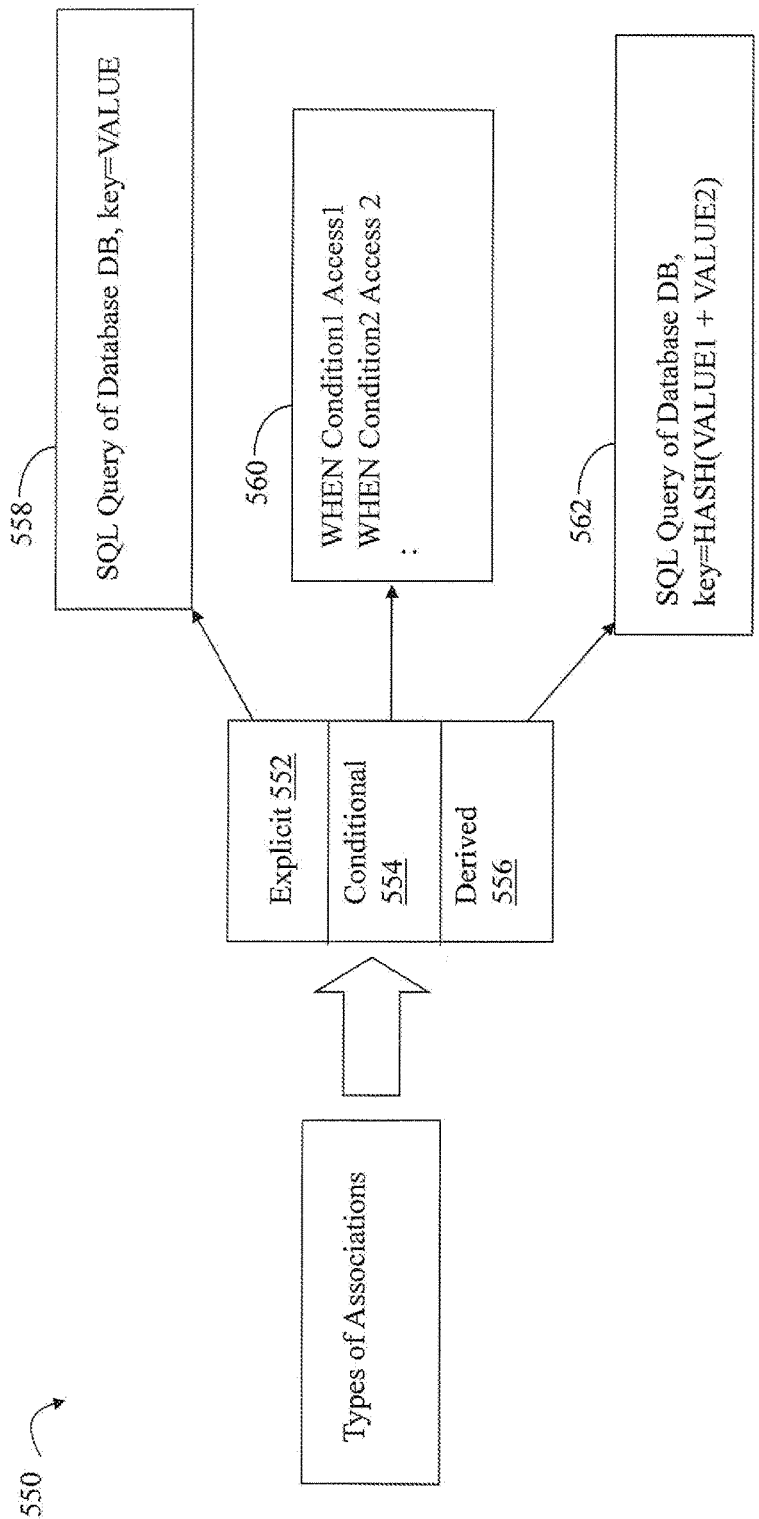
FIG. 5B is an example illustrating different types of associations that may be included in an embodiment in accordance with techniques described herein.

As illustrated in FIG. 5B, a dynamic data element may specify one of three types of associations when describing an association between X and B in accordance with an embodiment of the invention. Each of the three types of associations provides a different mechanism describing how to access B. A first type of association, explicit 552, provides for explicitly specifying how to access B. With an explicit association, a single data access description is specified indicating how to retrieve B. Additionally, the single data access description may use one or more values directly in the retrieval of B. In other words, the one or more values do not have to be further processed for use in retrieving B. The one or more values are determined at the point in time when B is referenced or needed (collectively "referenced"). As an example as illustrated in 558, an explicit association may specify that B is retrieved using a SQL query with a current value of a data element as the key.

A second type of association, conditional 554, (also referred to using a declarative page as described elsewhere herein), provides for specifying multiple data access descriptions (denoted Access 1, Access 2, etc. in element 560) for a single association. Different contextual criteria in the form of conditions (denoted as Condition 1, etc., in element 560) may be associated with each data access description. The one or more contextual criteria are evaluated at the point in time when B is referenced and the results of the evaluation are used in selecting, one of the data access descriptions. As an example, one of multiple databases may be conditionally accessed to obtain B depending on one or more other values of parameters included in the criteria. One of the databases may be selected in accordance with the one or more parameter values (current context) at a point in time when B is referenced. Furthermore, it should be noted that one or more values may also be used in connection with retrieving B for the selected data access description. For example, once a database is selected (such as by having the associated condition evaluate to true), one or more values that vary with current context may be used in connection with performing a SQL query for the selected database. For example, the value of the key used in connection with the query may be based on a current value of a data element in a particular object. Thus, the contextual criteria which is evaluated at a point in time may use values within one or more access descriptions as well as conditionals in the conditional type of association. It should be noted that each "condition" in 560 may be expressed using any one of a variety of different syntaxes (e.g., for textual expressions, expressions using arithmetic and comparison operators, symbols etc.). Examples are provided elsewhere herein. Furthermore, an embodiment may also include other statements than a WHEN statement as illustrated in connection with conditional associations. For example, an embodiment may also include an IF-THEN-ELSE statement, SWITCH statement (similar to the C-language construct), and the like. Each "data access description" may have a form similar to that as illustrated in connection with the explicit association type. For example, as described also in connection with other association types, an exemplary data access description may specify a SQL query performed against a database where the data access description specifies the query parameters, location (e.g., IP address, server name) and name of the database, and the like.

A third type of association, derived 556, may be characterized as specifying a single data access description using one or more data values which require additional processing in order to be used in connection with retrieving B. As an example illustrated by 562, one or more data values may be added, concatenated, or otherwise require further processing in order to be used as a key in connection with an SQL query to retrieve the value of B from a database. In 562, the key value may be determined as a result of concatenating (e.g., concatenation operation indicated as "+") VALUE1 and VALUE 2 (where VALUE 1 and VALUE 2 may be represented as strings) and then applying a mathematical HASH function to the result to obtain the key used in the SQL query. The function, such as HASH, may be user-provided or defined or predefined, such as using existing functionality in server-side software. The HASH function in this example may be mathematical function used to determine a hash value. Hashing is generally known in the art and may be implemented using a variety of different algorithms. The hashing algorithm maps an input value (possibly large and variable-sized) to an output value. The output value may be a single integer in a predetermined range of possible output values. The HASH function is illustrative more generally of any function, routine or operation (e.g., mathematical operation, logical operation, string operation) that may be applied to a set of one or more values, variables, expressions, and the like.

By way of further example, backward and forward chaining inference methods may also be used to determine the key value. In an embodiment, the rules engine 42 may use VALUE 1 and VALUE 2 to select and process the appropriate rule(s) (i.e. for the current context) from rules base 40 in order to determine the key value. It will be appreciated that still other forms of additional data processing may be applied to VALUE 1 and VALUE 2 in connection with retrieving B.

It should be noted that backward chaining and forward chaining are techniques that may use declarative rules. Backward chaining starts with a list of goals (or a hypothesis) and works backwards from the consequent to the antecedent to see if there is data available that will support any of these consequents. A rules engine using backward chaining may search declarative rules until one is found which has a consequent (e.g. Then clause as illustrated below) that matches a desired goal. If the antecedent (e.g. When clause illustrated below) of that rule is not known to be true, then it is added to the list of goals (in order for your goal to be confirmed you must also provide data that confirms this new rule). In the example above, suppose that the goal is to determine the Customer Status (i.e. the key value), given that the annual income (i.e. VALUE 1) is $60,000, number of products purchased to date by Customer (i.e. VALUE 2) is 3, and that the rule base contains the following rules:
1. When VALUE 1 is less than or equal to $50,000—Then X is low
2. When VALUE 1 is greater than $50,000—Then X is high
3. When X is low and VALUE 2 is less than or equal to 2—Then Customer Status is Bronze
4. When X is low and VALUE 2 is greater than 2—Then Customer Status is Silver
5. When X is high and VALUE 2 is less than or equal to 2—Then Customer Status is Silver
6. When X is high and VALUE 2 is greater than 2—Then Customer Status is Gold
This rule base would be searched and the third, fourth, fifth and sixth rules would be selected, because their consequents (Then Customer Status is . . . ) match the goal (to determine Customer's Status). It is not yet known whether X is high or low, so all the antecedents (When X is high and . . . , When X is low and . . . ) are added to the goal list. The rule base is again searched and this time the first two rules are selected, because their consequents (Then X is low, Then X is high) match the new goals that were just added to the list. The antecedent (When VALUE 1 is greater than $50,000) is known to be true and therefore it can be concluded that X is high, and that the Customer Status is Gold. Because the list of goals determines which rules are selected and used, this method is called goal-driven, in contrast to data-driven forward-chaining inference. The backward chaining approach is used, for example, by expert systems. Various programming languages, such as Prolog, Knowledge Machine and ECLiPSe, support backward chaining within their inference engines.

In contrast to backward chaining, forward chaining starts with available data and uses inference rules to extract more data until a goal is reached. A rules engine using forward chaining may search the declarative rules until it finds one where the antecedent (When clause) is known to be true. When found it can conclude, or infer, the consequent (Then clause), resulting in the addition of new information to its data. Forward chaining inference engines will iterate through this process until a goal is reached. For example, based on the same set of 6 rules above, suppose that the goal is to determine the Customer Status of an individual with an annual income of $60,000 (i.e. VALUE 1) and who has purchased 3 products to date (VALUE 2). The rule base including the foregoing 6 rules may be searched and the second rule would be selected, because its antecedent (When VALUE 1 is greater than $50,000) matches the data. Now the consequents (Then X is high) is added to the data. The rule base is again searched and this time the sixth rule is selected, because its antecedent (When X is high and VALUE 2 is greater than 2) matches the data that was just confirmed. The new consequent of the sixth rule (Then Customer Status is Gold) is added to a data set. Nothing more can be inferred from the set of 6 rules and the goal of determining the Customer Status has been completed. Because the data determines which rules are selected and used, this method is also called data-driven.

It should be noted that the particular syntax, statements, and the like, used in FIG. 5B and elsewhere herein to illustrate associations is merely exemplary and should not be construed as a limitation of techniques described herein. As will be appreciated by those skilled in the art, the conditions and data access descriptions may generally be expressed in a variety of different ways other than as set forth herein for purposes of illustration.

The values used in connection with the foregoing three types of associations are determined (evaluated) at the point in time when a reference to B is made such that B may be retrieved on demand. The one or more values of parameters included in the criteria may be characterized as describing a current context at the time when B is needed causing the retrieval of B. Furthermore, in an embodiment in accordance with techniques herein, dynamic data elements (e.g., those having associations in data element metadata) of an object may be selectively retrieved at different points in time independent of other data elements of the same object. Additionally, it should be noted that another aspect of a dynamic data element is that since its data value may be retrieved at various points in time, the copy of data value retrieved may vary even though the criteria evaluates to a same set of values. For example with reference to 558, the same VALUE may be used for the key in the SQL query at several different points in time. However, the data stored in the corresponding record may vary with each point in time.

With reference back to FIG. 5A, associations may be specified when defining a data structure where the selected association type and one or more data access descriptions may be included in metadata for a corresponding data element. A data structure may include one or more data elements that are included in each instance of the data structure. The data structure may also include one or more data elements having contents which vary conditionally with each instance of the data structure depending on a current context. When defining the data structure, associations may be used to define the data elements which are retrieved dynamically when needed and which may vary in accordance with the current context. As part of a process defining the data structure, one or more associations may be specified indicating the possible different ways or alternative methods for retrieving the data. The foregoing definition(s), including associations(s) as described herein, may then be evaluated as part of processing during operation (e.g., during runtime) of a system, such as in connection with creating an instance of an object or operating on an existing object (e.g., such as to perform updates or modifications to the object). The point of evaluation, such as when an object or other instance is referenced, determines the current context which is used in dynamically evaluating the criteria as described herein for retrieving data for the object. Such evaluation may be performed dynamically each time the object is referenced and it is necessary to retrieve data for the object, for example, since such data is not already included in a session or global cache, since an existing copy of the data is outdated or has expired, and the like.

With reference back to FIG. 4, consider a data structure defined for an insurance claim which may include data elements A-E. Now, referring to FIG. 6, illustrated is a representation of a data structure defined for an insurance claim where data elements A, C and E are not dynamic (do not specify an association) and data elements B and D are dynamic (e.g. have a corresponding association). An instance of a claim may be created for any one of a variety of different types of insurance claims such as an auto claim, a homeowner claim, and a life insurance claim. For an instance of each claim type, a first portion of common information (common to all types of claims) represented by data elements A, C and E may always be included in the claim. Such information may include, for example, a claim number, claimant name, and dates. Policy information may also be included in the claim data structure instance for each type of claim. However, the particular policy information included in each data structure instance will vary with the particular type of claim. Additionally, the policy information may be retrieved from any one of three different databases where the particular database selected varies with each type of claim. As such, an association of the second type, conditional, may be used when defining the data element related to the policy information of the data structure where conditional statements may be used to express the contextual criteria evaluated and used in selecting one of three different data access descriptions corresponding to the three different databases that may be used for the three types of claims. In this example, data element B may represent the foregoing policy information having an association of the conditional type. It should be noted that element D may also utilize one of the foregoing three types of associations although the remainder of the description for this example will make reference to element B for illustration of the techniques herein.

In FIG. 6, two instances D1 and D2 of the claim data structure are illustrated for a user session. The claim instances D1 and D2 are stored in the session cache 602 for the client. In the example 600, the data for data elements A, C and E are initially retrieved from the database and stored in the session cache 602 for this particular user or client. The metadata may include the association for data element B indicating how to access data for data element B when referenced.

Figure 7:
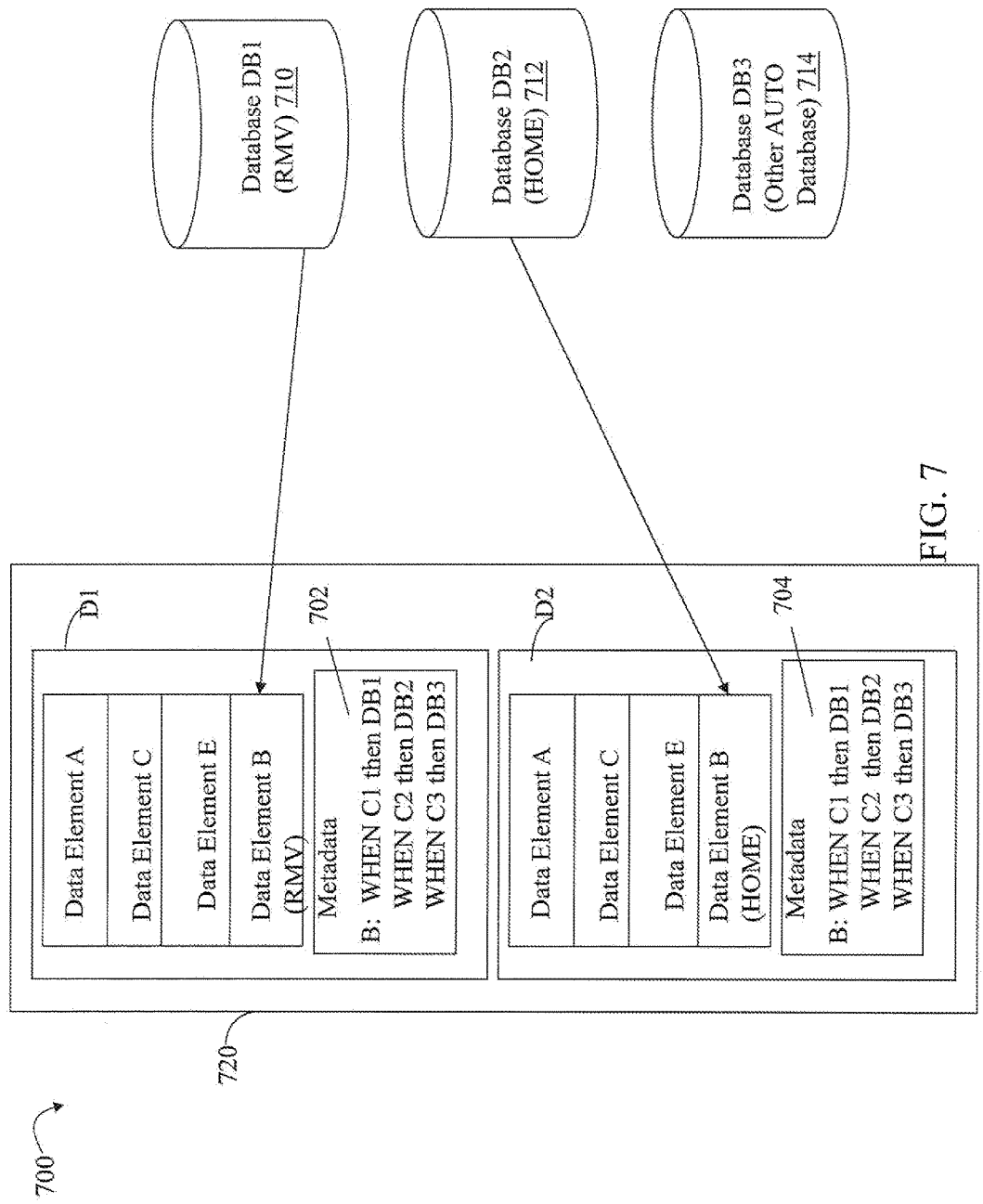

At a later point in time, as illustrated in FIG. 7, the user may perform operations causing retrieval of data element B for both instances D1 and D2. In the example 700, DB1 710 includes automobile information as may be, for example, stored in a database at a state registry of motor vehicles (RMV). DB2 712 may be a database including information on homeowner policies and DB3 714 may be some other local or external database containing automobile information. In connection with data structure instance D1, a reference to data element B causes B to be loaded from database DB1 710 based on evaluation of B's conditional type association 702. In this example for D1, condition C1 of 702 evaluates to true so that data element B is retrieved from database DB1 710. In connection with data structure instance D2, a reference to data element B causes B to be loaded from database DB2 712 based on evaluation of B's conditional type association 704. In this example for D2, condition C2 of 704 evaluates to true so that data element B is retrieved from database DB2 712. Element 720 may represent a session cache.

It should be noted that although metadata associated with data element B is illustrated as being stored for each instance of the data structure D1 and D2, an embodiment may store only a single instance of the metadata for data element B for both data structure instances D1 and D2, or it may store the metadata in another location (such as a database) which is retrieved when needed, and the like.

It should be noted that for purposes of simplification in illustration, complete SQL or other database queries for each of the 702 and 704 are not shown (e.g., no key is illustrated).

Figure 8:
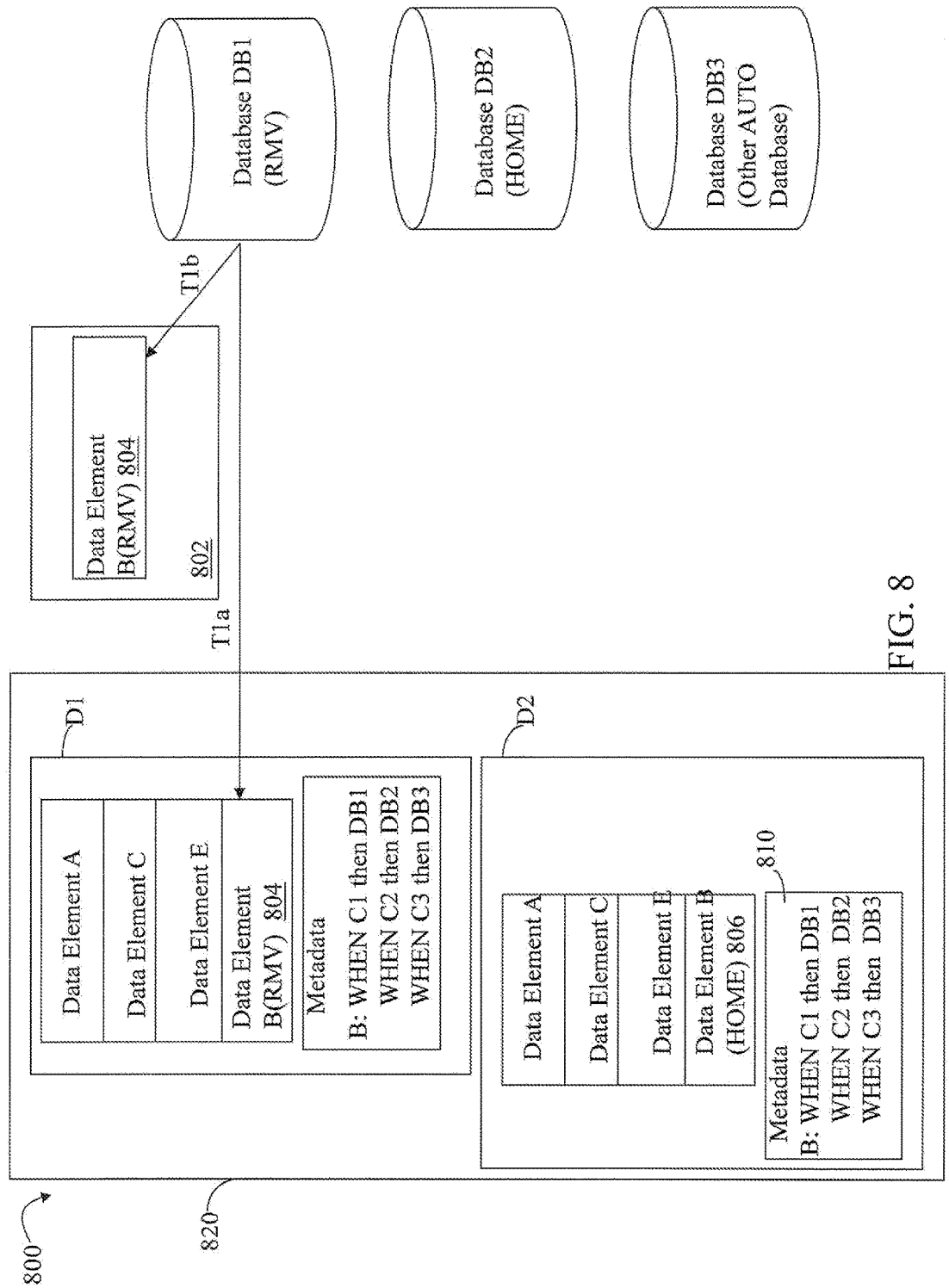

With reference now to FIG. 8, in addition to loading the data for data element B 804 of D1 and data element B 806 of D2, respectively, from the selected databases DB1 and DB2 into the session cache 820, the data for 804 may also be loaded into a global or server wide cache 802. Data included in the global cache 802 may be used by any client session accessing the server. In contrast, data included in a session cache may only be used for a particular user or client session. In this example, DB1 may be a database where a fee is paid for each database access or retrieval. As such in order to reduce costs incurred for using DB1, data from DB1 may be considered valid for a time period and may be made available for any session on the server by storing the data 804 retrieved from DB1 in the global cache 802.

When retrieving a referenced data element which is not included in the client's session cache, an embodiment may look in the global cache 802 for the desired information. If the desired information is currently in the global cache 802, the information may be copied from 802 to the session cache 820. Otherwise, if the desired information was not found in the global cache 802, the appropriate database or other data store may be appropriately accessed in accordance with the selected data access description. In accordance with another embodiment, rather than have a copy of a data element in both session cache and global cache, an embodiment may alternatively store a copy only in the global cache and all users referencing or using this data element instance may work cooperatively on the same copy in the global cache. In this manner, data cached in the global cache only (and not in any session caches) may provide for data integrity of the single copy shared by multiple clients or users. Element T1a illustrates retrieving a copy of data for B from DB1 and storing the data in the session cache 820. Element T1b illustrates retrieving a copy of the data for B from DB1 and storing the data in the global cache 802.

Figure 9:
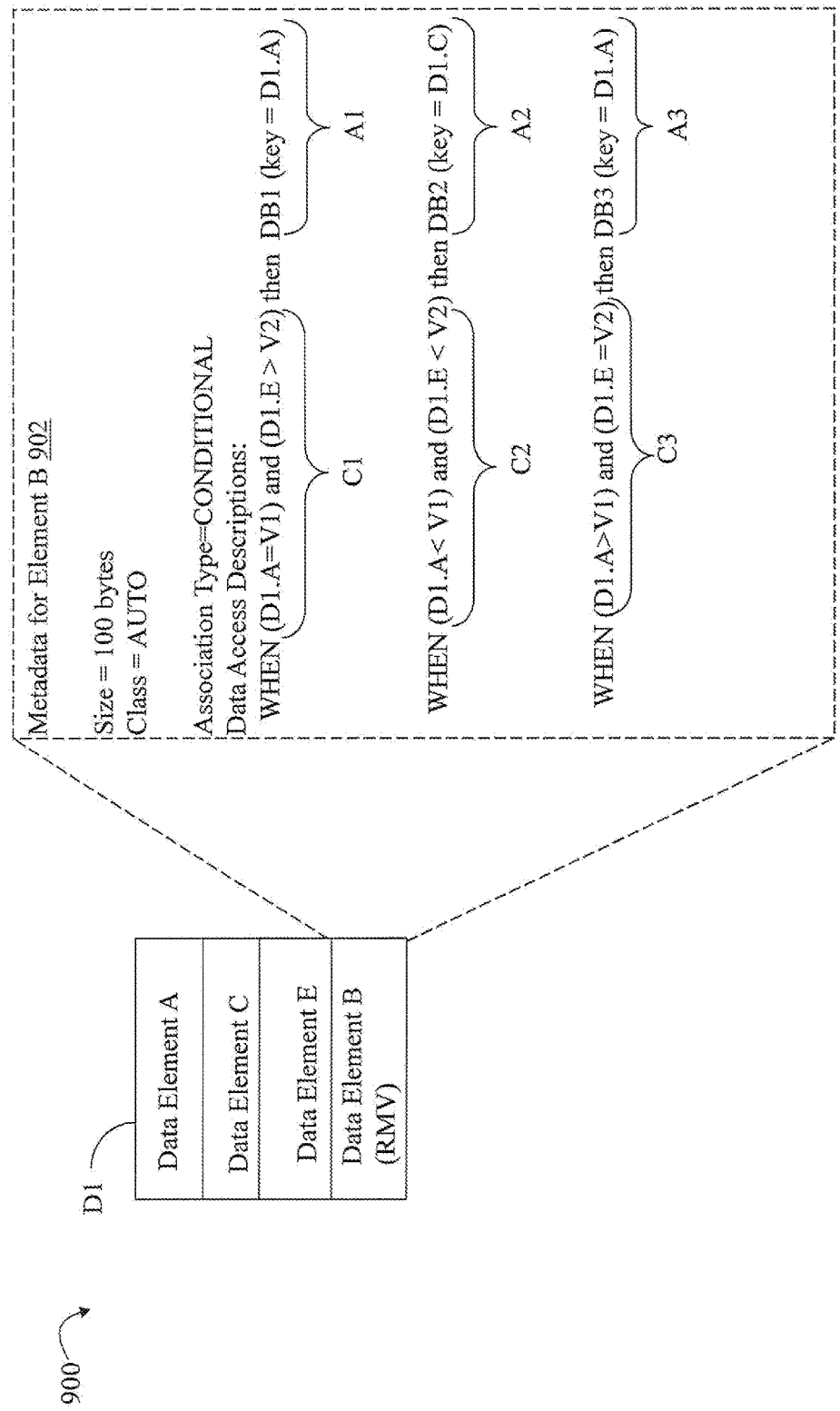

Referring to FIG. 9, shown is an example illustrating in more detail the metadata 902 that may be specified for data element B of data structure instance D1 of FIGS. 7 and 8. In the example 900, each of the conditions C1-C3 may be evaluated when a reference is made to data element B of D1 until one evaluates to true. The conditions C1-C3 are included with three data access descriptions A1-A3. Each of the conditions C1-C3 are a function of (e.g., vary in accordance with) two other data elements (A and E) in D1. The value used as the key for each of the data access descriptions A1-A3 also varies with the particular data access description selected. When C1 evaluates to true, the first data access description A1 is used to access database DB1 with a key of D1. A (i.e., data element A of data structure instance D1). When C2 evaluates to true, the second data access description A2 is used to access database DB2 with a key of D1. C (data element C of data structure instance D1). When C3 evaluates to true, the third data access description A3 is used to access database DB3 with a key of D1. A. In connection with this example, condition C1 evaluates to true so DB1 (RMV database) as illustrated in FIGS. 7 and 8 is accessed. It will be appreciated that the techniques described herein for data element B of D1 are not limited to using data elements A-C within the same data structure D1 in order to define conditions C1-C3 and key values. A variety of data types from different data sources can be used to specify conditions and data access descriptions.

At a later point in time, suppose that D1 has been modified because the claim details were captured erroneously the first time and data element B is again referenced. At this later point in time, the current context is determined and assume the criteria including condition C3 now evaluates to true at this later point in time (rather than C1 evaluating to true as described above). At this later point in time, a different instance of data element B of D1 is retrieved from DB3 in accordance with access description A3.

Figure 10:
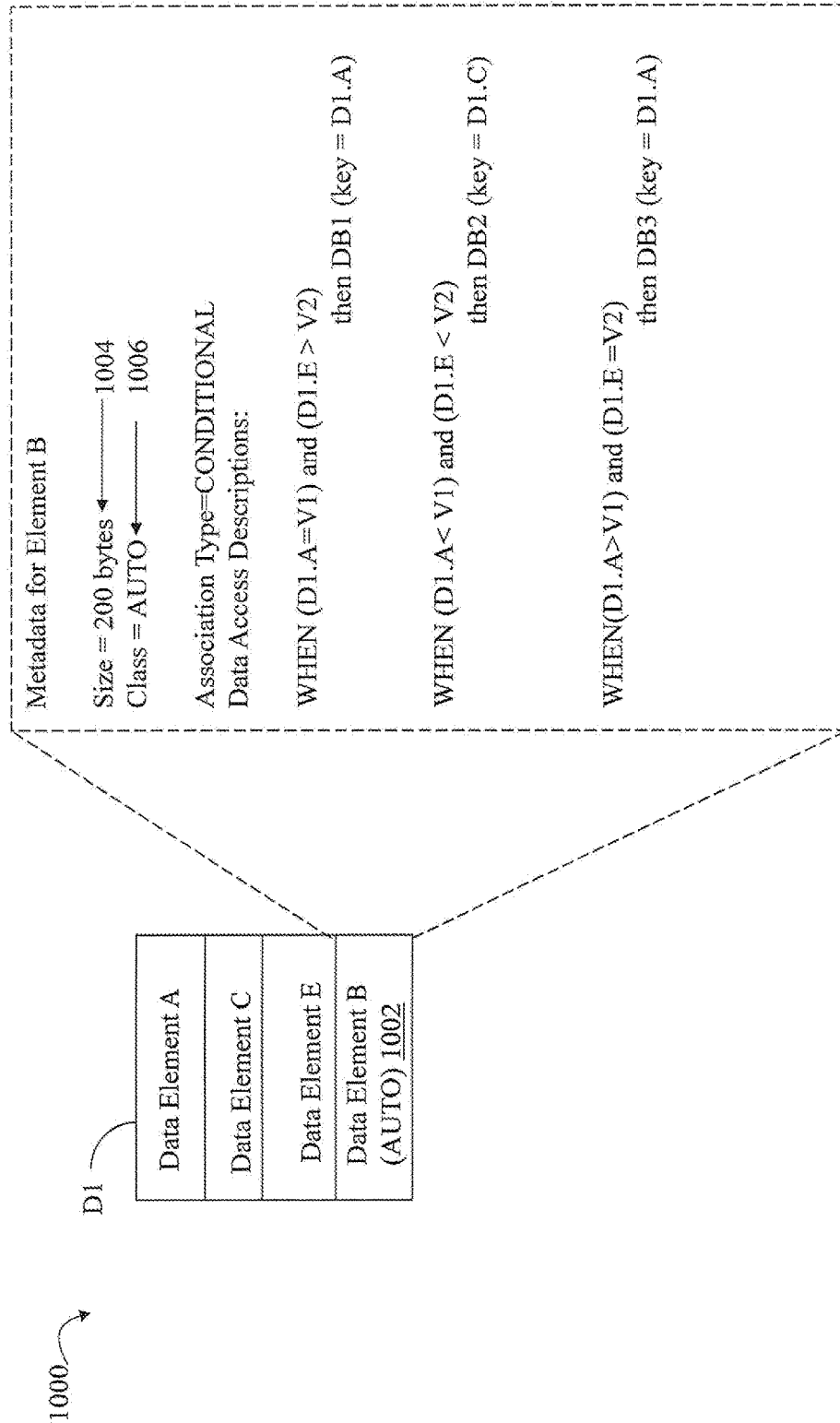

With reference now to FIG. 10 in connection with updating data element B, data 1002 (data stored in data element B) is updated using data retrieved from DB3 as described above. Additionally, elements 1004 and 1006 of FIG. 10 illustrate how the metadata associated with data element B may also affected as a result of evaluating the association and retrieving the updated data element B. In accordance with the evaluation performed at the current time when B is referenced or otherwise retrieved on demand (e.g., as a result of a changed data value upon which B depends), other metadata may be modified. In this example 1000, not only are the contents or copy of data element B 1002 updated, but additionally, the metadata corresponding to size 1004 for B may be dynamically modified as a result of retrieving the updated and perhaps more detailed automobile record for data element B. Similarly, if C2 evaluates to true at a particular point in time and data element B is updated with data retrieved from DB2, then the metadata corresponding to class 1006 will be dynamically modified to HOME instead of AUTO.

Techniques described herein provide for dynamic data structures such as objects in an object-oriented environment. The data structures, such as objects, may be characterized as dynamic in a variety of different aspects as described above as well as in following paragraphs. In one aspect, the size of each object of a same class may vary in accordance with the different data elements and associated sizes included in each instance. Additionally, a single object may have a size which also changes over time in accordance with the different data elements included in the instance as may be dynamically determined based on parameters that change over time. For example, as illustrated in FIGS. 9 and 10, the data object D2 may have a size that changes over time in accordance with the particulars of each data element. A data structure may have a layout including a dynamic data element where the size of the data element as well as class, and/or other metadata associated with the data element varies in accordance with one or more parameters. Such data elements, and the objects or other structures that include them, may be characterized as dynamic in that metadata describing the data elements, such as size and type information, may vary over time and may depend on one or more different parameters which are evaluated at different points in time. As described, the metadata characterizes various aspects of a dynamic data element that may change over time. Additionally as illustrated in accordance with techniques herein, a data element of a data structure may have corresponding metadata including an association defining a data access description providing another dynamic aspect of the corresponding data element. The data access description for a data element indicates how to obtain data for the data element at a point in time. The data access description may utilize the foregoing one or more parameters which are evaluated at a point in time to retrieve data for the data element at the point in time.

What will now be described in connection with FIGS. 11A, 11B, 12 and 13 is another example illustrating dynamic data elements as may be used in providing dynamic data structures such as objects. In connection with the following example, a claim class definition is used to provide an instance of a claim object in accordance with techniques herein.

Figure 11A:
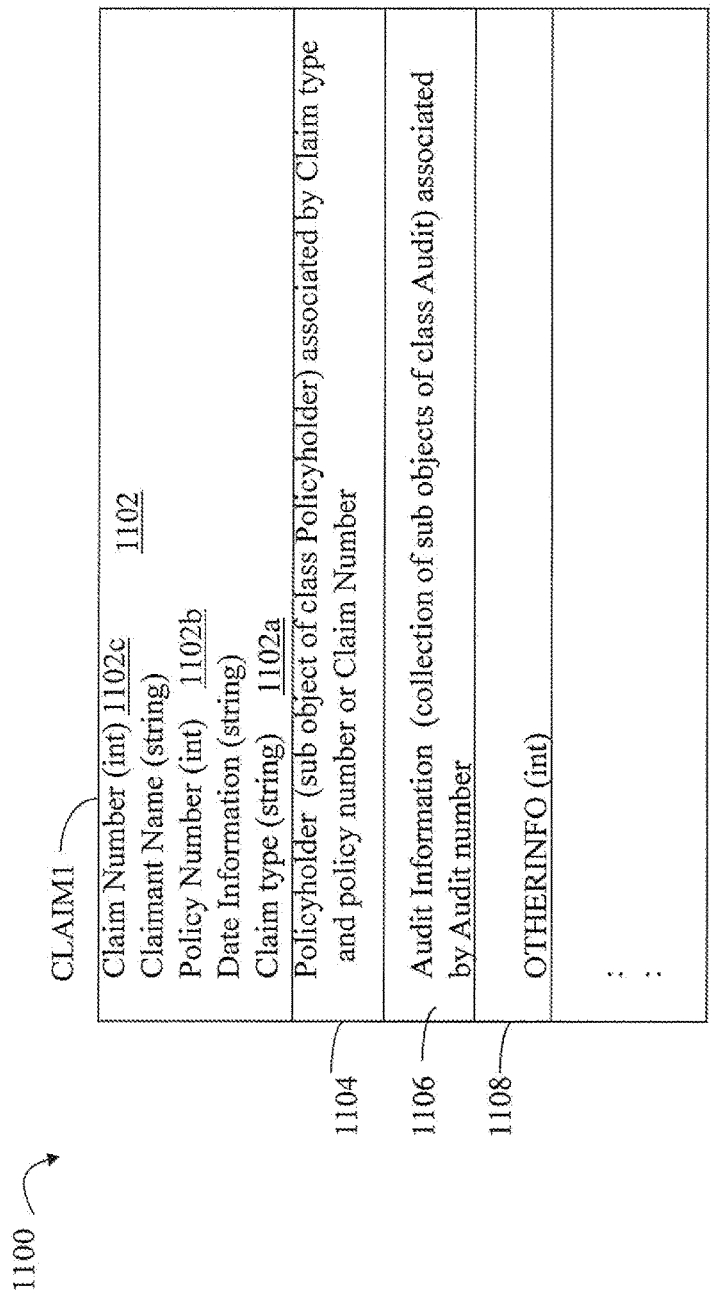
FIGS. 11A, 11B, 12 and 13 illustrate a second set of examples of dynamic data elements and associations in accordance with techniques described herein.

Referring to FIG. 11A, shown is an example 1100 of an object specified in accordance with techniques herein. The example 1100 illustrates data elements for an instance, CLAIM1, of a Claim class as may be included in the following class hierarchy with different class levels in the hierarchy denoted by indentation:

Insurance
    Claim
    Policyholder
    Audit Information

In the above example, Claim, Policyholder and Audit Information are all peer classes at a same level and are all defined as subclasses of a parent Insurance class. FIG. 11A illustrates exemplary property designations for the Claim class. Although not illustrated, similar property designations for class definitions may be made for the Policyholder and Audit Information classes. It should be noted that a class structure, definitions, and associated inheritance may be expressed using any of a variety of different syntaxes and techniques known in the art.

The example 1100 includes data elements of 1102 and 1108 which may be common to each type of insurance claim. It should be noted that 1102 as illustrated includes 5 data elements. Data elements 1104 and 1106 may be dynamic data elements utilizing associations as described herein. The data element Claim type 1102a may identify the particular type of claim as one of home, life, auto, and the like. In the example 1100, the Policyholder 1104 may be associated with CLAIM1 by Claim type 1102a and Policy Number 1102b, or by Claim type 1102a and Claim Number 1102c. The Audit Information 1106 may be associated with CLAIM1 by an Audit number. It should be noted that Audit number in this example corresponds to an abstracted data item which has not yet been defined and will be described in following paragraphs. The Audit Information 1106 may include information recorded with each access of the object CLAIM1. Audit information may track, for example, what users access the object CLAIM1, what type of operations are performed by each user, when such operations are performed, and the like. The Policyholder 1104 may describe information about the person who holds or owns the insurance policy against which the claim is made.

In accordance with techniques herein, the object CLAIM1 may be partitioned into a plurality of data elements. A portion of those data elements that may vary with type of claim or other aspect of a claim instance may utilize associations to provide for dynamic associations between the main data structure, Claim object, and its associated data elements comprising the structure as will now be described in more detail.

Figure 11B:
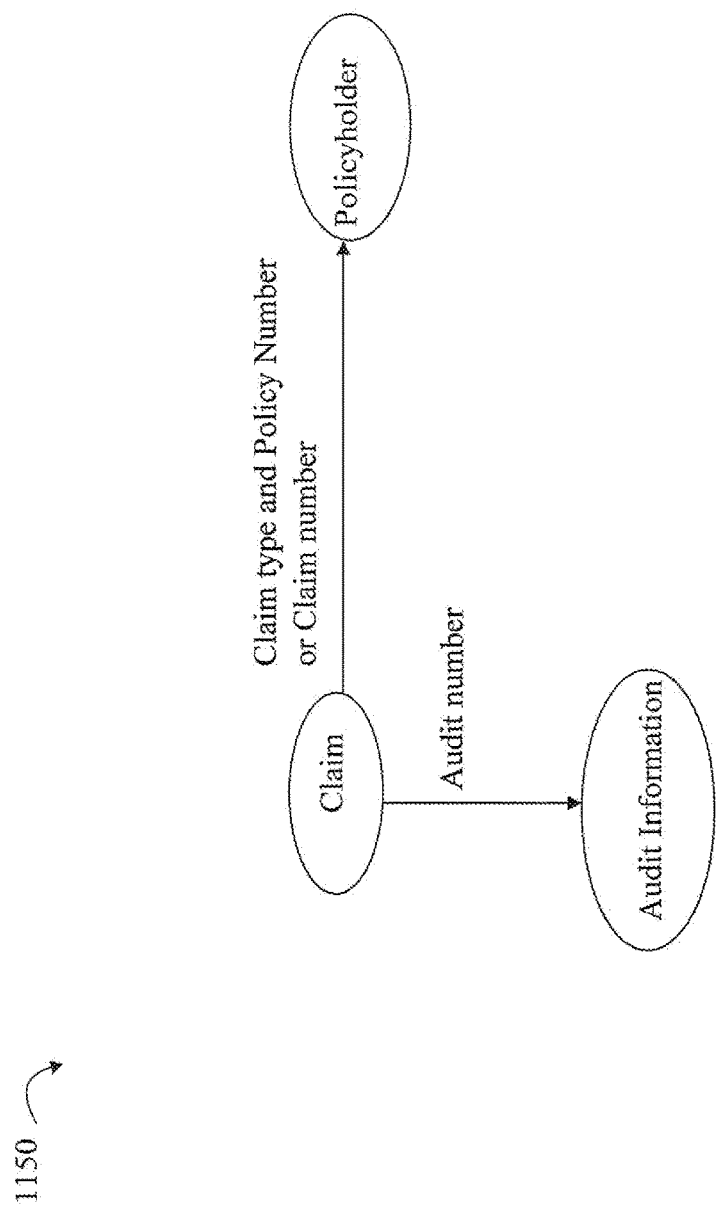

Referring to FIG. 11B, shown is an example 1150 illustrating in graphical form the associations between the Claim object of FIG. 11A and its dynamic data elements 1104 and 1106. In this representation, each node in the graph may represent a data entity which is an object or other data element (e.g., variable even though no variable is illustrated). The edges between nodes may characterize the association between the connected nodes. The representation 1150 is a directed graph including directed edges from a source to target node. The target node may correspond to the data entity being referenced through or included within another data entity.

It should be noted that the foregoing example 1150 is merely one way in which associations between data entities may be represented.

Figure 12:
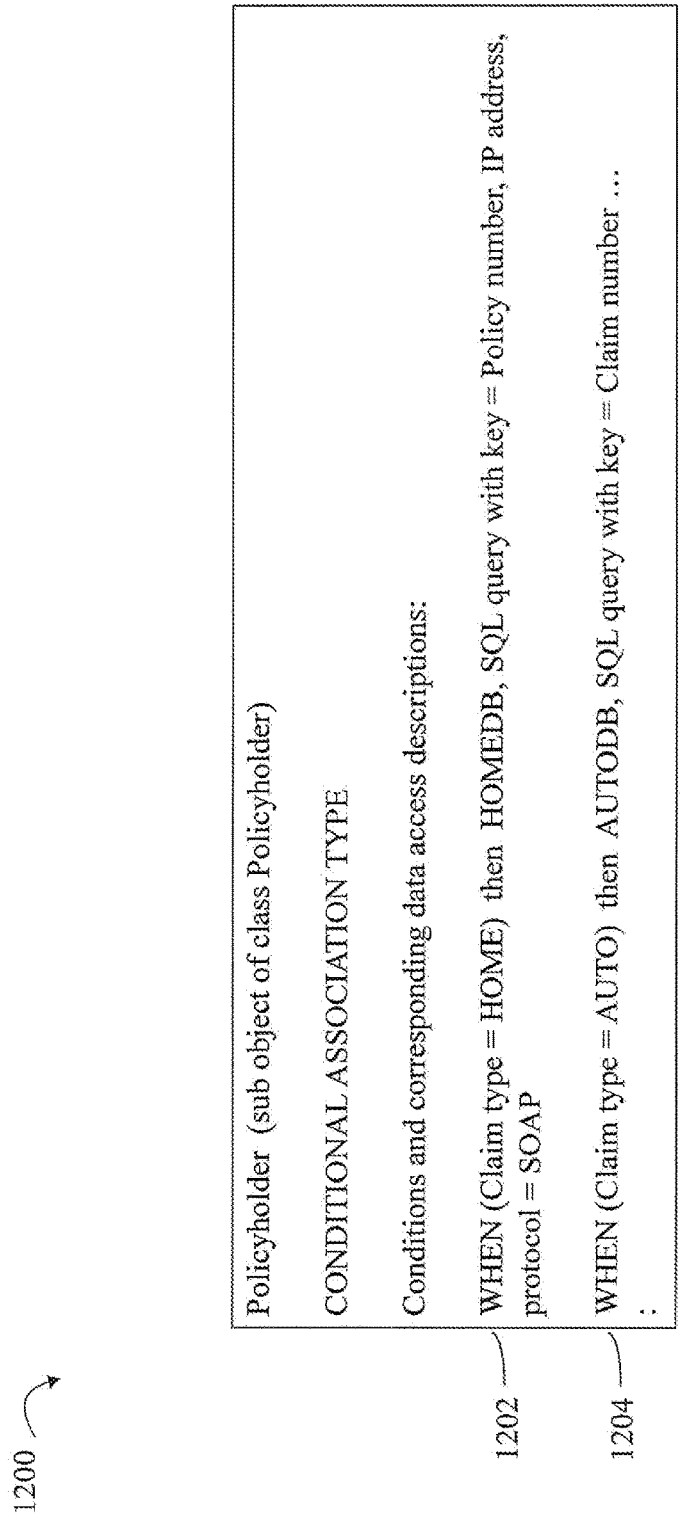

Referring to FIG. 12, shown is an example 1200 illustrating use of a conditional type association in representing the association between a Claim and a Policyholder. The example 1200 illustrates information that may be included in metadata for the data element Policyholder within a Claim object. The Policyholder information may be obtained from one of a multiple locations depending on the type of claim (Claim type data element 1102a). As illustrated by 1202, when the Claim type=HOME, then a first database, HOMEDB, including information on homeowner policies may be accessed. As illustrated by 1204, when the Claim type=AUTO, then a second database, AUTODB, including information on auto policies may be accessed. The conditional association may also include other conditions and data access descriptions than as illustrated in accordance with the particular policy types included in an embodiment.

In this example 1200, it should be noted that the Policyholder may vary in accordance with Claim type, Policy number and Claim number. The Claim type is used in connection with evaluation of the conditionals of 1202 and 1204. When 1202 evaluates to true, the Policy holder depends on the current Policy number (1202b of FIG. 11A) since this is used as the key in the SQL database query. When 1204 evaluates to true, the Policy holder depends on the current Claim number (1202c of FIG. 11A) since this is used as the key in the SQL database query.

Figure 13:
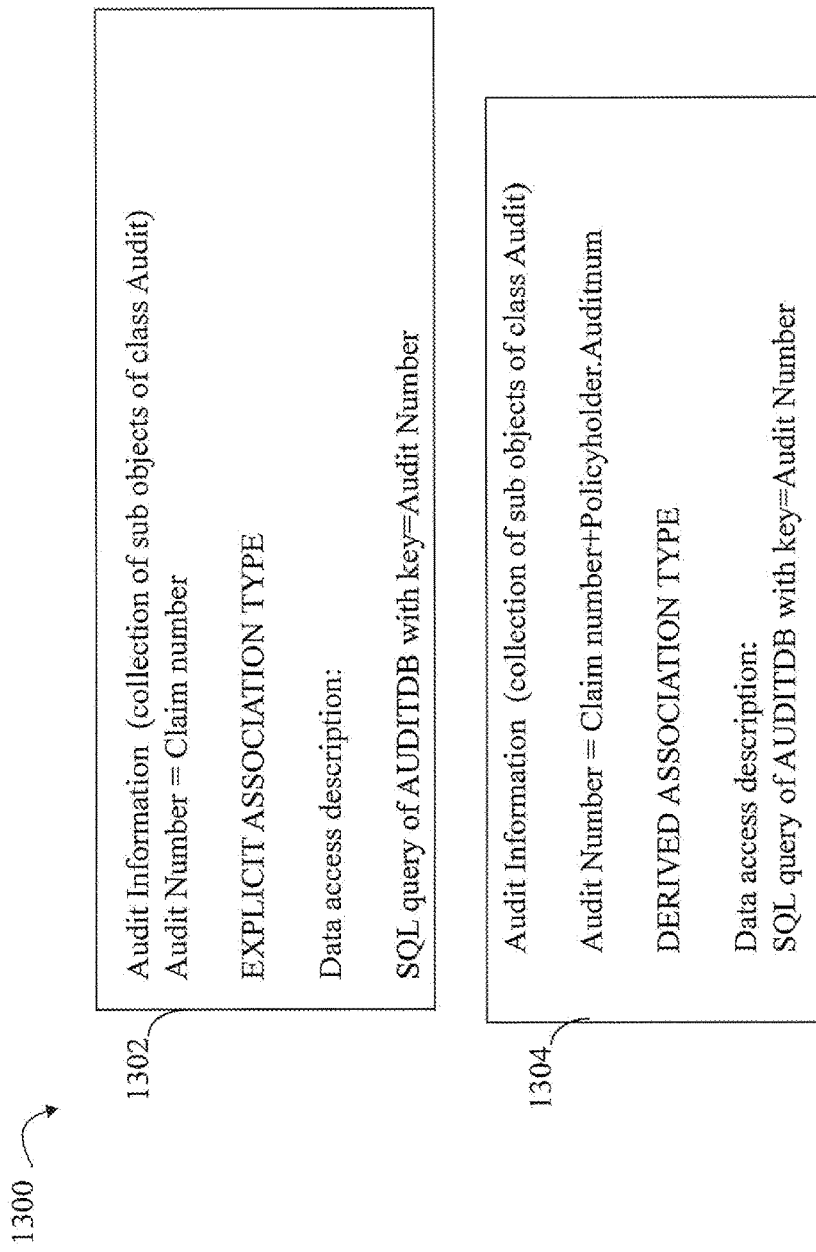

Referring to FIG. 13, shown is an example 1300 illustrating use of an explicit type association in representing the association between a Claim and Audit Information. The example 1302 illustrates information that may be included in metadata for the data element Audit Information within a Claim object. An audit database, AUDITDB, may be accessed to retrieve related audit information regarding a claim. Each time there is an operation performed on the claim object CLAIM1, corresponding audit information in the audit database may be updated. The same audit database may be accessed for all the types of claims so that only a single data access description is needed. In 1302, the claim number may be used as the key in connection with querying the audit database for the audit information. The audit information of the claim instance CLAIM1 may vary depending on when the request for the audit information is performed. It should be noted that Audit Number is further defined in 1302 as being equal to the data element Claim number (1102c) in the CLAIM1 object. An embodiment may refer to a variable or other data entity, such as Audit Number, used to associate two data elements when describing the overall data layout such as with class definitions. The variable or data entity may then be more specifically defined elsewhere. Thus, the variable or data entity Audit Number provides an added level or means for abstracting how Claim and Audit Information are associated. As such, an implementation of the techniques herein may provide a first interface by which the classes are defined such as may be used for defining the Claim class of FIG. 11A. In connection with this first interface, a user may abstractly describe how data objects, such as Claim and Audit Information, are associated. Another user of a second interface may further describe or define the foregoing abstract association by providing an explicit definition for Audit Number. As an example, the first user may be a non-technical business person defining the data layout, user interface and/or workflow that defines how the data is presented and processed in an application. The second user may be a technical user who then specifies system interfaces and an SQL query (including key number) for data retrieval. The foregoing abstraction provides for encapsulating details regarding the association within the metadata and an implementation may accordingly provide interfaces and ways of defining an association if desired. The foregoing may be embodied in an implementation in a variety of different ways such as through the use of declarative pages described in more detail elsewhere herein.

As a further variation, suppose an embodiment changes the way in which Audit Information is accessed from that as illustrated by 1302 to that as illustrated in 1304. In element 1304, the definition of Audit Number has been changed so that a derived association type is used rather than the explicit association type of element 1302. In 1304, the Audit Number is determined as a result of performing an operation, such as addition, of Claim number (data element in current instance of Claim class 1102c) and Policyholder.Auditnum. "Auditnum" may be a data element included in the class definition for Policyholder. Generally, for derived associations, reference may be made to data elements having a value determined at the point in time of evaluation.

When an instance of the Claim object, CLAIM1, is created using the foregoing definition as illustrated in FIG. 11A, the data elements 1104 and 1106 defined using associations may not be populated until each data element is actually referenced or otherwise utilized. The data access descriptions for 1104 and 1106 may be specified describing how to retrieve data for a data element when needed. A contextual evaluation is performed with respect to an association and corresponding data access description(s) at a point in time when the data element is referenced or otherwise utilized.

Based on the foregoing, the data structure definition (such as for the class definition of an object) may use associations in connection with those portions which may vary with current context and for which it is desired to retrieve such data on demand in a dynamic fashion when referenced. The foregoing techniques provide for specification of a flexible, dynamic data structure definition that may be used in connection with data structure processing so that each instance of a data structure being processed may be dynamically constructed having contents that may vary in accordance with the current context. Furthermore, memory may be efficiently used in that data elements are not retrieved until needed such as via a reference in connection with a particular operation or task. Additionally, through the use of memory caches, such as session cache(s) and/or a global (server) cache, an instance of data which is retrieved on demand may be available for reuse in connection with other references to the same data instance.

As illustrated above in connection with the techniques herein, an embodiment may utilize object-oriented techniques and define a class structure which may be characterized as a relatively "flat" class structure. This may be contrasted with defining a class hierarchy in which associations and dynamic data elements of the techniques herein are not utilized. Following is an example of a class hierarchy as may be utilized in a system which may not include the dynamic data elements with associations as described herein:

Insurance
    Claim /*general claim information applies to all claim types */
        AUTOCLAIM /*claim data elements specific to AUTO claims */
        HOMECLAIM /* claim data elements specific to HOME claims */
        LIFECLAIM /* claim data elements specific to LIFE claims */
    Policy /*general policy information applies to all types of policies
        AUTOPOL /* data elements specific to AUTO policies */
        HOMEPOL /* data elements specific to HOME policies */
        LIFEPOL /* data elements specific to LIFE policies */

The above hierarchy relies on class inheritance in forming a structure definition. For example, an instance of the AUTOCLAIM class (i.e. an AUTOCLAIM object) includes data elements from the Claim class and the data elements of the AUTOCLAIM class which are specific to AUTO claims. A HOMECLAIM object includes data elements from the Claim class and the data elements of the HOMECLAIM class which are specific to HOME claims. Thus, the structure of an object is determined in accordance with inheritance in the class hierarchy. In the foregoing, each indentation indicates another class level in the hierarchy so that, for example, Claim and Policy are subclasses of the Insurance class; AUTOCLAIM, HOMECLAIM, and LIFECLAIM are subclasses of the Claim class; and AUTOPOL, HOMEPOL and LIFEPOL are subclasses of the Policy class.

In contrast, an embodiment using the techniques herein may define an alternate class hierarchy as follows:

Insurance
    Claim
    Policy
Auto
Home
Person with classes Insurance, Auto, Home and Person defined as peer classes at a same level in the class structure and where the class Insurance includes subclasses Claim and Policy, Claim is a class including data elements for any type of insurance claim (such as illustrated in FIG. 11A), Policy is a class including data elements for any type of insurance policy (e.g., policy number, policy holder, etc.), Auto is a class including data elements describing an automobile (e.g., Vehicle Id No, registered owner, year, make model, etc.), Home is a class including data elements describing a home/house (e.g., address, value of the home, etc.), and Person is a class including data elements describing a person such as name, date of birth (DOB), address, and the like. It should be noted that the Auto class, Home class and Person class may, respectively, describe any auto, home and person without being limited to use with insurance. Rather than rely on inheritance, a reference to a particular object or data element in a class may be explicitly made based on dynamic and contextual evaluation of associations as described herein. For example, with reference back to FIG. 12, a conditional type association may be used to retrieve the correct instance of Policyholder from the correct database depending on Claim type, Policy number and Claim number.

What will now be described and illustrated is another example in connection with FIGS. 14A, 14B, 15 and 16 using the techniques herein. This example uses the classes Auto, Person, Home, Policy and Claim as mentioned above in an embodiment with a class structure.

Figure 14A:
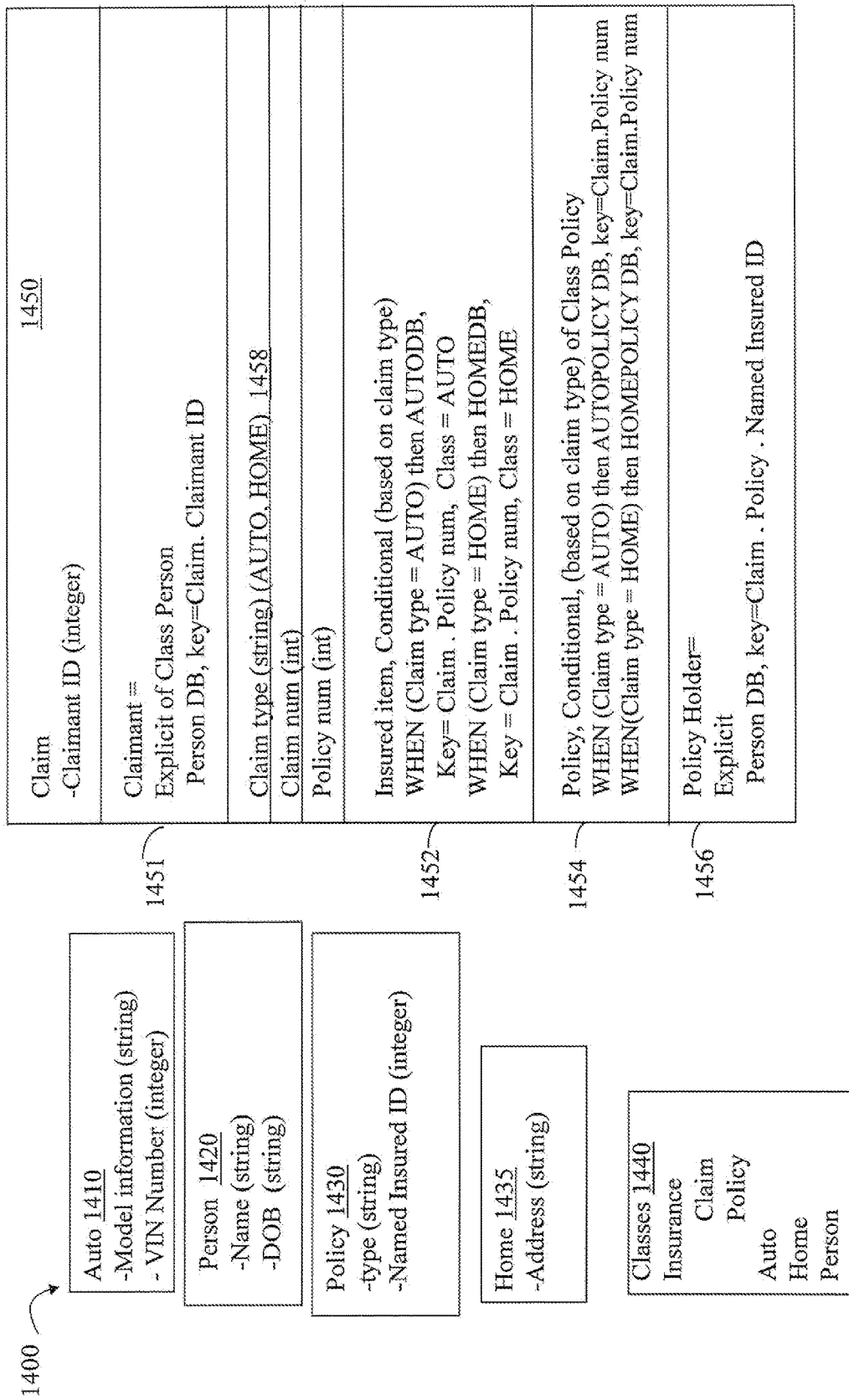
FIGS. 14A, 14B, 15 and 16 illustrate a third set of examples of dynamic data elements and associations in accordance with techniques described herein.

Referring to FIG. 14A, shown is an example 1400 illustrating classes and associated definitions that may be used in an embodiment in accordance with techniques herein. The example 1400 includes classes 1440 identifying the classes Insurance, Auto, Person, and Home at a same level. Element 1440 also includes Policy and Claim defined as subclasses of the parent class, Insurance. Each of the classes—Insurance, Auto, Home and Person—may be characterized as a peer class with respect to the others. Element 1410 represents data elements that may be included in a class definition for Auto. Element 1420 represents data elements that may be included in a class definition for Person. Element 1430 represents data elements that may be included in a class definition for Policy. Element 1450 represents data elements that may be included in a class definition for Claim. Element 1435 represents data elements that may be included in a class definition for Home. It should be noted that an embodiment may include other data elements in the foregoing class definitions than as in FIG. 14A.

The Claim class 1450 includes four data elements 1451, 1452, 1454 and 1456 which use associations as described herein. Elements 1452 and 1454 use conditional type associations and elements 1451 and 1456 use an explicit type association. Element 1452 specifies an association where information regarding an insured item is conditionally retrieved from the appropriate database in accordance with Claim type 1458. Element 1454 specifies an association where information regarding an insurance policy is conditionally retrieved from the appropriate database in accordance with Claim type 1458. Element 1456 specifies an explicit association where information regarding the policy holder is retrieved from the appropriate database (Person DB). Element 1451 specifies an explicit association where information regarding the claimant is retrieved from the appropriate database (Person DB). Thus, the claim class definition 1450 specifies different possibilities and variations in connection with accessing the different data elements. In other words, the associations define, for particular contexts, how to access data for the particular data elements.

The example 1400 of FIG. 14A illustrates what may be defined in connection with an embodiment using the techniques herein for an insurance claim application. The class structure and definitions may provide, alone or in combination with others not illustrated, for different types of possible insurance claims that may be made. Furthermore, it will be appreciated that the techniques described herein may be used by any software application that automates work processing.

Figure 14B:
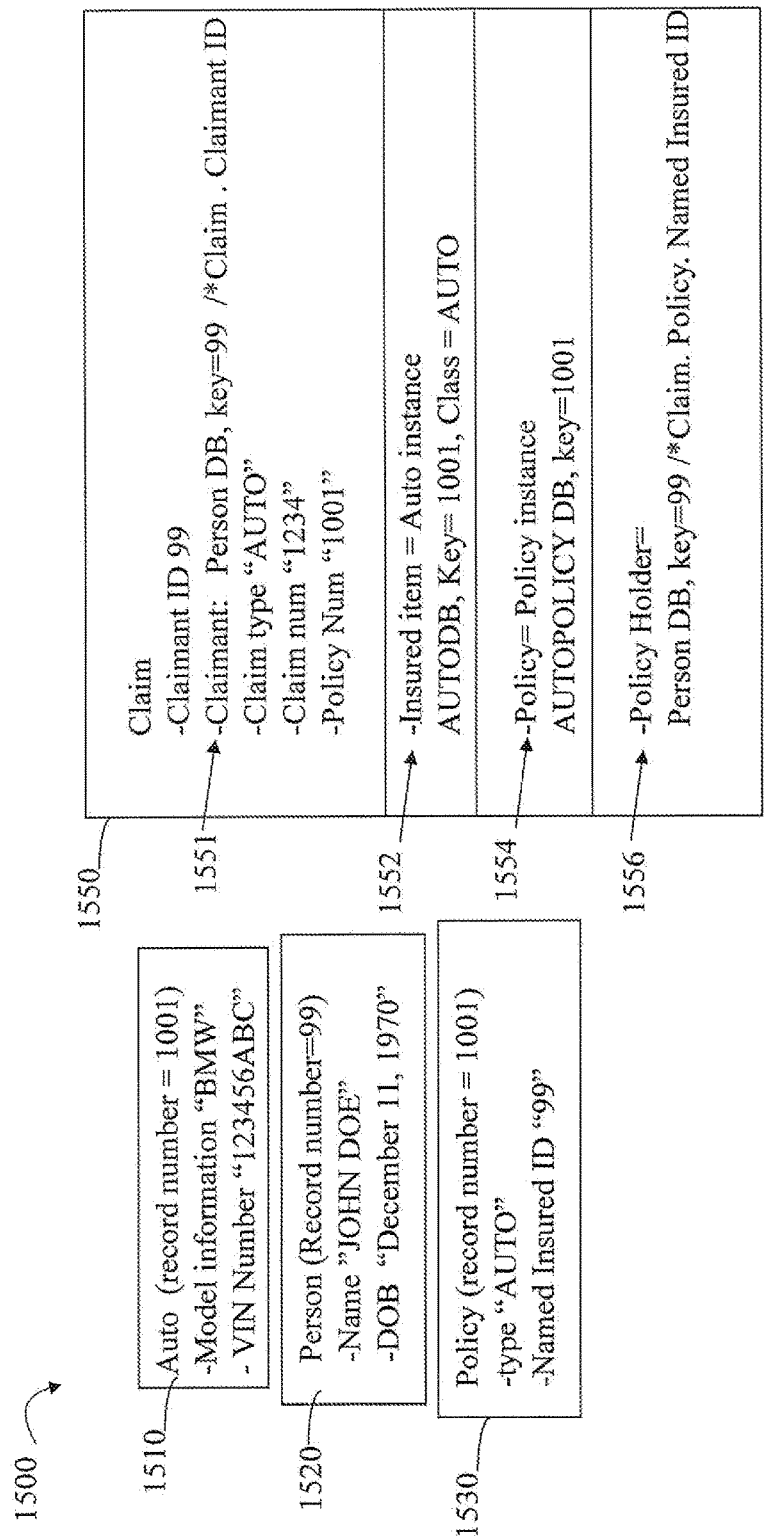

Referring to FIG. 14B, shown is an example of objects instantiated based on the class definitions of FIG. 14A. The example 1500 includes Auto object 1510, Person object 1520, Policy object 1530 and Claim object 1550 for an insurance claim made against an automobile insurance policy, such as in connection with an automobile accident. The Claimant 1551 is a data element that is an instance of Class Person (represented by 1520) determined by accessing a record in the database PersonDB using a key of 99 (current value of Claim.Claimant ID). Insured item 1552 is a data element that is an instance of class Auto (represented by 1510) determined by accessing a record in the database AUTODB using a key of 1001 (current value of Claim. Policy Num). Policy 1554 is a data element that is an instance of class Policy (represented by 1530) determined by accessing a record in the database AUTOPOLICY DB using a key of 99 (current value of Claim.Policy.Named Insured ID). Policy Holder 1556 is a data element that is an instance of class Person (represented by 1520) determined by accessing a record in the database PersonDB using a key of 99 (current value of Claim.Policy. Named Insured ID).

It should be noted that in FIG. 14B, no instance of the class HOME is illustrated for purposes of this example 1450.

Figure 15:
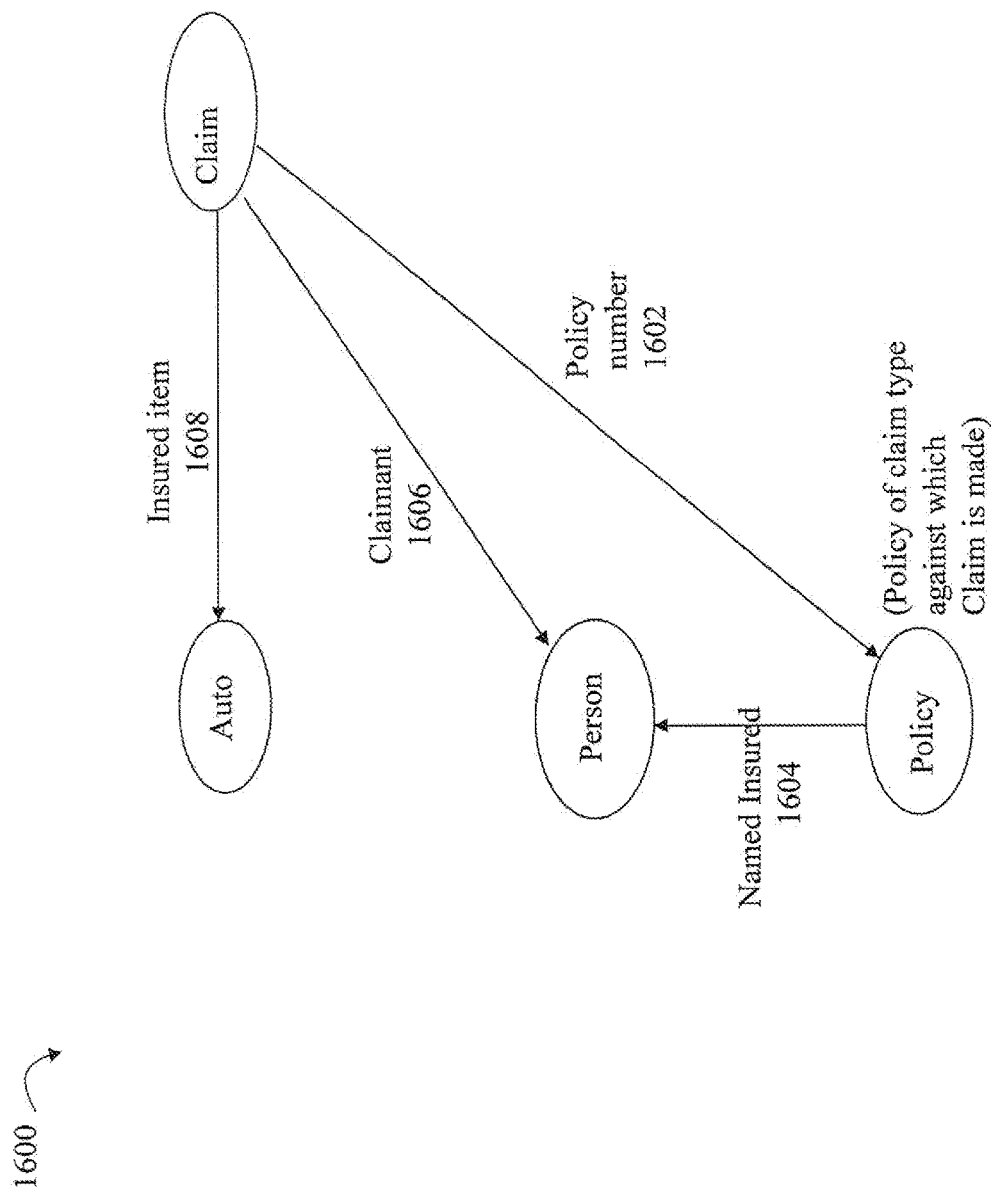

Referring to FIG. 15, shown is a graphical representation of associations between data entities of FIG. 14B. The example 1600 is one way in which the dynamic data elements using associations as illustrated in FIGS. 14A and 14B may be represented in accordance with conventions as described elsewhere herein, for example, in connection with FIG. 11B. It should be noted that the policy holder of a claim is determined indirectly through information in the policy and refers to an object of class person as represented by 1602 and 1604. The same object of class person is also referenced as the data element for the claimant data element as represented by 1606. Thus, FIG. 15 illustrates how a same instance of an object (e.g. Person) may be referenced through two different associations in a data structure. If the claimant changes in this example, edge 1606 would identify a different instance of Person than as identified by edge 1604.

It should be noted that if the Insured Item is an object of class Home rather than an object of class Auto, element 1608 would be replaced by a node indicating the Insured Item as a Home.

Figure 16:
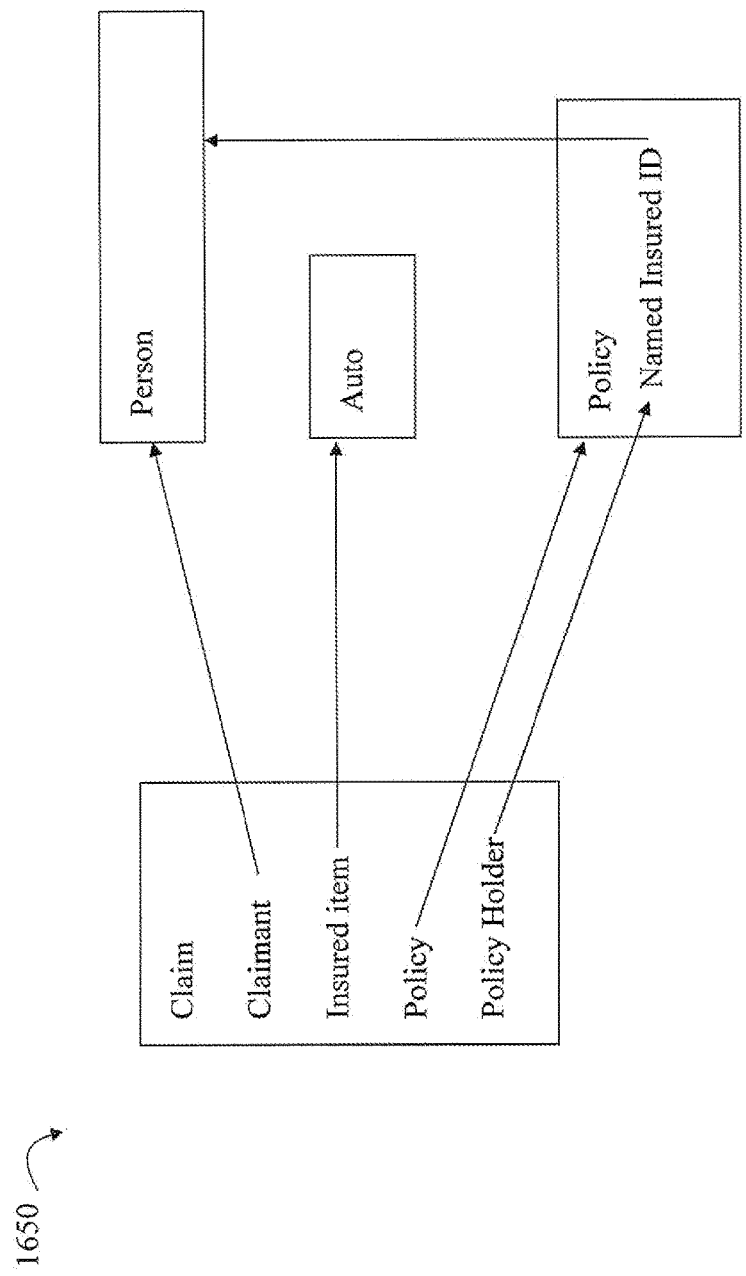

Referring to FIG. 16, shown is another graphical representation of the associations between data entities of FIG. 14B. The example 1650 illustrates another way in which the associations between the different data entities may be expressed.

In accordance with techniques herein when defining a data structure such as using a class definition, all possible associations between data elements are specified by defining criteria which is contextually and dynamically evaluated as part of data processing (e.g., during operation or runtime of a system using the foregoing definitions including associations) at a point in time to retrieve the data elements for a particular instance.

As described above, associations described herein may also be characterized as "loose" associations specifying a loose coupling between data entities (e.g., between object and sub-object or other data element such as a variable). The foregoing loose associations may be contrasted to associations characterized as tightly coupled associations. As an example, a person has a name and the association between person and name may be characterized as a tightly coupled association. The association does not vary with context at a point in time. A person may also be associated with a residence identifying where the person resides. The residence of a person may vary with one or more factors. For example, a person may have more than one residence and a residence currently associated with the person may vary with a time of year, for example, such as a seasonal residence. Time of year may be a parameter having a value included in the current context which is used in determining a person's residence at a point in time. Thus, a person has a residence which may be characterized as a loosely coupled association that varies and may be represented using one or more of the three types of associations described above.

Figure 17:
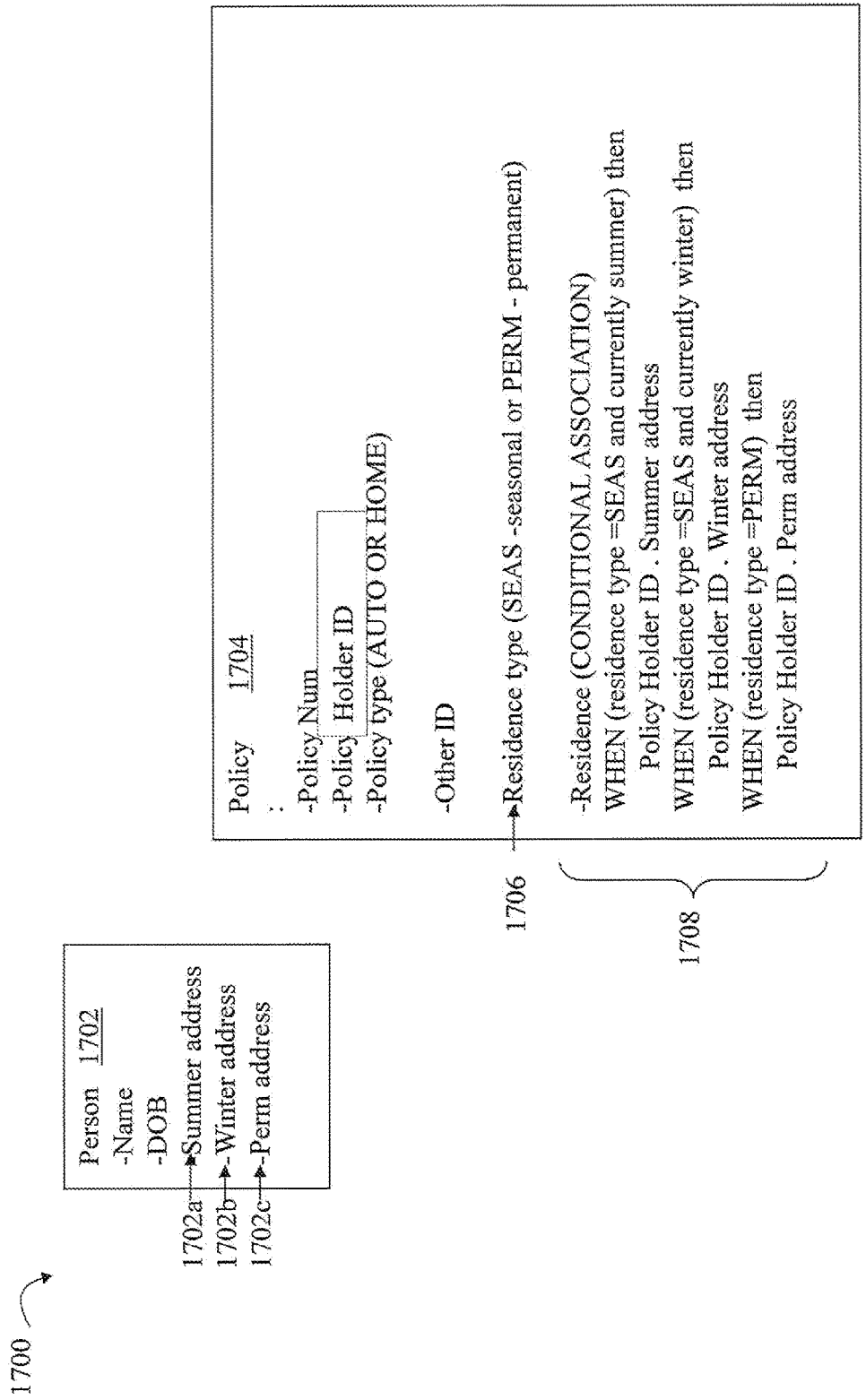
FIGS. 17, 18 and 19 illustrate a fourth set of examples of dynamic data elements and associations in accordance with techniques herein.
Figure 18:
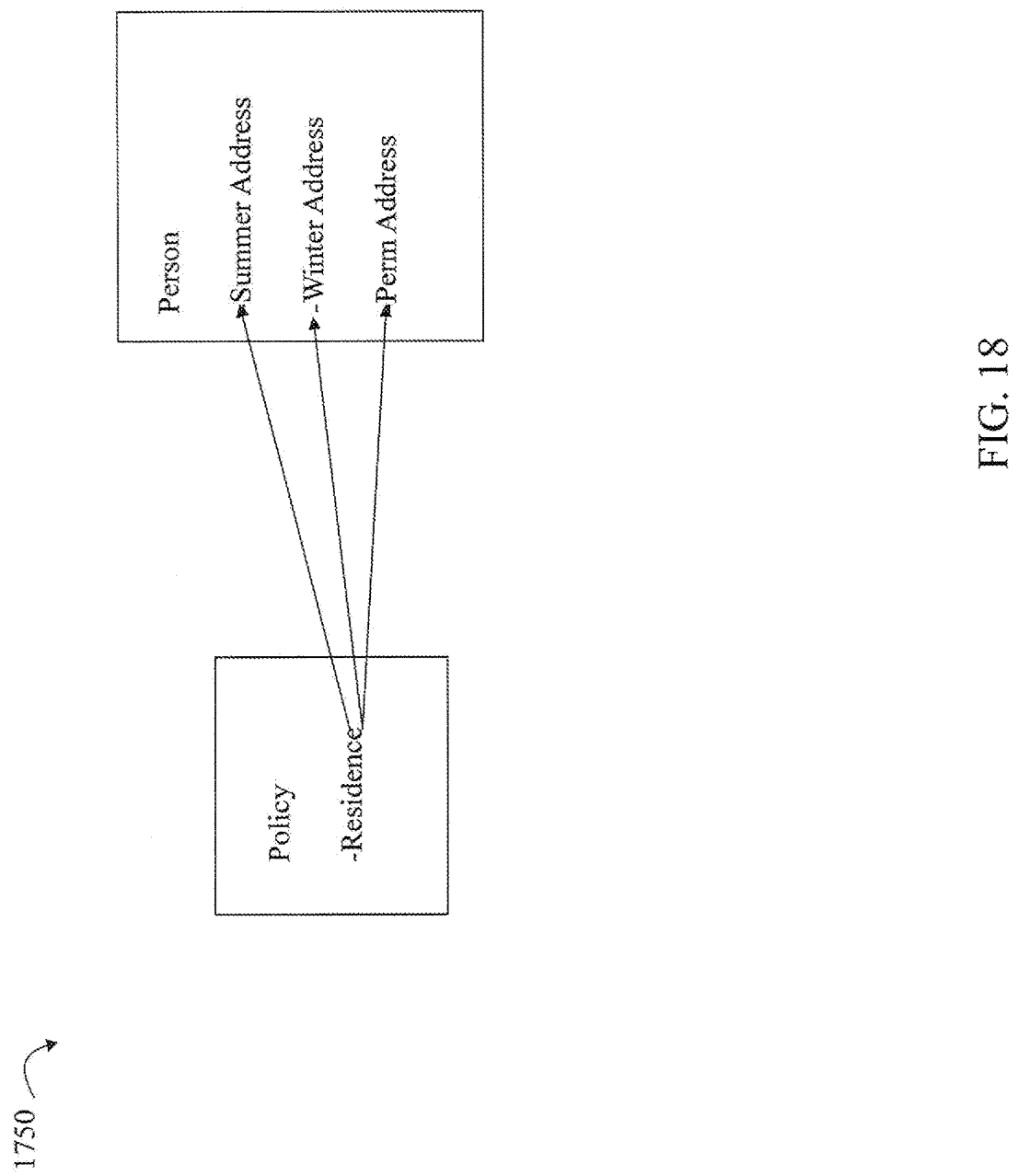

What will now be described in connection with FIGS. 17 and 18 is another example illustrating use of techniques described herein to express the above association of person and residence. In FIG. 17, shown is an example 1700 using data elements that may be included in a class person 1702 and data elements that may be included in a class Policy 1704. Element 1706 specifies a residence type as seasonal or permanent. Element 1708, residence, specifies a conditional association indicating how to determine a person's residence as it may vary in accordance with value for residence type. In connection with 1708, the residence for a policy instance is determined in accordance with residence type (1706) and the current season. The current season may be determined using current month and date information which is mapped to a particular season. For example, summer season may be mapped to the months of May through September, and winter season (as related to residences) may be all other months of the year.

Referring to FIG. 18, shown is a graphical representation of the associations in accordance with the definitions of FIG. 17. It should be noted that FIG. 18 illustrates the 3 possible outcomes for a particular instance of the policy class. If a policy object is instantiated, a graphical representation of the association for the instantiated object would include only one of the three edges illustrated in the example 1750.

The three exemplary types of loose associations described above—explicit, conditional and derived—may be characterized as parameterizing the association between data entities where the parameters describe a current context when evaluated at a point in time when a data entity (such as a data element within an object or other data structure) is requested. A loose association between data entities (as described above) is one in which the two data entities have an association with one another which may vary in accordance with one or more parameter values describing the current context. As such, the criteria which is evaluated in connection with an association in order to retrieve a data element at a point in time may also be generally represented as a function having a value which depends on one or more other values.

As described herein, the criteria may include one or more parameters as well as conditionals (such as included in the conditional type association), that reference or otherwise use such parameters in association specifications. These parameters have values which may vary in accordance with time. (. A current context at a particular point in time may be expressed as data values for the parameters determined at that point in time. The data values of the current context may then used to evaluate the criteria.

Figure 19:
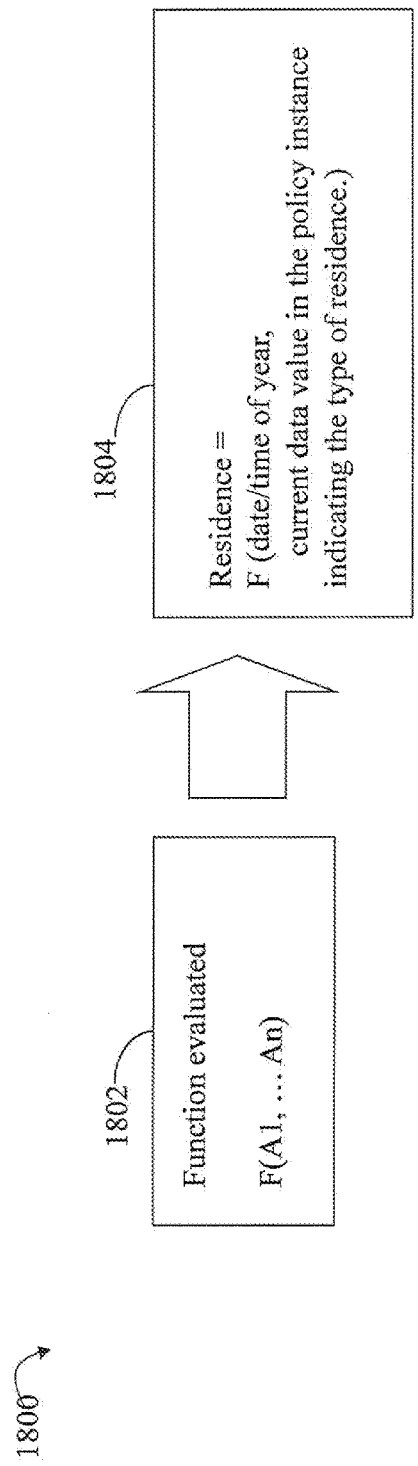

Referring to FIG. 19, shown is an illustration of a parameterized representation of a function that may embody the criteria where the function is evaluated at a point in time in accordance with a current context. Element 1802 provides a general representation of a function F which may be evaluated using one or more parameters denoted in a list form as A1, . . . , An, where each Ai, i=1 . . . n corresponds to one of the parameters which is evaluated at a point in time in accordance with a current context. For example with reference back to FIGS. 17 and 18 in connection with determining a residence as an address, element 1804 specifies that the residence expressed as an address is determined as a function of (e.g., varies in accordance with, or is otherwise dependent upon) the current date/time of year and a current data value in the policy instance indicating the type of residence (value of residence type 1706). It should be noted that element 1802 is a general way in which any of the associations described herein may be represented. In connection with techniques herein, the criteria (e.g., one or more parameters and any references and uses thereof in connection with associations) may be evaluated at a particular point in time when the dynamic data item is referenced or otherwise utilized. At this point in time, values for the parameters may be determined for use in evaluating the criteria in accordance with the particular instance of the data structure. The one or more values may be used in the association such as, for example, in the conditions and/or data access descriptions. The one or more values may represent a current context at a particular point in time (e.g., contextual criteria expressed as parameters which have values based on an evaluation of the parameters at the point in time).

With reference to element 1802, the function F to be evaluated may be implemented as a routine using appropriate mathematical and/or logical statements embodying the criteria which, when evaluated, may be used in connection with providing a retrieved data item as a function return value. The inputs to the function F at a point in time may be the data values for the parameters (e.g., the data values represent the current context at the point in time). The processing performed within a body of the function F may be in accordance with the criteria to be evaluated to provide the return value of the data item for the association. For associations including one or more data access descriptions, the body of the function F may perform processing to select a data access description (e.g. such as a result of evaluating the different conditions of a conditional association). Furthermore, the function F may determine any values for items in the data access description (e.g., SQL query parameter values for a key determined by evaluating any expressions, retrieving values for any variables or data items used in expressions, and the like.) The function F may then retrieve the data item using the foregoing data access description evaluated dynamically in accordance with the current context.

With reference to element 1804, the function F may return an address indicating the residence based on data values provided for the parameters of date/time of year and type of residence. The function F may perform processing as represented and described in connection with element 1708 of FIG. 17 to evaluate the illustrated conditions. For the condition that evaluates to true, the function may then retrieve the appropriate data value which may then be returned as the data for the Residence data item.

To further illustrate, reference is made to FIG. 9 where the criteria includes parameters or variables D2.A, D2.E, and D2.C. The criteria also includes references or uses to these parameters in the data access descriptions of 902 such as the conditionals C1, C2 and C3 and the SQL query keys. The parameters used in retrieving data element B may be expressed as dependent variables or parameters of a function, F(D2.A, D2.C and D2.E). A current context may be specified for a point in time by determining data values for the parameters D2.A, D2.C and D2.E at the point in time. The data values may be provided as an input function to dynamically evaluate the criteria embodied within the function at the point in time such as, for example, to evaluate the conditionals C1, C2 and C3 and the keys used in the data access descriptions to access the data element B. The function may implement logic expressed in the conditional association of element 902 to return data for element B. The function may evaluate conditionals C1, C2 and C3 to select one of the three access descriptions (e.g. A1, A2 and A3). The selected access description may then be evaluated to provide values for any data access description parameters (e.g., such as a data value for the database key). The function may then retrieve the data for element B using the selected access description where the retrieved data may be returned from the function.

In an embodiment when defining the data structure (such as a class definition), associations between data entities (such as between an object and its data elements) may be specified in a declarative manner. For example with reference to FIG. 14A including a claim class 1450, the policyholder 1456 may be specified as a data element in the claim structure. In an implementation, the details of how the data for the policy holder is determined and location from which the policy holder data is retrieved (which may vary) may be abstracted through the use of a declarative page. The policy holder declarative page may, in turn, be referenced within a user interface and the individual defining the user interface does not need to be concerned with the association details that are included in the declarative page. Instead, another user may specify the data structure and details of the association metadata including the conditionals and data access descriptions within the declarative page definition. In other words, declarative pages provide developers with unprecedented flexibility in building application by abstracting the task of data retrieval and association definition from designing and building other components (e.g. defining a class structure, user interface and process definition etc.) of the application.

This is best explained by using an example of an auto insurance application that may use many risk modifiers to calculate an underwriting score. The underwriting rules (decision rules, declarative expressions, etc.) responsible for doing the calculation may simply reference the risk modifier data elements contained within a declarative page. During processing of the underwriting rules at runtime, the risk modifier data will either simply be referenced if it already exist in the session or global cache or it will be automatically retrieved according to the data access descriptions and associations specified by the declarative page. The declarative page for risk modifier data elements is not defined as part of the underwriting processes and rules that use it. This is beneficial not only because of the flexibility it provides during development, but also because it allows reuse of data structures and makes the overall application easier to maintain. By way of example, the data source or mechanism (e.g. protocol) for retrieval throughout the application can be updated by simply changing the particular declarative page definition once. Furthermore, the data structure for risk modifiers can be used in other insurance applications because it is nicely encapsulated, apart from the processing application rules.

In an embodiment in accordance with techniques described herein, a page may be generally characterized as corresponding to an instance of one of the atomic portions or units of data such as a data element (e.g., object or other instance of a data entity). For example, a first page may correspond to an instance of an object of class person 1420 of FIG. 14A, a second page may correspond to an instance of an object of class policy 1430 of FIG. 14A, and so on. In one embodiment in accordance with techniques herein with reference back to FIG. 2, data may be retrieved from the persistent object store 82 (e.g., a database) and converted to an XML-based structure referred to as a page which may be stored in memory, such as in the session cache 84 for a client. A page in accordance with the XML-based structure may contain property-value pairs corresponding to columns and associated values retrieved from the database for the particular object or other instance of a data entity. A declarative page definition may be characterized as a definition for the page and may include, among other information, the data access description(s) and conditionals (if any) of the associations as described herein so as to encapsulate or further abstract how the data for the corresponding page is obtained on demand. For example, a declarative page definition may identify the type of association used to retrieve the data element, include any SQL query or conditions, and the like. As a further example with reference to FIG. 14A, a declarative page may be defined and referenced in connection with a claim class definition for Claimant 1451. The declarative page defining the Claimant may include information represented in 1451 to access the Claimant data item instance. The declarative page definition for Claimant may identify that the page is an instance of class Person, the SQL query parameters (e.g., including key=Claim.Claimant ID) used to retrieve the data for the page, the database to be accessed (e.g., PERSON DB), the location of the database (e.g., IP address, database server name), the protocol (e.g., Simple Object Access Protocol (SOAP)) to use when accessing the database, and the like. The declarative page definition may also define other attributes of the page or instance of the object or other data entity. In this manner, a first person defining the classes of FIG. 14A may simply include in the class definition the name of the declarative page definition for "Claimant". A second person may define the contents of the declarative page definition specifying how to access and retrieve data for the Claimant data element 1451 as just described. Thus, the data access descriptions may be abstracted from the class definitions through the use of the foregoing.

As another example with reference back to FIGS. 7 and 8, automobile information or driving record information as may be obtained from the RMV database may be implemented using pages. A first declarative page definition may be specified for automobile information (e.g., VIN number, make, model, year, etc.). A second declarative page definition may be specified for a driving record (e.g., name, D.O.B., residence, etc.). Each instance of a driving record for a different person may be stored as a page. Similarly each instance of a automobile record for a different vehicle may be stored as a page. Each of the foregoing pages (e.g., instance of a data entity) may refer to existing data. Pages may be created and refreshed on demand as needed such as, for example, as referenced by rules in a rule based system. As will be appreciated by those skilled in the art, an embodiment may implement the associations techniques as described herein in other ways.

In accordance with techniques described herein, an instance of a data structure, such as an object, may be defined to have a layout or definition which includes one or more dynamic data elements as described above. For a dynamic data element, an association may be described in metadata where the association specifies one or more data access descriptions. The data access description specifies how to access or otherwise obtain data for the data element at a point in time. The data access description is utilized and evaluated at a point in time when the dynamic data element is needed. In other words, each time an instance of a data structure is created, retrieved from a database, or otherwise initially loaded into memory, all data elements of the instance may not be currently needed. As such, non-dynamic data elements which do not utilize associations may be loaded into memory. Additionally, dynamic data elements utilizing associations included in the data structure may be selectively loaded at different points in time as desired during data processing, such as, during execution of a system utilizing the techniques herein. At these points in time, the criteria included in the association is evaluated.

As an example, a data structure may be created at a first point in time in a first user database session and stored persistently to a database. At a later point in time in a different database session, a user may perform an operation resulting in loading the data structure from the database to a session cache for the user's current database session. Operations performed by the user during the current database session may be performed with respect to a copy of data retrieved from the database as stored in the session cache for the current database session. Subsequently, such as, for example, at the end of the user's database session, the copy of the data for the session may then be committed or stored persistently to the database. The techniques herein may be used in connection with the instance of the data structure retrieved from the database and loaded into the user's current session cache. The non-dynamic data elements may be retrieved and stored in the cache. For those dynamic data elements, the data associated therewith may be selectively retrieved from the database or other location at a point in time as desired in accordance with the defined association included in the data element's metadata. Each dynamic data element may use a data access description and other metadata affecting whether the data element is automatically retrieved at different points in time. For example, the metadata may indicate whether to utilize a cached copy or otherwise always retrieve a fresh copy from the persistent object database. Furthermore, the metadata may specify whether to refresh the cache copy of the data element after a specified time period (e.g., using an expiration time for the cache copy of the data element so that when a reference is made to the data element and the data element has been stored in the cache for the amount of time indicated by the expiration time, the data access description is again evaluated and used to retrieve a fresh copy of the data element), and the like. Thus, the amount of cache or other memory allocated for the data structure instance may vary with time. Until the dynamic data element is needed, data for the data element may not be retrieved and loaded into the cache or other memory.

In furtherance of the foregoing example, consider the case where the user performs an operation requiring the instance of the data structure to be retrieved and loaded from the database into the session cache. The data structure may include a first dynamic data element. It may be that the particular operation performed by the user does not actually require or utilize the first dynamic data element but rather may use other data elements of the structure. As such, the first dynamic data element may not be initially retrieved and stored in the session cache. At a later point in time during the session, the user may perform a second operation which does utilize the first dynamic data element. At this second point in time, data for the first dynamic element may be retrieved and loaded into cache.

Dynamic data elements may also be loaded and stored independently of each other. For example, a data structure may include two dynamic data elements. A first of the dynamic data elements may be retrieved and loaded into the session cache at a first point in time but not the second element. At a later point in time, an operation may be performed causing the second dynamic data element to be loaded and stored in the session cache. A data element may also be loaded into a global cache or memory as also described and illustrated elsewhere herein. In one embodiment, data included in a page as described above may be stored in either the session cache level or the global cache level in accordance with appropriate properties or attributes of a corresponding declarative page definition. Examples of types of data that may be stored in a page (e.g., data object such as an instance of a class) designated as being a session cache level may include information about a current user or current user session such as personal information for the user, user credentials or permissions, customized user preferences, information about a process, and the like. Examples of types of data that may be stored in a page designated as being at the global cache level (e.g. where all users reference or work from the same copy) may include commonly used lookup lists, code tables, translation tables, system settings, commonly used information, data that changes infrequently, and the like.

In an embodiment, definitions for data elements may be specified such as using a class structure and providing class definitions including data elements. Definitions for the data elements may include using one or more associations as described herein. At a later point in time, a system may utilize the foregoing definitions in connection with processing performed during runtime. For example, the definitions may be used in connection with creating a class instance (e.g., data object) and using the associations to dynamically retrieve data elements when referenced or otherwise used during processing. A plurality of events (also referred to as "trigger events") may trigger processing to access data for a dynamic data item in accordance with associations as described herein. Such events may include a reference or use of the dynamic data item. Such use may be, for example, a direct reference by a user on a client viewing information including the dynamic data item on a current UI display. Another example of an event which triggers processing to access the data for a dynamic data item may be in connection with rule processing. For example, one or more declarative rules may be defined which specify relationships between data elements in the form of an equation such as A=B+C. Such declarative rules may, in turn, be referenced by other decision rules where the value of A is used in a conditional evaluation. During processing of the decision rule at run time, if the values of B or C are not available in session or global cache in order to compute A, such rule processing may result in automatic retrieval of B and C and updating of A. Processing performed to access data for a dynamic data item may include evaluating the criteria in accordance with a current context at a point in time, determining whether a copy of the data is already loaded into virtual memory such as a session cache or global (server) cache, retrieving or loading the copy of the data from a database or other data store if not already in virtual memory, and the like. Variations of the foregoing may occur depending on characteristics or attributes specified for a particular page affecting how long a cached copy is considered valid (e.g., expiration time), and the like. As such, in accordance with techniques herein using associations and defined data access descriptions, each instance of a data element may be retrieved on an "as needed" (on demand) basis in accordance with the current context. Additionally, once the instance in loaded into virtual memory, the same instance may be reused at different points in time, for example, by the same user session if stored in a session cache, or for example, by multiple users if stored in the global or server cache.

As described herein, the associations between data entities may be specified in a declarative manner such as using the declarative pages. Within the declarative page definitions may be one or more a data access descriptions specifying how to access data associated with the dynamic data element. An embodiment may define a set of declarative page definitions for use by one or more applications.

The techniques herein have broad applicability in automating business processes in a wide variety of industries. Illustrated herein are a few examples of data structures for units of work (hereinafter "work items") that are processed by workflows in order to automate business processes in the insurance industry. For example, in a claims processing application or in an insurance application renewal system, each work item may represent and contain data related to a particular claim and an insurance application, respectively. By way of non-limiting example, the techniques herein may also be used in connection with data processing for workflows in other areas such as finance (e.g., loan processing and approval), healthcare, automotive, food and restaurant industry, sales and services related to a variety of different consumer goods and services (e.g., clothing, electronic goods including computers, appliances, etc.), and the like. Business processes as may be applicable to one or more of these industries may relate to, for example, purchasing a product or service, returning a previously purchased item (e.g., such as in connection with sales of any consumer products), submitting a complaint or problem report requiring resolution (e.g., such as in connection with a purchased defective consumer product or service), inventory update and purchasing (e.g., tracking sold items, when to reorder supplies, etc.), and the like.

As described above, data structures which are associated with one another in accordance with techniques herein may be objects. As will be appreciated by those skilled in the art, the techniques herein for associations may be more generally used to associate data structures representing other data entities besides objects. For example, the data structures associated using the associations techniques herein may be database tables such as relational database tables which are in a normalized form. As known in the art of relational databases, a normalized database structure, such as a table, has a form which is suitable for use with performing different operations (e.g., querying, inserting, updating, deleting) without resulting in undesirable or unexpected results such as anomalies that may cause a loss of data integrity. For example, a database table may be in third normal form as well as first normal form or second normal form for use with associations described herein. A database table may be in any one of a variety of different normal forms where the different normal forms are associated with criteria providing varying degrees vulnerability to logical inconsistencies and anomalies. It should also be noted that each of two data structures associated with one another in accordance with techniques herein may represent different data entities. For example, associations as described herein may be used to associate a first data structure, which is an object, with a second data structure, which is a relational database table. An existing legacy system may utilize and store data as relational database tables. A second system may utilize and store data as objects in an object database (e.g., having a form other than as a relational database table of the legacy system). Associations as described herein may be used to associate a data structure from the foregoing legacy system with another data structure from the second system.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A server for processing an instance of a data structure, the server comprising:
    a volatile data store; and
    a processing unit in communication with the volatile data store,
    wherein, at a first point in time, the processing unit:
        receives a request to create an instance of a data structure according to a definition of an object-oriented class defining data elements associated with the instance, those data elements including a dynamic data element the definition of which uses an association specifying how to retrieve data for the dynamic data element in accordance with criteria evaluated using a context that is current subsequent to the first point in time,
        in response to receiving the request, allocates storage in the volatile data store for data elements in the data structure which are not dynamic data elements but does not allocate storage in the volatile data store for the dynamic data element;
    wherein, at a second point in time that is subsequent to the first point in time, the processing unit:
        detects a reference to the dynamic data element in connection with a triggering event; and
        in response to detecting the reference, the processing unit:
            allocates storage in the volatile data store for the dynamic data element,
            evaluates the criteria using a current context determined at the second point in time, and
            retrieves data for the dynamic data element in accordance with the association used in the definition of that data element and in accordance with the criteria evaluated using the current context at the second point in time.

2. The server of claim 1, wherein the use one or more parameters which are evaluated in accordance with a current context at each point in time when the dynamic data element is referenced.

3. The server of claim 2, wherein at least one of the parameters is a value of another data element in the instance of the data structure.

4. The server of claim 2, wherein at least one of the parameters is based on a date associated with a time at which the dynamic data element is referenced.

5. The server of claim 1, wherein the instance of the data structure is saved to a persistent data store.

6. The server of claim 1, wherein the server further comprises
    a cache that stores the one or more data elements associated with the instance of a data structure, wherein the cache is any of a session cache for at least one client and a global cache used by a plurality of clients; and
    wherein the data is retrieved from a persistent data store to create the instance of the data structure in the session cache.

7. The server of claim 6, wherein a different session cache is used for each client.

8. The server of claim 7, wherein a copy of the instance is stored in the global cache.

9. The server of claim 8, wherein each of the plurality of client sessions corresponds to a different client connected to the server and the global cache is used as a server cache by the plurality of client sessions.

10. The server of claim 1, wherein the data structure is an object in an object-oriented environment.

11. The server of claim 10, wherein each data element associated with the object represents any of an attribute and a property of the class.

12. The server of claim 10, wherein a definition for the data structure is included in a definition of the class, the class being included in a class structure.

13. The server of claim 12, wherein the dynamic data element is included in a second class definition that is defined at a same level in the class structure as the class.

14. The server of claim 1, wherein the evaluating the criteria at the second point in time results in identifying an existing instance of a data entity which is retrieved from a data store by the retrieving.

15. The server of claim 1, wherein the association is an explicit association specifying a single data access description identifying how to retrieve the data for the dynamic data element in accordance with the current context at the second point in time.

16. The server of claim 1, wherein the association is a conditional association including a plurality of conditions and corresponding data access descriptions, wherein if one of the conditions evaluates to true, a selected one of the corresponding data access descriptions is used to retrieve data for the dynamic data element.

17. The server of claim 1, wherein the association is a derived association including a single data access description identifying how to retrieve data for the dynamic data element in accordance with the current context at the second point in time, the derived association including one or more values which are further processed at the second point in time in order to retrieve data for the dynamic data element.

18. The server of claim 17, wherein the derived association includes a plurality of data values which are further processed in accordance with an operation identified in the derived association.

19. The server of claim 18, wherein the operation includes performing any of a mathematical operation and a string operation on at least a portion of the plurality of data values.

20. The server of claim 18, wherein the operation uses any of forward chaining and backward chaining inference methods.

21. The server of claim 1, wherein the association includes a data access description that identifies how to retrieve the data for the dynamic data element, wherein the data access description includes an item that depends upon at least one of the criteria.

22. The server of claim 21, wherein the item is a key included in a database query and the key has a value determined in accordance with a parameter included in the criteria, the parameter having a value determined in accordance with a current context at a point in time when the dynamic data element is referenced.

23. The server of claim 21, wherein the data access description identifies at least one of a database to be accessed in connection with the retrieving, a location of a database, and a protocol.

24. The server of claim 1, wherein the association is included in metadata for the dynamic data element.

25. The server of claim 24, wherein in response to detecting the reference, a portion of the metadata is updated.

26. The server of claim 1, wherein the data structure represents a work item in a business process.

27. The server of claim 26, wherein the business process is managed by any of a public and private entity.

28. The server of claim 27, wherein the business process is a process in one of a plurality of areas, the plurality of areas including telecommunications, government, insurance, insurance claims processing, insurance application renewal, insurance underwriting, finance, loan processing, healthcare, automotive, retail product sales, clothing, marketing, computer services, food and restaurant industry, consumer sales and services, purchasing a product or service, returning a previously purchased item, submitting a complaint or problem report requiring resolution, ensuring compliance with government rules and regulations, and inventory update and purchasing.

29. The server of claim 1, wherein in connection with detecting the reference, the data for the dynamic data element corresponds to a first data instance, and, if the first data instance is already loaded into the volatile data store, the first data instance already loaded into the volatile data store is used in connection with the retrieving, and otherwise additional processing is performed to load the first data instance into the volatile data store.

30. The server of claim 1,
wherein the dynamic data element is referenced at the first point in time and the criteria is evaluated in accordance with the current context at the first point in time to access data for the dynamic data element, and
in response to receiving the request, determining that data for the dynamic data element corresponds to a first data instance of a first class or type.

31. The server of claim 30, wherein the processing unit, in response to detecting the reference, determines that data for the dynamic data element corresponds to a second data instance of the first class or type.

32. The server of claim 1, wherein the triggering event includes any of displaying a user interface with the dynamic data element contained therein, performing rule processing, determining that data for the dynamic data element is not already loaded into the volatile data store, determining that data for the dynamic data element is not already loaded into a session cache or a server cache, and determining that a cached copy of data for the dynamic data element is no longer valid in accordance with an expiration time.

33. The server of claim 1, wherein the association is included in a declarative page, and the declarative page is used in connection with the referencing to retrieve the data for the dynamic data element.

34. The server of claim 33, wherein the declarative page is referenced during processing of the dynamic data element in connection with a workflow process.

35. The server of claim 33, wherein the declarative page is updated to change how data for the dynamic data element is accessed, wherein the change includes using at least one of: a different criterion, a different condition, a different parameter, and a different data access description.

36. The server of claim 34, wherein the declarative page is defined in a declarative page definition, and the workflow process is defined in a workflow process definition that is separate from the declarative page definition.

37. The server of claim 1, wherein at least one of the data structure and the dynamic data element is a database table.

38. The server of claim 37, wherein the database table is in a normalized form.

39. The server of claim 1, wherein one of the data structure and the dynamic data element is an object and another of the data structure and the dynamic data element is a database table.

40. A computer-implemented method for processing an instance of a data structure, the method comprising:
receiving, at a first point in time, a request to create an instance of a data structure according to a definition of an object-oriented class defining data elements associated with the instance, those data elements including a dynamic data element the definition of which uses an association specifying how to retrieve data for the dynamic data element in accordance with criteria evaluated using a context that is current subsequent to the first point in time;
allocating at the first point in time in response to receiving the request storage in a volatile data store for data elements in the data structure which are not dynamic data elements but does not allocate storage in the volatile data store for the dynamic data element;
detecting, at a second point in time that is subsequent to the first point in time, a reference to the dynamic data element in connection with a triggering event; and
in response to detecting the reference, performing steps of:
allocating storage in the volatile data store for the dynamic data element,
evaluating the criteria using a current context determined at the second point in time, and
retrieving data for the dynamic data element in accordance with the association used in the definition of that data element and in accordance with the criteria evaluated using the current context at the second point in time.

41. The method of claim 40, wherein the criteria is evaluated to determine a location from which data for the dynamic data element is retrieved, the criteria including a first condition which, when having a first value as a result of the evaluating, specifies that the data for the dynamic data element is retrieved from a first location, and which, when having a second value as a result of the evaluating, specifies that the data for the dynamic data element is retrieved from a second location different from the first location.

42. The method of claim 40, wherein the request is made in connection with performing a business process.

43. The method of claim 42, wherein the business process is performed in connection with at least one of insurance, finance, healthcare, automotive, food and restaurant industry, sales and services for consumer goods and services, purchasing a product, purchasing a service, returning a previously purchased item, submitting a complaint requiring resolution, inventory update, insurance claim processing, insurance application renewal, insurance underwriting, and loan processing.

44. A non-transitory computer-readable medium for processing an instance of a data structure, the computer-readable medium comprising executable code for:
receiving, at a first point in time, a request to create an instance of a data structure according to a definition of an object-oriented class defining data elements associated with the instance, those data elements including a dynamic data element the definition of which uses an association specifying how to retrieve data for the dynamic data element in accordance with criteria evaluated using a context that is current subsequent to the first point in time;

allocating at the first point in time in response to receiving the request storage in a volatile data store for data elements in the data structure which are not dynamic data elements but does not allocate storage in the volatile data store for the dynamic data element;

detecting, at a second point in time that is subsequent to the first point in time, a reference to the dynamic data element in connection with a triggering event; and in response to detecting the reference, performing steps of:

allocating storage in the volatile data store for the dynamic data element, evaluating the criteria using a current context determined at the second point in time, and retrieving data for the dynamic data element in accordance with the association used in the definition of that data element and in accordance with the criteria evaluated using the current context at the second point in time.

\* \* \* \* \*